United States Patent
August et al.

(10) Patent No.: US 11,383,431 B2
(45) Date of Patent: Jul. 12, 2022

(54) HEATING SYSTEM FOR FIBER-REINFORCED THERMOPLASTIC FEEDSTOCK AND WORKPIECE

(71) Applicant: Arevo, Inc., Milpitas, CA (US)

(72) Inventors: Zachary Aaron August, Santa Clara, CA (US); Hemant Bheda, Saratoga, CA (US); Leonid Michael Treyger, Orlando, FL (US)

(73) Assignee: Arevo, Inc., Milpitas, CA (US)

( * ) Notice: Subject to any disclaimer, the term of this patent is extended or adjusted under 35 U.S.C. 154(b) by 202 days.

(21) Appl. No.: 16/889,833

(22) Filed: Jun. 2, 2020

(65) Prior Publication Data
US 2021/0154921 A1    May 27, 2021

Related U.S. Application Data

(63) Continuation-in-part of application No. 16/690,765, filed on Nov. 21, 2019.
(60) Provisional application No. 63/029,172, filed on May 22, 2020, provisional application No. 63/025,109, filed on May 14, 2020.

(51) Int. Cl.
| | |
|---|---|
| *B29C 64/141* | (2017.01) |
| *B23K 26/00* | (2014.01) |
| *B23K 26/06* | (2014.01) |
| *B23K 26/342* | (2014.01) |
| *B33Y 10/00* | (2015.01) |
| *B33Y 70/00* | (2020.01) |
| *B33Y 30/00* | (2015.01) |
| *B23K 26/08* | (2014.01) |
| *B23K 26/067* | (2006.01) |
| *B29K 307/04* | (2006.01) |
| *B29K 101/12* | (2006.01) |

(52) U.S. Cl.
CPC ........ *B29C 64/141* (2017.08); *B23K 26/0006* (2013.01); *B23K 26/0093* (2013.01); *B23K 26/067* (2013.01); *B23K 26/0608* (2013.01); *B23K 26/0626* (2013.01); *B23K 26/0652* (2013.01); *B23K 26/083* (2013.01); *B23K 26/0869* (2013.01); *B23K 26/342* (2015.10); *B33Y 10/00* (2014.12); *B33Y 70/00* (2014.12); *B29K 2101/12* (2013.01); *B29K 2307/04* (2013.01); *B33Y 30/00* (2014.12)

(58) Field of Classification Search
CPC ....... B29C 64/141; B33Y 10/00; B33Y 30/00; B23K 26/0006; B23K 26/0608; B23K 26/0626; B23K 26/342
See application file for complete search history.

(56) References Cited

U.S. PATENT DOCUMENTS

| | | |
|---|---|---|
| 7,075,954 B2 | 7/2006 | Ledentsov et al. |
| 7,993,124 B2 | 8/2011 | Nelson et al. |
| (Continued) | | |

OTHER PUBLICATIONS

Office action, U.S. Appl. No. 16/901,065, dated Nov. 3, 2021.
(Continued)

*Primary Examiner* — Joseph S Del Sole
*Assistant Examiner* — Mohamed K Ahmed Ali
(74) *Attorney, Agent, or Firm* — McGeary Cukor, LLC; Jason Paul DeMont; Kenneth Ottesen

(57) ABSTRACT

An additive manufacturing system is disclosed that comprises two or more lasers for precisely heating a fiber-reinforced thermoplastic feedstock and a fiber-reinforced thermoplastic workpiece in preparation for depositing and tamping the feedstock onto the workpiece. The system employs feedforward, a variety of sensors, and feedback to ensure that the feedstock and workpiece are properly heated.

20 Claims, 29 Drawing Sheets

(56) References Cited

U.S. PATENT DOCUMENTS

| | | |
|---|---|---|
| 2013/0248504 A1 | 9/2013 | Kusuda |
| 2015/0034613 A1 | 2/2015 | Hosseini |
| 2015/0328719 A1 | 11/2015 | Jarvis et al. |
| 2017/0072633 A1 | 3/2017 | Hsu |
| 2017/0320242 A1 | 11/2017 | Kok et al. |
| 2018/0117851 A1 | 5/2018 | Reese et al. |
| 2018/0319098 A1 | 11/2018 | Armijo et al. |
| 2019/0168451 A1 | 6/2019 | Mark |

OTHER PUBLICATIONS

Office action, U.S. Appl. No. 16/889,832, dated Jan. 14, 2022.
Notice of Allowance, U.S. Appl. No. 16/889,831, dated Mar. 2, 2022.
Office action, U.S. Appl. No. 16/889,831, dated Dec. 22, 2021.
Notice of Allowance, U.S. Appl. No. 16/889,830, dated Dec. 23, 2021.
European Patent Office (EPO) application No. 20206103.2-1202, Extended European search report dated Apr. 16, 2021.
Office action, U.S. Appl. No. 16/690,765, dated Nov. 22, 2021.
Notice of Allowance, USPTO, U.S. Appl. No. 16/889,832, dated Mar. 28, 2022.
Office Action, USPTO, U.S. Appl. No. 16/901,069, dated Apr. 1, 2022.
Office Action, USPTO, U.S. Appl. No. 16/901,065, dated May 12, 2022.
Office Action, USPTO, U.S. Appl. No. 16/690,765, dated Jun. 2, 2022.

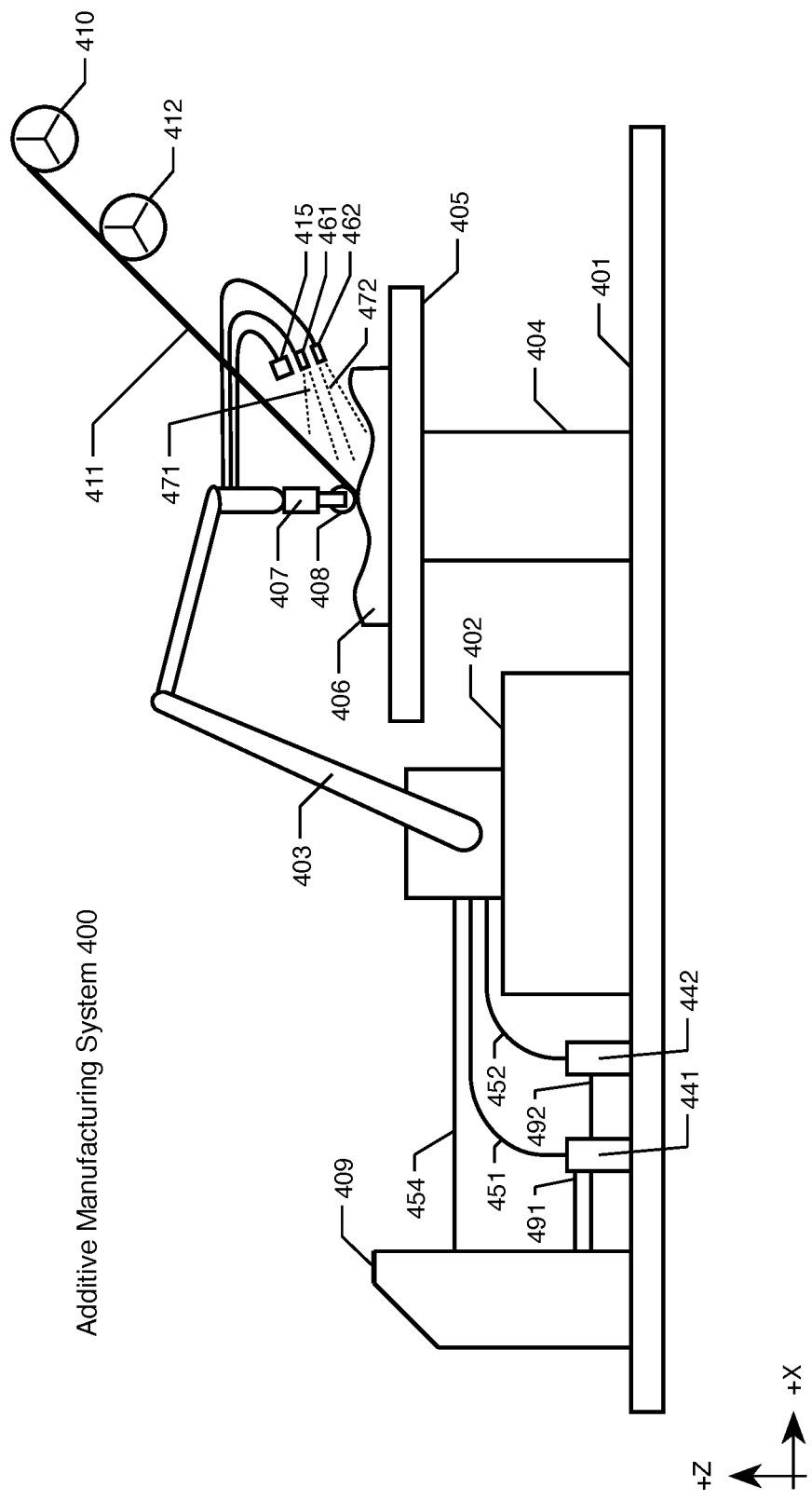

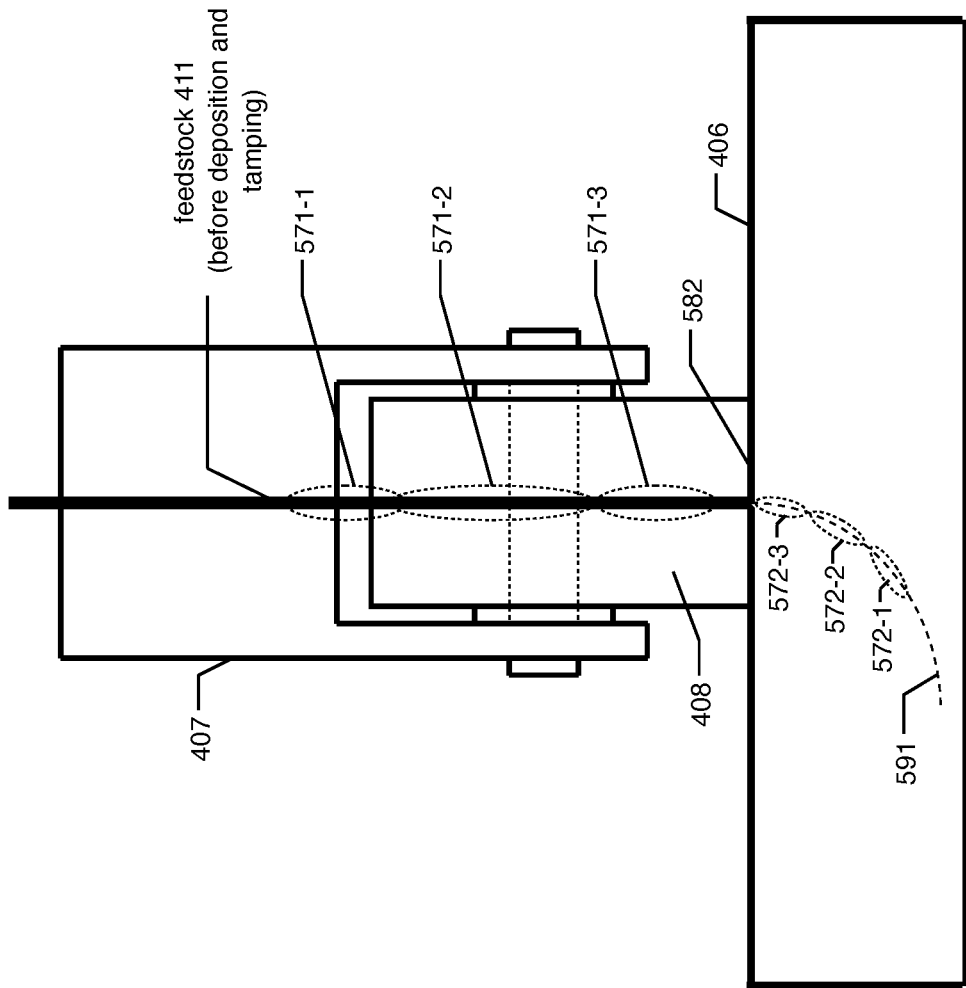
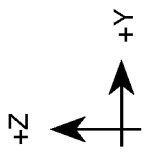
Figure 6

Tasks by Segment of Feedstock and Portion of Workpiece for Additive Manufacturing System 400

HEATING SYSTEM FOR FIBER-REINFORCED THERMOPLASTIC FEEDSTOCK AND WORKPIECE

CROSS-REFERENCE TO RELATED APPLICATIONS

The following are hereby incorporated by reference:
(i) U.S. Pat. No. 10,076,870, entitled "Filament Guide," issued on Sep. 18, 2018; and
(ii) U.S. patent application Ser. No. 15/959,213, entitled "Variable-Contour Compaction Press," filed on Apr. 21, 2018; and
(iii) U.S. patent application Ser. No. 15/959,214, entitled "Variable-Contour Compaction Roller," filed on Apr. 21, 2018; and
(iv) U.S. patent application Ser. No. 15/959,215, entitled "Self-Cleaning Variable-Contour Compaction Press," filed on Apr. 21, 2018; and
(v) U.S. patent application Ser. No. 16/023,197, entitled "Filament Cutter," filed on Jun. 29, 2018; and
(vi) U.S. patent application Ser. No. 16/023,210, entitled "Filament Accumulator or Tensioning Assembly," filed Jun. 29, 2018; and
(vii) U.S. patent application Ser. No. 16/690,765, entitled "Heater for Thermoplastic Filament and Workpiece," filed Nov. 21, 2019; and
(viii) U.S. patent application Ser. No. 16/792,150, entitled "Thermoplastic Mold with Tunable Adhesion," filed on Feb. 14, 2020; and
(ix) U.S. patent application Ser. No. 16/792,156, entitled "Thermoplastic Mold with Implicit Registration," filed on Feb. 14, 2020; and
(x) U.S. Patent Application Ser. No. 63/025,109, entitled "Heating System for Fiber-Reinforced Thermoplastic Feedstock and Workpiece," filed May 14, 2020, and
(xi) U.S. Patent Application Ser. No. 63/029,172, entitled "Heating System for Fiber-Reinforced Thermoplastic Feedstock and Workpiece," filed May 22, 2020.

For the purposes of this specification, if there is any inconsistency in the language between this specification and the language in one or more of these documents, the language in this specification prevails.

FIELD OF THE INVENTION

The present invention relates to additive manufacturing in general, and, more particularly, to an additive manufacturing process that uses segments of fiber-reinforced thermoplastic feedstock (e.g., pre-preg tape, filament, etc.) as its elemental unit of fabrication.

BACKGROUND OF THE INVENTION

In the same way that a building can be constructed by successively depositing bricks on top of one another, it is well known in the field of additive manufacturing that an article of manufacture can be fabricated by successively depositing segments of fiber-reinforced thermoplastic filament on top of one another.

In some ways, a segment of thermoplastic filament is similar to a spaghetti noodle. When the temperature of a thermoplastic filament is below its resin softening point, the filament is long, thin, stiff, and not sticky—like a dry spaghetti noodle. In contrast, when the temperature of the filament is above its resin softening point but below its melting point, the filament is long, thin, flexible, and sticky—like a wet spaghetti noodle.

There are, however, some key differences between bricks and thermoplastic filament. For example, masonry bricks are not, in and of themselves, self-adhesive, and, therefore an adhesive compound—typically mortar—is used to bind them together. In contrast, segments of thermoplastic filaments are self-adhesive, and they will become bound if they are pressed tightly when they are hot and held together until they are cool.

Similarly, it is well known in the field of additive manufacturing that an article of manufacture can be fabricated by successively depositing segments of thermoplastic tape on top of one another. Whereas a segment of thermoplastic filament is similar to spaghetti, a segment of thermoplastic tape is similar to a ribbon pasta or lasagna noodle. When the temperature of the thermoplastic tape is below its resin softening point, the tape is long, thin, wide, stiff, and not tacky—like a dry lasagna noodle. In contrast, when the temperature of the tape is above its resin softening point but below its melting point, the tape is long, thin, wide, flexible, and sticky—like a wet lasagna noodle. And like thermoplastic filament, segments of thermoplastic tape are self-adhesive, and they will become bound if they are pressed tightly when they are hot and held together until they are cool.

FIG. 1 depicts an illustration of additive manufacturing system 100 in the prior art, which system fabricates articles of manufacture by successively depositing segments of fiber-reinforced thermoplastic feedstock (e.g., filament, tape, etc.) on top of one another.

Additive manufacturing system 100 comprises: platform 101, robot mount 102, robot 103, build plate support 104, build plate 105, workpiece 106, deposition head 107, tamping tool 108, controller 109, feedstock reel 110, feedstock 111, accumulator 112, laser 141, optical cable 151, optical instrument 161, laser beam 171, laser control cable 191, irradiated region 271, nip line segment 281, pinch line segment 282, and deposition path 291, interrelated as shown.

FIG. 2a depicts a close-up of workpiece 106, deposition head 107, tamping tool 108, feedstock 111, optical cable 151, optical instrument 161, and laser beam 171, as depicted in FIG. 1. FIG. 2b depicts a close-up of workpiece 106, deposition head 107, tamping tool 108, feedstock 111, irradiated region 271, and deposition path 291, along cross-section AA-AA, as depicted in FIG. 2a. FIG. 3 depicts a schematic diagram of the heating architecture for additive manufacturing system 100.

Platform 101 is a rigid metal structure that ensures that the relative spatial relationship of robot mount 102, robot 103, deposition head 107 (including tamping tool 108), and optical instrument 161 are maintained and known with respect to build-plate support 104, build plate 105, and workpiece 106. Robot mount 102 is a rigid, massive, and stable support for robot 103 that provides ballast and inertial stability for robot 103. Robot 103 is a six-axis articulated mechanical arm that holds deposition head 107, optical instrument 161 and optical cable 151. The movement of robot 103 (including deposition head 107) is under the direction of controller 109. Robot 103 is capable of depositing feedstock 111 at any location, in any one-, two-, or three-dimensional curve, and with any angular orientation.

Build plate support 104 is a rigid, massive, and stable support for build plate 105 and workpiece 106. Build plate support 104 comprises a stepper motor—under the direction of controller 109—that is capable of rotating build plate 105 (and, consequently workpiece 106) around an axis that is normal to the X-Y plane. Build plate 105 is a rigid aluminum-alloy support onto which workpiece 106 is steadfastly affixed so that workpiece 106 cannot move in any direction or rotate around any axis independently of build plate 105. Workpiece 106 comprises one or more segments of feedstock 111 that have been successively deposited and welded together in a desired geometry. Deposition head 107 is the end effector of robot 103 and comprises:

(i) a feedstock guide that directs feedstock 111 into position for heating, tamping, and welding onto workpiece 106, and (ii) tamping tool 108, which tamps the heated feedstock 111 into the heated workpiece 106, and (iii) a feedstock cutter—under the direction of controller 109—that periodically or sporadically cuts feedstock 111, and (iv) optical instrument 161, which takes laser beam 171 from optical cable 151, conditions it, and directs it onto irradiated region 271, and (v) a structural support for optical instrument 161 that maintains the relative spatial position of the feedstock guide, tamping tool 108, the cutter, and optical instrument 161.

The feedstock guide, the feedstock cutter, and the structural support for optical instrument 161 are omitted from the figures so that the reader can more clearly understand the functional and spatial relationship of workpiece 106, deposition head 107, tamping tool 108, feedstock 111, and optical instrument 161.

Tamping tool 108 comprises a roller-bearing mounted steel cylinder that tamps the heated feedstock 111 into the heated workpiece 106.

Controller 109 comprises the hardware and software necessary to direct robot 103, build plate support 104, and deposition head 107 in order to fabricate the article of manufacture.

Feedstock reel 110 is a circular reel that stores 1000 meters of feedstock 111 and feeds that feedstock to deposition head 107 and that maintains a constant tension on feedstock 111. Feedstock 111 is a carbon fiber-reinforced thermoplastic filament or tape, which is commonly called "pre-preg." Accumulator 112 takes feedstock 111 from feedstock reel 110 and provides it to deposition head 107 with the correct tension for depositing.

Optical instrument 161 is hardware that takes high-energy light from optical cable 151 and outputs laser beam 171, which illuminates and heats those portions of feedstock 111 and workpiece 106 that are within irradiated region 271. Laser 141 is a high-energy laser whose output power is controlled by controller 109, via laser control cable 191. Because controller 109 controls robot 103 and the speed at which feedstock 111 is deposited, controller 109 knows how quickly or slowly each unit-length of feedstock 111 must be heated and adjusts laser 141 accordingly. When the feedstock is deposited quickly, laser 141 is set to higher power so that feedstock 111 and workpiece 106 can be heated quickly. In contrast, when feedstock 111 is deposited more slowly, laser 141 is set to lower power, and when deposition stops laser 141 is turned off. Optical cable 151 is a glass fiber for carrying the light from laser 141 to optical instrument 161 with substantially no loss.

Nip line segment 281 is that line segment on the circumferential surface of tamping tool 108 where the compressive force on feedstock 111 from tamping tool 108 and workpiece 106 is at a maximum. Pinch line segment 282 is that line segment on the circumferential surface of tamping tool 108 where the compressive force on feedstock 111 from tamping tool 108 and workpiece 106 first substantially constrains any movement of feedstock 111 parallel to the axis of tamping tool 108.

Deposition path 291 depicts the location on workpiece 106 where feedstock 111 is next to be deposited.

In this context, the process of fabricating articles of manufacture with segments of fiber-reinforced thermoplastic feedstock presents many challenges.

SUMMARY OF THE INVENTION

Some embodiments of the present invention art are capable of welding feedstock to a workpiece without some of the costs and disadvantages for doing so in the prior art. The nature of these costs and disadvantages becomes clear upon close examination of additive manufacturing system 100, as presented above and in FIGS. 1, 2a, 2b, and 3.

The job of laser beam 171 is to heat each segment of feedstock 111—and the corresponding portion of workpiece 106 to which it is to be welded—to a very narrow temperature range above their resin softening point. If the temperature of either is too low, then the weld will be defective, and if the temperature of either is too high, then it could burn or melt.

In the prior art, laser beam 171 heats both workpiece 106 and feedstock 111 at the same time, in the same manner, and with the beam's energy evenly split between them. Given that both workpiece 106 and feedstock 111 comprise the same material and must be heated to the same temperature, the use of laser beam 171 to heat them both appears to be reasonable. In practice, however, it fails to produce quality welds, and on close examination, the reason why is clear: the task of heating the workpiece is, in general, far more complex and variable than the task of heating the feedstock.

The geometry and composition of each unit-length of feedstock 111 is approximately uniform, and, therefore, each unit-length of feedstock 111 has approximately the same surface area, heat capacity, and thermal conductivity as every other segment. As long as the initial temperature of each segment is the same, then the same amount of heat energy is needed to heat each segment to its resin softening point.

In contrast, the geometry and fiber orientation of each portion of workpiece 106 varies, and, therefore, different portions of workpiece 106 have different surface areas, heat capacities, and thermal conductivities. As a result, different portions of workpiece 106 require different amounts of heat energy to heat them to their resin softening point.

Furthermore, laser beam 271 needs to heat those portions of workpiece 106 along deposition path 291. When deposition path 291 is straight, laser beam 271 heats the correct portions, but when deposition path 291 twists and turns—as shown in FIG. 2b—laser beam 271 does not heat the correct portions.

And still furthermore, the angle of incidence of laser beam 271 on feedstock 111 is generally consistent, which causes each unit-length of feedstock to absorb the same amount of heat energy per unit-time. In contrast, the angle of incidence of laser beam 271 on workpiece 106 is inconsistent because of variations in the contour of workpiece 106. This, in turn, causes:

(i) the irradiance of laser beam 171 at each unit-area on workpiece 106 to vary, and (ii) the amount of light that is reflected off of workpiece 106 to vary, and (iii) the amount of light that is refracted into—and absorbed by—workpiece 106 to vary, and (iv) different unit-areas of workpiece 106 to absorb different amounts of heat energy per unit-time.

To address these and other issues, the first illustrative embodiment comprises two lasers. One laser beam is solely dedicated to heating the feedstock, and the other laser beam is solely dedicated to heating the workpiece. This is advantageous because it enables one laser beam to be dedicated to addressing the particular issues associated with heating the feedstock and one laser beam to be dedicated to addressing the particular issues associated with heating the workpiece. Furthermore, the total cost for the two less-powerful lasers can be less than the cost of laser 141 in the prior art.

In accordance with the first illustrative embodiment, each laser beam—and its associated optical instrument—is independently-controlled to ensure that each segment of feedstock and each portion of the workpiece are properly heated. For example, and without limitation, the first illustrative embodiment employs feedforward, a variety of sensors, and feedback to continually:

(i) adjust the average power of each laser during each time-interval, and
(ii) steer the workpiece laser beam along the deposition path, and
(iii) adjust the irradiance and angle of incidence of each laser beam to compensate for changes in the contour of the workpiece and other factors, to ensure that each segment of feedstock and each portion of the workpiece are properly heated, tamped, and welded.

The second illustrative embodiment comprises four lasers. Two laser beams are solely dedicated to heating the feedstock, and the other two laser beams are solely dedicated to heating the workpiece. This is advantageous because it enables two laser beams to cooperate in addressing the particular issues associated with heating the feedstock and two laser beams to cooperate in addressing the particular issues associated with heating the workpiece. Furthermore, the total cost for the four lasers can be less than the cost of the two lasers in the first illustrative embodiment.

The second illustrative embodiment is advantageous over the first illustrative embodiment because the use of four laser beams enables fine-tuning of the temperature of the feedstock and the workpiece immediately prior to deposition and tamping. Furthermore, the use of four laser beams is advantageous when the rate of deposition is high (e.g., >100 mm/sec), highly non-uniform, and when the deposition path comprises many twists and turns.

The second illustrative embodiment uses one optical cable to carry each laser beam from its laser to its associated optical instrument on the deposition head. Because there are four laser beams, there are four optical cables. The third illustrative embodiment adds the means to carry all of the four laser beams to the deposition head via only one optical cable. This is advantageous because it enables the deposition head to be lighter and more compact.

These and other advantages of the illustrative embodiments will be apparent in the disclosure below and in the accompanying figures.

BRIEF DESCRIPTION OF THE DRAWINGS

FIG. 2b depicts a close-up of workpiece 106, deposition head 107, tamping tool 108, and feedstock 111 along cross-section AA-AA, as depicted in FIG. 2a.

FIG. 4 depicts an illustration of additive manufacturing system 400 in accordance with the first illustrative embodiment of the present invention.

FIG. 6 depicts a close-up of workpiece 406 in which deposition path 591 curves to the left (from the perspective of deposition head 407).

DEFINITIONS

Figure 1:
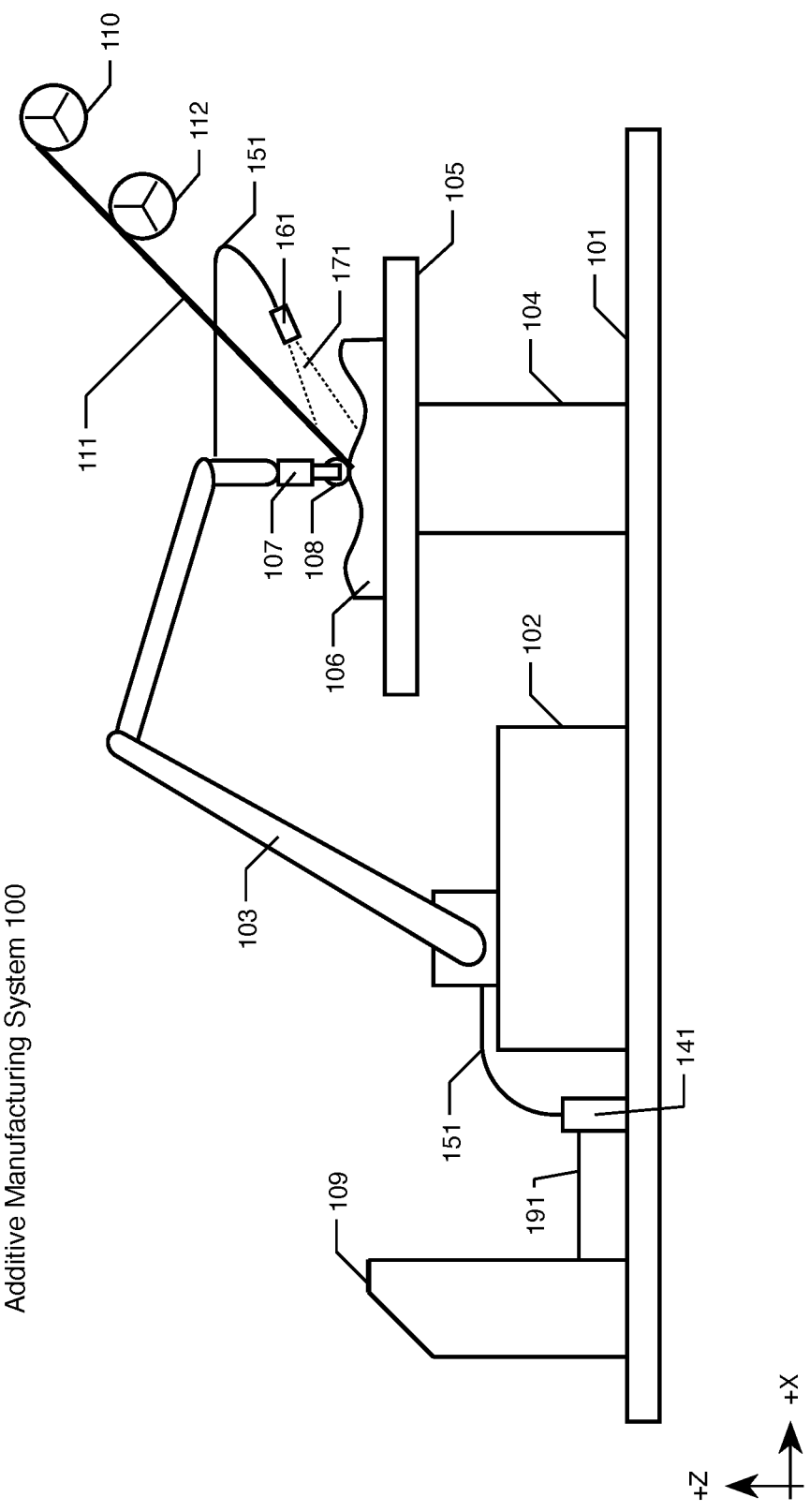
FIG. 1 depicts an illustration of additive manufacturing system 100 in the prior art, which system fabricates articles of manufacture by successively depositing segments of fiber-reinforced thermoplastic feedstock (e.g., filament, tape, etc.) on top of one another.
Figure 2A:
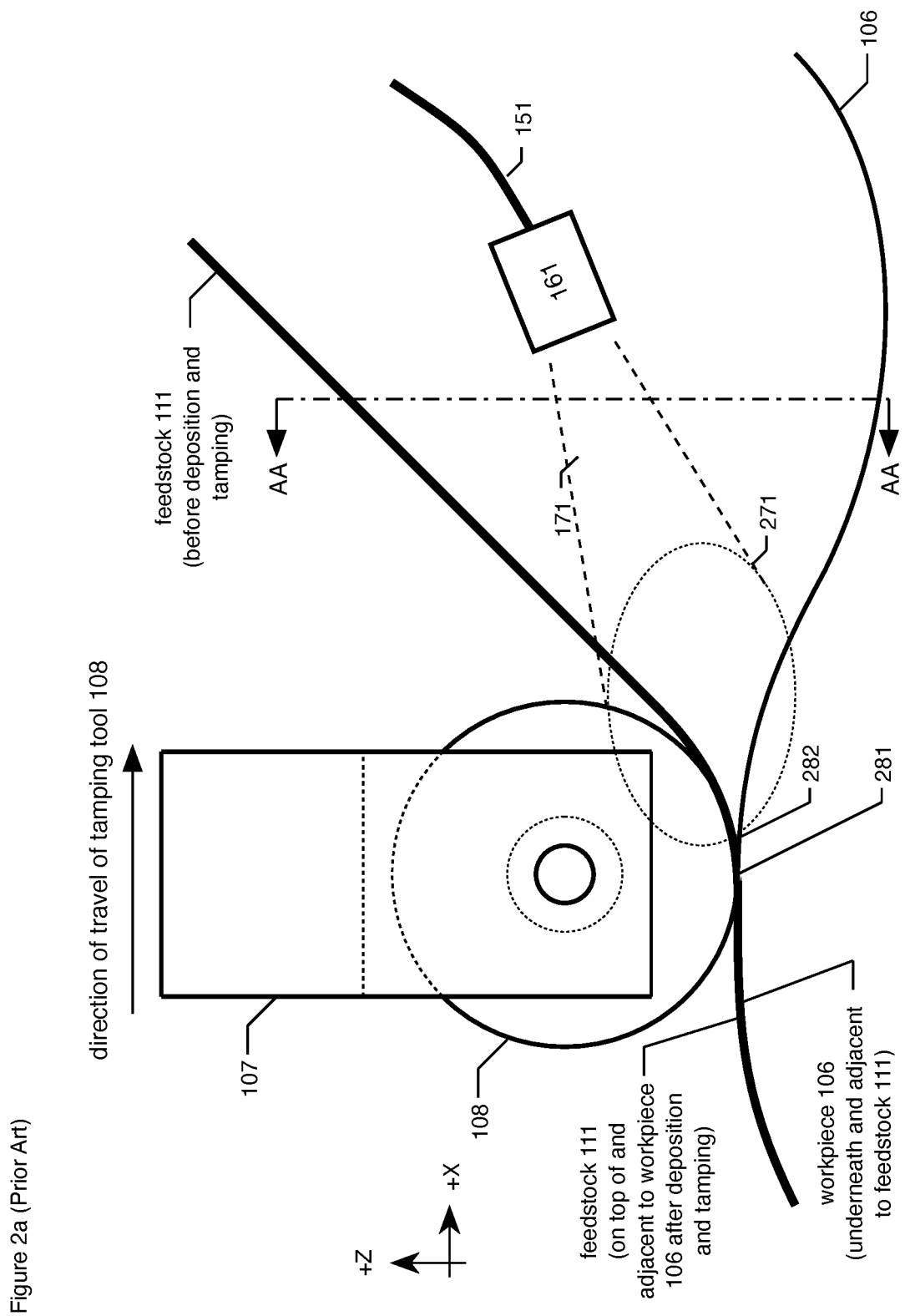
FIG. 2a depicts a close-up of workpiece 106, deposition head 107, tamping tool 108, feedstock 111, optical cable 151, optical instrument 161, and laser beam 171, as depicted in FIG. 1.
Figure 2B:
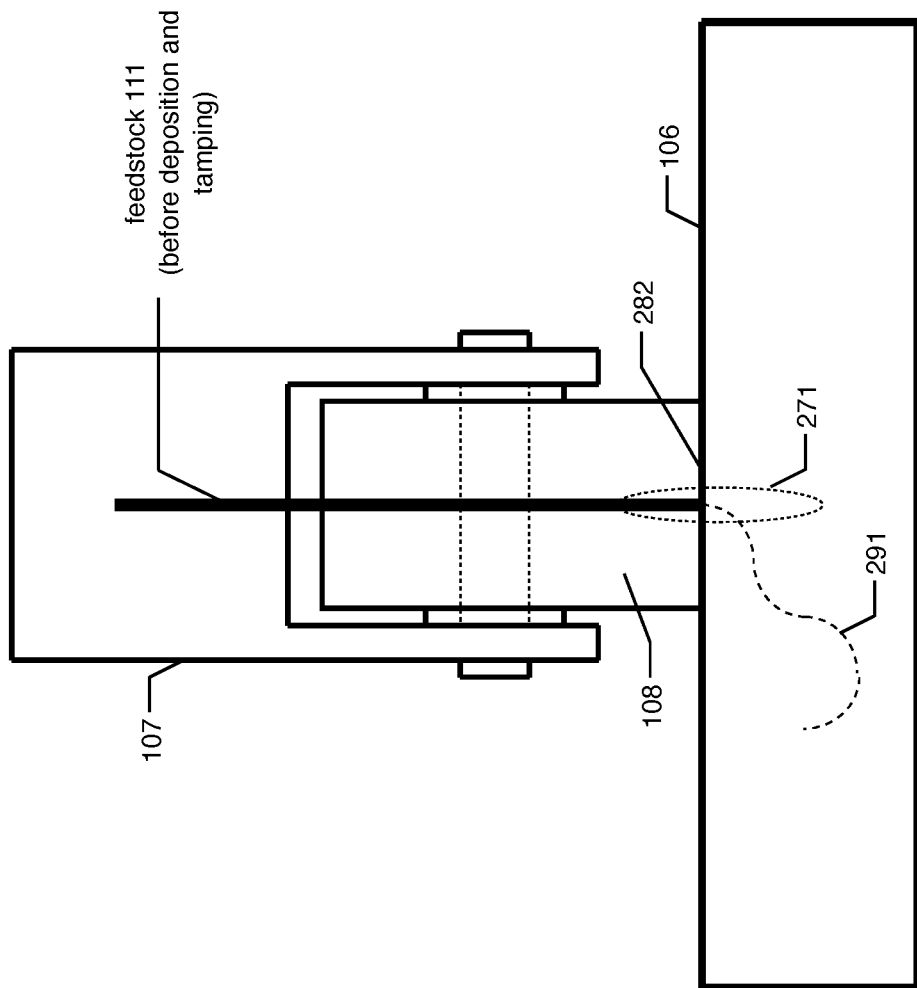
Figure 3:
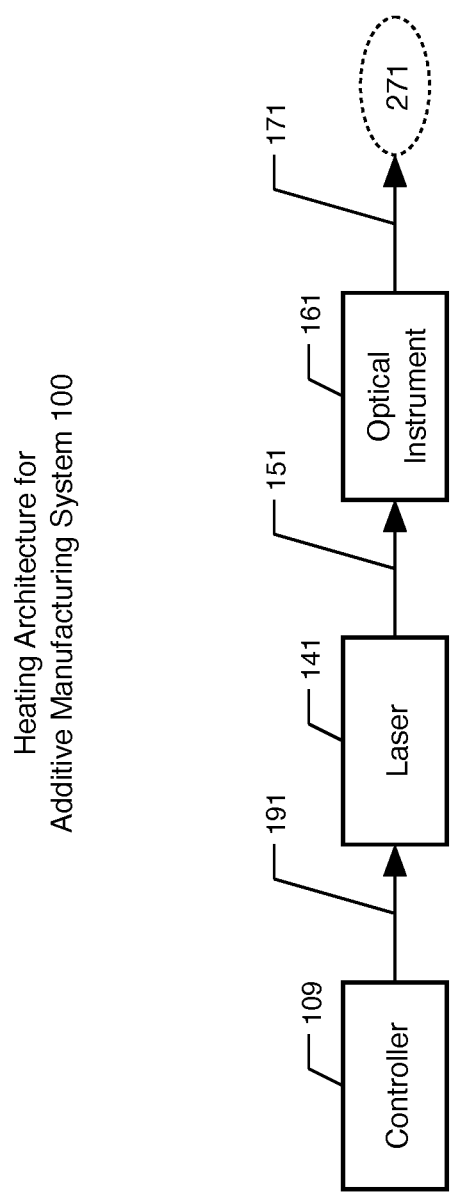
FIG. 3 depicts a schematic diagram of the heating architecture for additive manufacturing system 100.

Irradiance—For the purposes of this specification, the term "irradiance" is defined as the radiant flux received by a surface per unit-area. The SI unit of irradiance is the Watt per meter$^2$.

Nip line segment—For the purposes of this specification, a "nip line segment" on a tamping tool is defined as line segment on the circumferential surface of the tamping tool where the tamping tool exerts the maximum radial force on a feedstock.

Pinch line segment—for the purposes of this specification, a "pinch line segment" on a tamping tool is defined as the line segment on the circumferential surface of the tamping tool where the tamping tool first pinches a unit-length of feedstock between the tamping tool and the workpiece so that any movement of the feedstock parallel to the rotational axis of the tamping tool is substantially constrained.

Printer—For the purposes of this specification, a "printer" is defined as an additive manufacturing system or an additive and subtractive manufacturing system.

Printing—For the purposes of this specification, the infinitive "to print" and its inflected forms is defined as to fabricate. The act of fabrication is widely called "printing" in the field of additive manufacturing.

Resin Softening Point—For the purposes of this specification, the phrase "resin softening point" is defined as the temperature at which the resin softens beyond some arbitrary softness.

Workpiece—For the purposes of this specification, a "workpiece" is defined as an inchoate article of manufacture.

DETAILED DESCRIPTION

FIG. 4 depicts an illustration of additive manufacturing system 400 in accordance with the first illustrative embodiment of the present invention. Additive manufacturing system 400 fabricates an article of manufacture by successively depositing segments of fiber-reinforced thermoplastic feedstock (e.g., filament, tape, etc.) onto a workpiece until the article of manufacture is complete.

Additive manufacturing system 400 comprises: platform 401, robot mount 402, robot 403, build plate support 404, build plate 405, workpiece 406, deposition head 407, tamping tool 408, controller 409, feedstock reel 410, feedstock 411, accumulator 412, force gauge 413, sensor array 415, feedstock laser 441, workpiece laser 442, optical cable 451, optical cable 452, sensor cable 454, optical instrument 461, optical instrument 462, laser beam 471, laser beam 472, feedstock laser control cable 491, and workpiece laser control cable 492, interrelated as shown.

Figure 5A:
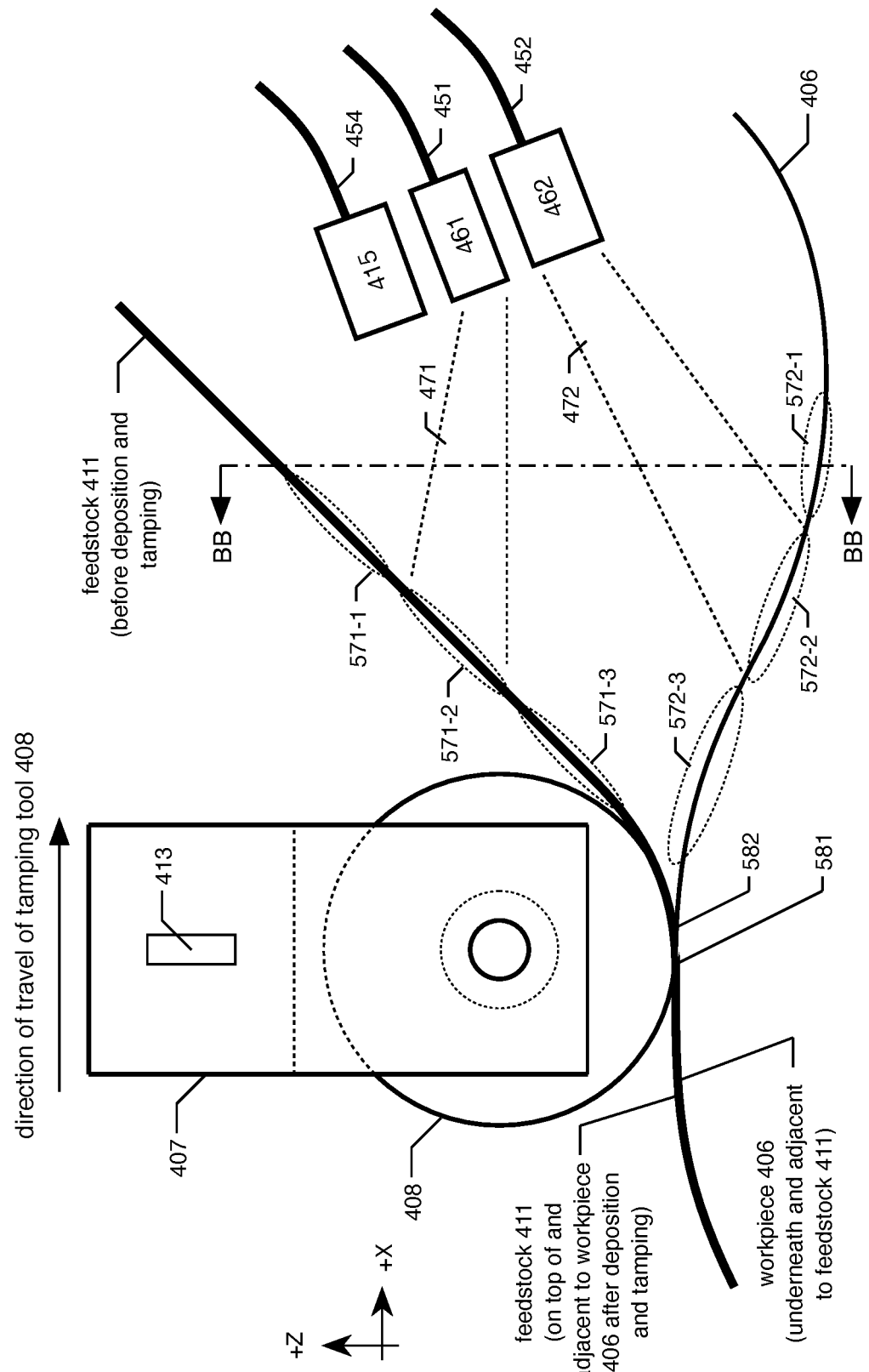
FIG. 5a depicts a close-up of workpiece 406, deposition head 407, tamping tool 408, feedstock 411, sensor array 415, optical instrument 461, optical instrument 462, optical cable 451, optical cable 452, sensor cable 454, laser beam 471, laser beam 472, feedstock region 571-1, feedstock region 571-2, feedstock region 571-3, workpiece region 572-1, workpiece region 572-2, workpiece region 572-3, nip line segment 581, and pinch line segment 582, interrelated as shown.

FIG. 5a depicts a close-up of workpiece 406, deposition head 407, tamping tool 408, feedstock 411, sensor array 415, optical instrument 461, optical instrument 462, optical cable 451, optical cable 452, sensor cable 454, laser beam 471, laser beam 472, feedstock region 571-1, feedstock region 571-2, feedstock region 571-3, workpiece region 572-1, workpiece region 572-2, workpiece region 572-3, nip line segment 581, and pinch line segment 582, interrelated as shown.

Figure 5B:
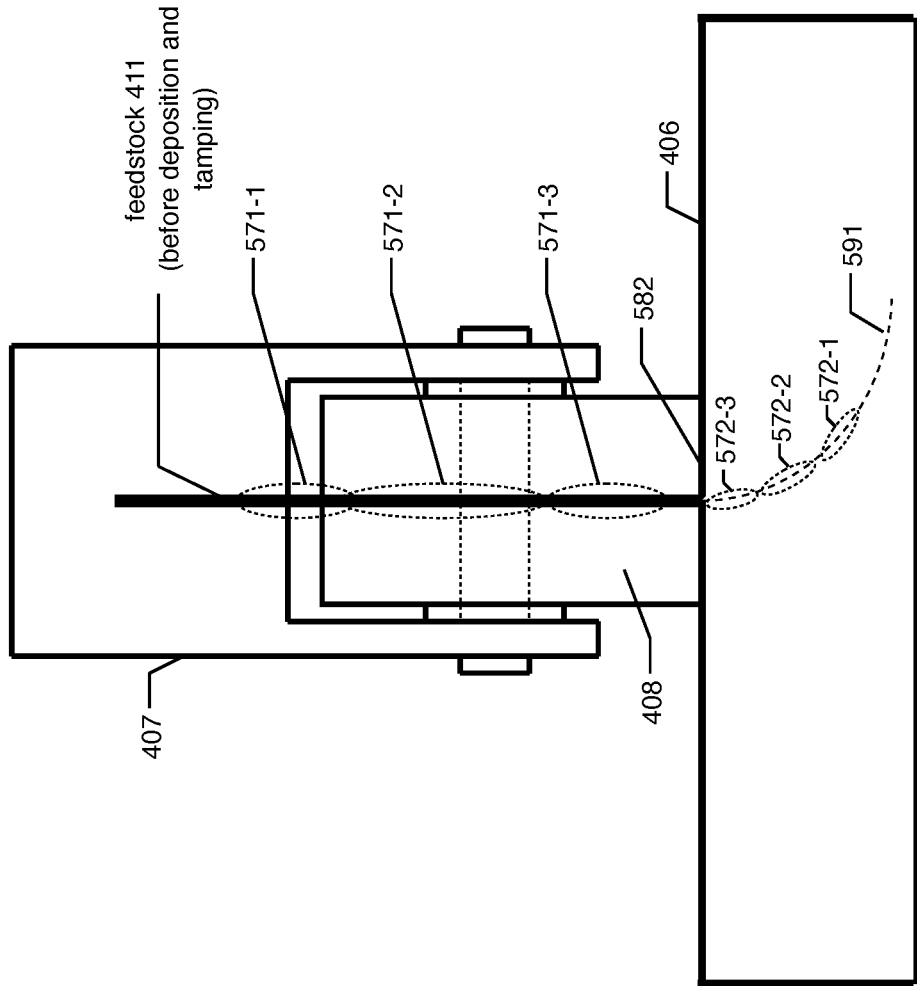
FIG. 5b depicts a close-up of workpiece 406 in which deposition path 591 curves to the right (from the perspective of deposition head 407).

FIG. 5b depicts a close-up of workpiece 406, deposition head 407, tamping tool 408, feedstock 411, feedstock region 571-1, feedstock region 571-2, feedstock region 571-3, workpiece region 572-1, workpiece region 572-2, workpiece region 572-3, pinch line segment 582, and deposition path 591 all as seen along cross-section BB-BB as depicted in FIG. 5a.

FIG. 6 depicts a close-up of workpiece 406, deposition head 407, tamping tool 408, feedstock 411, feedstock region 571-1, feedstock region 571-2, feedstock region 571-3, workpiece region 572-1, workpiece region 572-2, workpiece region 572-3, pinch line segment 582, and deposition path 591, all as seen along cross-section BB-BB as depicted in FIG. 5a.

FIG. 6 differs from FIG. 5a in that the curvature of deposition path 591 in FIG. 5a curves to the right (from the perspective of deposition head 407) whereas deposition path 591 in FIG. 6 curves to the left. This is because additive manufacturing system 400 steers laser beam 472, workpiece region 572-1, workpiece region 572-2, and workpiece region 572-3 onto deposition path 591 as deposition path 591 meanders on workpiece 406.

Platform 401 is a rigid metal structure and is identical to platform 101 in the prior art. Platform 401 ensures that the relative spatial relationship of robot mount 402, robot 403, deposition head 407, tamping tool 408, optical instrument 461, optical instrument 462, and sensor array 415 are maintained and known with respect to build-plate support 404, build plate 405, workpiece 406, and deposition path 591. It will be clear to those skilled in the art how to make and use platform 401.

Robot mount 402 is a rigid, massive, and stable support for robot 403 and is identical to robot mount 102 in the prior art. The purpose of robot mount 402 is to provide ballast and inertial stability for robot 403. It will be clear to those skilled in the art how to make and use robot mount 402.

Robot 403 is a six-axis articulated mechanical arm that supports deposition head 407, tamping tool 408, optical instrument 461, optical instrument 462, sensor array 415, optical cable 451, optical cable 452, and sensor cable 454. Robot 403 is identical to robot 103 in the prior art. It will be clear to those skilled in the art, however, after reading this disclosure, how to make and use alternative embodiments of the present invention in which a different type of robot (e.g., a cartesian robot, a cylindrical robot, a SCARA, a delta robot, etc.) is used. A non-limiting example of robot 403 is the IRB 4600 robot offered by ABB. The motion of robot 403 is under the direction of controller 409, and robot 403 is capable of depositing feedstock 411 at any location on workpiece 406 and in any one-, two-, or three-dimensional curve. It will be clear to those skilled in the art how to make and use robot 403.

Build plate support 404 is a rigid, massive, and stable support for build plate 405 and workpiece 406 and is identical to build plate support 104 in the prior art. The purpose of build plate support 404 is to provide ballast and inertial stability for build plate 405 and also to provide a mechanism for rotating build plate 405 around an axis that is normal to the X-Y plane. To wit, build plate support 404 comprises a stepper motor—under the direction of controller 409—that is capable of rotating build plate 405 (and, consequently workpiece 406) around an axis that is normal to the X-Y plane. It will be clear to those skilled in the art how to make and use build plate support 404.

Build plate 405 is a rigid aluminum-alloy support and is described in detail in U.S. patent application Ser. No. 16/792,156, entitled "Thermoplastic Mold with Implicit Registration," filed on Feb. 14, 2020, and incorporated by reference for the purpose of describing build plate 405. The purpose of build plate 405 is to provide support for workpiece 406 (and a mold with a tunably adhesive surface for workpiece 406). U.S. patent application Ser. No. 16/792,150, entitled "Thermoplastic Mold with Tunable Adhesion," filed on Feb. 14, 2020 is also incorporated by reference for the purpose of describing the interface between build plate 405 and workpiece 4066. It will be clear to those skilled in the art how to make and use build plate 405 after reading this disclosure and the incorporated patent applications.

Workpiece 406 comprises a plurality of segments of feedstock 411 that have been successively deposited and welded together in a desired geometry to form the inchoate article of manufacture. Workpiece 406 is steadfastly affixed to build plate 405 so that workpiece 406 cannot move or rotate independently of build plate 405.

Deposition head 407 is the end effector of robot 403 and comprises:
(i) a feedstock guide that feeds feedstock 411 into position for heating, tamping, and welding to workpiece 406. The feedstock guide is omitted from the figures for clarity but is described in U.S. Pat. No. 10,076,870, entitled "Filament Guide," issued on Sep. 18, 2018, which is incorporated by reference.
(ii) tamping tool 408, which first pinches and then tamps each segment of feedstock 411 onto the corresponding portion of workpiece 406.
(iii) force gauge 413 that continually measures the force of tamping tool 408 on feedstock 411 at nip line segment 581 and reports those measurements back to controller 409 via sensor cable 454.
(iv) a feedstock cutter—under the direction of controller 409—that periodically or sporadically cuts feedstock 411. The feedstock cutter is omitted from the figures for clarity but is described in U.S. patent application Ser. No. 16/023,197, entitled "Filament Cutter," filed on Jun. 29, 2018, which is incorporated by reference.
(v) optical instrument 461, which takes laser beam 471 from optical cable 451, and—under the direction of controller 409—conditions laser beam 471 and directs it onto feedstock region 571-2.
(vi) optical instrument 462, which takes laser beam 472 from optical cable 452, and—under the direction of controller 409—conditions laser beam 472 and directs it onto workpiece region 572-2.
(vii) sensor array 415, which measures the temperature of feedstock region 571-2, workpiece region 572-2, and tamping tool 408 and reports those measurements to controller 409 via sensor cable 454.
(viii) structural support for optical instrument 461, optical instrument 462, and sensor array 415 and that maintains the relative spatial location and position of the feedstock guide, tamping tool 408, pinch line segment 582, the cutter, optical instrument 461, optical instrument 462, and sensor array 415. The structural support is omitted from the figures for clarity but it will be clear to those skilled in the art, after reading this disclosure, how to make and use the structural support.

It will be clear to those skilled in the art, after reading this disclosure, how to make and use deposition head 407.

Tamping tool 408 comprises a roller-bearing mounted steel cylinder (roller) whose tangential speed equals the linear speed of the feedstock adjacent to the roller (i.e., tamping tool 408 rotates freely and there is substantially no friction between tamping tool 408 and feedstock 411. It will be clear to those skilled in the art how to make and use tamping tool 408.

The following patent applications disclose designs for tamping tool 408 which are alternatives to the roller-bearing mounted steel cylinder:
(i) U.S. patent application Ser. No. 15/959,213, entitled "Variable-Contour Compaction Press," filed on Apr. 21, 2018; and
(ii) U.S. patent application Ser. No. 15/959,214, entitled "Variable-Contour Compaction Roller," filed on Apr. 21, 2018; and
(iii) U.S. patent application Ser. No. 15/959,215, entitled "Self-Cleaning Variable-Contour Compaction Press," filed on Apr. 21, 2018;

each of which is incorporated by reference.

Controller 409 comprises the hardware and software necessary to control all aspects of fabricating the article of manufacture, including, but not limited to:
(i) robot 403 (which includes the location and motion of tamping tool 408), and (ii) build plate support 404, and (iii) the feedstock cutter, and (iv) feedstock laser 441, and (v) workpiece laser 442, and (vi) optical instrument 461, and (vii) optical instrument 462, and (viii) accumulator 412.

To accomplish this controller 409 relies on a combination of feedforward and feedback, as described in detail below and in the accompanying drawings. It will be clear to those skilled in the art, after reading this disclosure, how to make and use controller 409.

Feedstock reel 410 is a circular reel that stores 1000 meters of feedstock 411. Feedstock real 410 feeds feedstock 411 to accumulator 412. It will be clear to those skilled in the art how to make and use feedstock reel 410.

Feedstock 411 is a carbon fiber-reinforced thermoplastic filament, which is commonly called "pre-preg." It will be clear to those skilled in the art, however, after reading this disclosure, how to make and use alternative embodiments of the present invention in which the feedstock is a fiber-reinforced pre-preg tape—woven or uni-directional—that is impregnated with thermoplastic resin.

Feedstock 411 comprises cylindrical towpreg of contiguous 12K carbon fiber that is impregnated with thermoplastic resin. The cross-section is circular and has a diameter of 1000 µm. It will be clear to those skilled in the art, however, after reading this disclosure, how to make and use alternative embodiments of the present invention in which the cross-section of the filament is a quadrilateral (e.g., a square, a rectangle, a rhombus, a trapezoid, a kite, a parallelogram, etc.). Furthermore, it will be clear to those skilled in the art how to make and use alternative embodiments of the present invention in which feedstock 411 comprises a different number of fibers (e.g., 1K, 3K, 6K, 24K, etc.). And still furthermore, it will be clear to those skilled in the art how to make and use alternative embodiments of the present invention in which the fibers in feedstock 111 are made of a different material (e.g., fiberglass, aramid, carbon nanotubes, etc.).

In accordance with the first illustrative embodiment, feedstock 411 comprises continuous carbon fiber, but it will be clear to those skilled in the art how to make and use alternative embodiments of the present invention in which feedstock 411 comprises chopped or milled fiber.

In accordance with the first illustrative embodiments, the thermoplastic in feedstock 411 is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature Tg.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When feedstock 411 comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the feedstock comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed article.

In some alternative embodiment of the present invention, the feedstock comprises a metal. For example, and without limitation, the feedstock can be a wire comprising stainless steel, Inconel (nickel/chrome), titanium, aluminum, cobalt chrome, copper, bronze, iron, precious metals (e.g., platinum, gold, silver, etc.).

In accordance with the first illustrative embodiment, the thermoplastic is infused with carbon nano-particles, the purpose of which is two-fold. First, the carbon nano-particles facilitate the absorption of radiant heat from laser beam 471 and laser beam 472. Second, the carbon nano-particles effectively change the reactance of the thermoplastic, which makes the completed article of manufacture more conducive to electro-static powder coating.

Accumulator 412 takes feedstock 411 from feedstock reel 410 and provides it to deposition head 407 with the correct tension for depositing. Accumulator 112 is described in detail by U.S. patent application Ser. No. 16/023,210, entitled "Filament Accumulator or Tensioning Assembly," filed Jun. 29, 2018, and which is incorporated by reference.

Sensor array 415 is a thermal camera that is capable of simultaneously measuring the temperature of:

(i) feedstock region 571-1, and (ii) feedstock region 571-2, and (iii) feedstock region 571-3, and (iv) workpiece region 572-1, and (v) workpiece region 572-2, and (vi) workpiece region 572-3, and (vii) tamping tool 408, sixty (60) times per second and reporting those measurements to controller 409 via sensor cable 454. In accordance with the first illustrative embodiment, sensor array 415 is a FLIR A35 thermal camera, but it will be clear to those skilled in the art, after reading this disclosure, how to make and use alternative embodiments of the present invention in which sensor array 415 comprises different hardware.

Force Gauge 413—is a mechanical strain gauge that continually measures the force of tamping tool 408 on feedstock 411 at nip line segment 581 and reports those measurements back to controller 409 via sensor cable 454. It will be clear to those skilled in the art how to make and use force gauge 413.

Feedstock laser 441 is a variable-power continuous-wave laser that generates laser beam 471 and conveys it to optical instrument 461 via optical cable 451. In accordance with the first illustrative embodiment, feedstock laser 441 is directed by controller 409 to generate laser beam 471 with a specific average power over a given time-interval. In accordance with the first illustrative embodiment, laser beam 471 is characterized by a wavelength $\lambda$=980 nm and has a maximum power output of 400 Watts.

In accordance with the illustrative embodiment, feedstock laser 441 is a continuous-wave laser. It will be clear to those skilled in the art, after reading this disclosure, how to make and use alternative embodiments of the present invention that use a pulsed laser. In any case, it will be clear to those skilled in the art how to make and use feedstock laser 441.

Workpiece laser 442 is a variable-power continuous-wave laser that generates laser beam 472 and conveys it to optical instrument 462 via optical cable 452. In accordance with the first illustrative embodiment, workpiece laser 442 is directed by controller 409 to generate laser beam 472 with a specific average power over a given time-interval. In accordance with the first illustrative embodiment, laser beam 472 is characterized by a wavelength $\lambda$=980 nm and has a maximum power output of 400 Watts.

In accordance with the illustrative embodiment, workpiece laser 442 is a continuous-wave laser. It will be clear to those skilled in the art, after reading this disclosure, how to make and use alternative embodiments of the present invention that use a pulsed laser. In any case, it will be clear to those skilled in the art how to make and use workpiece laser 442.

In accordance with the first illustrative embodiment, feedstock laser 441 and workpiece laser 442 are identical and generate laser beams characterized by the same wavelength. It will be clear to those skilled in the art, however, after reading this disclosure, how to make and use alternative embodiments of the present invention in which the lasers:
  (i) are not identical, or
  (ii) generate laser beams characterized by different wavelengths, or
  (iii) have different maximum power output, or
  (iv) any combination of i, ii, and iii.

Optical cable 451 is a glass fiber, in well-known fashion, that carries laser beam 471 from feedstock laser 441 to optical instrument 461 with substantially no loss. It will be clear to those skilled in the art how to make and use optical cable 451.

Optical cable 452 is a glass fiber, in well-known fashion, that carries the laser beam 472 from workpiece laser 442 to optical instrument 462 with substantially no loss. It will be clear to those skilled in the art how to make and use optical cable 452.

Sensor cable 454 is an electrical cable, in well-known fashion, that carries the measurements from sensor array 415 to controller 409. It will be clear to those skilled in the art how to make and use sensor cable 454.

Optical instrument 461 is an optomechanical machine that comprises optics and actuators that receive laser beam 471 from feedstock laser 441, via optical cable 451, conditions it under the direction of controller 409, and directs it onto the segment of feedstock 411 that is within feedstock region 571-2. In accordance with the first illustrative embodiment, optical instrument 461 comprises:
  (i) an actuator and an optic that, under the direction of controller 409, adjusts the length of the segment of feedstock 411 that is irradiated and heated by laser beam 471 (i.e., adjusts the length of feedstock region 571-2), and
  (ii) an actuator and an optic that, under the direction of controller 409, adjusts the distance between pinch line segment 582 and laser beam 471 (i.e., adjusts the distance between pinch line segment 582 and feedstock region 571-2), and
  (iii) an actuator and an optic that, under the direction of controller 409, adjusts the irradiance within each unit-area of laser beam 471 on feedstock 411, and
  (iv) an actuator and an optic that, under the direction of controller 409, adjusts the angle of incidence of laser beam 471 on feedstock 411.

It will be clear to those skilled in the art, after reading this disclosure, how to make and use optical instrument 461.

Optical instrument 462 is an optomechanical machine that comprises optics and actuators that receive laser beam 472 from workpiece laser 442, via optical cable 452, conditions it, and directs it onto the portion of workpiece 406 that is within workpiece region 572-2, all under the direction of controller 409. In accordance with the first illustrative embodiment, optical instrument 461 comprises:
  (i) an actuator and an optic that, under the direction of controller 409, adjusts the length of the portion of workpiece 406 that is irradiated and heated by laser beam 472 (i.e., adjusts the length of workpiece region 572-2), and
  (ii) an actuator and an optic that, under the direction of controller 409, adjusts the distance between pinch line segment 582 and laser beam 472 (i.e., adjusts the distance between pinch line segment 582 and workpiece region 572-2), and
  (iii) an actuator and an optic that, under the direction of controller 409, adjusts the irradiance within each unit-area of laser beam 472 on workpiece 406, and
  (iv) an actuator and an optic that, under the direction of controller 409, adjusts the angle of incidence of laser beam 472 on workpiece 406, and
  (v) an actuator that steers laser beam 472 onto deposition path 591.

It will be clear to those skilled in the art, after reading this disclosure, how to make and use optical instrument 462.

Feedstock laser control cable 491 is an electrical cable, in well-known fashion, that carries instructions from controller 409 to feedstock laser 441, which instructions control all aspects (e.g., power, etc.) of feedstock laser 441. It will be clear to those skilled in the art how to make and use feedstock laser control cable 491.

Workpiece laser control cable 492 is an electrical cable, in well-known fashion, that carries instructions from controller 409 to workpiece laser 442, which instructions control all aspects (e.g., power, etc.) of workpiece laser 442. It will be clear to those skilled in the art how to make and use feedstock laser control cable 492.

Feedstock region 571-1, feedstock region 571-2, and feedstock region 571-3 are three volumes in space through which feedstock 411 passes.

The length of feedstock region 571-1 is defined as the length of feedstock 411 within feedstock region 571-1. In accordance with the first illustrative embodiment, the length of feedstock region 571-1 is 15 mm, but it will be clear to those skilled in the art, after reading this disclosure, how to make and use alternative embodiments in which the length of feedstock region 571-1 is different.

The length of feedstock region 571-2 is defined as the length of feedstock 411 being irradiated by laser beam 471. In accordance with the first illustrative embodiment, the length of feedstock region 571-2 is continually adjusted by optical instrument 461, all under the direction of controller 409. In accordance with the first illustrative embodiment, the minimum length of feedstock region 571-2 is 5 mm and the maximum length is 15 mm, but it will be clear to those skilled in the art, after reading this disclosure, how to make and use alternative embodiments of the present invention in which the minimum and maximum lengths are different.

The length of feedstock region 571-3 is defined as the length of feedstock 411 within feedstock region 571-3. In accordance with the first illustrative embodiment, the length of feedstock region 571-3 is 10 mm, but it will be clear to those skilled in the art, after reading this disclosure, how to make and use alternative embodiments in which the length of the feedstock region 571-3 is different.

In accordance with the first illustrative embodiment, the distance of feedstock region 571-1 from pinch line segment 582 (as measured along the length of feedstock 411) is 55 mm, but it will be clear to those skilled in the art, after reading this disclosure, how to make and use alternative embodiments in which the distance is different.

In accordance with the first illustrative embodiment, the distance of feedstock region 571-2 from pinch line segment 582 (as measured along the length of feedstock 411) is continually adjusted by optical instrument 461, all under the direction of controller 409. In accordance with the first illustrative embodiment, the minimum distance of feedstock region 571-2 from pinch line segment 582 is 25 mm and the maximum distance is 35 mm, but it will be clear to those skilled in the art, after reading this disclosure, how to make and use alternative embodiments of the present invention in which the minimum and maximum lengths are different.

In accordance with the first illustrative embodiment, the distance of feedstock region 571-3 from pinch line segment 582 (as measured along the length of feedstock 411) is 5 mm but it will be clear to those skilled in the art, after reading this disclosure, how to make and use alternative embodiments in which the distance is different.

Workpiece region 572-1, workpiece region 572-2, and workpiece region 572-3 are three volumes in space through which deposition path 591 passes.

The length of workpiece region 572-1 is defined as the length of deposition path 591 within workpiece region 572-1. In accordance with the first illustrative embodiment, the length of workpiece region 572-1 is 15 mm, but it will be clear to those skilled in the art, after reading this disclosure, how to make and use alternative embodiments in which the length of workpiece region 572-1 is different.

The length of workpiece region 572-2 is defined as the length of deposition path 591 being irradiated by laser beam 472. In accordance with the first illustrative embodiment, the length of workpiece region 572-2 is continually adjusted by optical instrument 462, all under the direction of controller 409. In accordance with the first illustrative embodiment, the minimum length of workpiece region 572-2 is 5 mm and the maximum length is 15 mm, but it will be clear to those skilled in the art, after reading this disclosure, how to make and use alternative embodiments of the present invention in which the minimum and maximum lengths are different.

The length of workpiece region 572-3 is defined as the length of deposition path 591 within workpiece region 572-3. In accordance with the first illustrative embodiment, the length of workpiece region 572-3 is 10 mm, but it will be clear to those skilled in the art, after reading this disclosure, how to make and use alternative embodiments in which the length of the workpiece region 572-3 is different.

In accordance with the first illustrative embodiment, the distance of workpiece region 572-1 from pinch line segment 582 (as measured along the length of deposition path 591) is 55 mm, but it will be clear to those skilled in the art, after reading this disclosure, how to make and use alternative embodiments in which the distance is different.

In accordance with the first illustrative embodiment, the distance of workpiece region 572-2 from pinch line segment 582 (as measured along the length of deposition path 591) is continually adjusted by optical instrument 462, all under the direction of controller 409. In accordance with the first illustrative embodiment, the minimum distance of workpiece region 572-2 from pinch line segment 582 is 25 mm and the maximum distance is 35 mm, but it will be clear to those skilled in the art, after reading this disclosure, how to make and use alternative embodiments of the present invention in which the minimum and maximum lengths are different.

Nip line segment 581 is the line segment on the circumferential surface of tamping tool 408 where tamping tool 408 exerts the maximum radial force on feedstock 411.

Pinch line segment 582 is the line segment on the circumferential surface of tamping tool 408 where tamping tool 408 first pinches a unit-length of feedstock 411 between tamping tool 408 and workpiece 406 so that any movement of feedstock 411 parallel to the rotational axis of tamping tool 408 is substantially constrained.

Deposition path 591 is a line on the surface of workpiece 406 where feedstock 411 is to be deposited and tamped. In FIG. 5b, deposition path 591 curves to the left. In contrast, in FIG. 6, deposition path 591 curves to the right.

Figure 7:
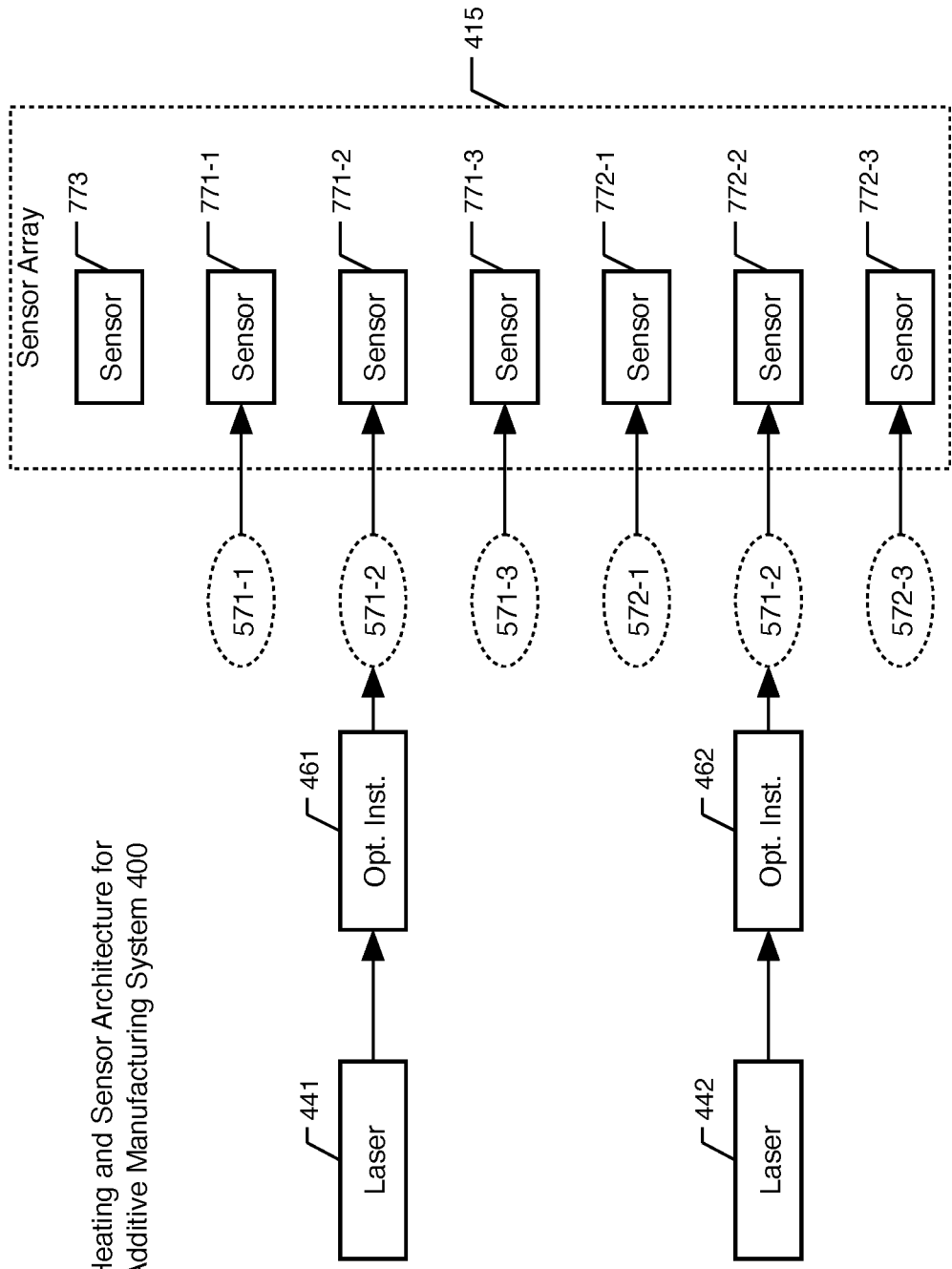
FIG. 7 depicts a schematic diagram of the heating and sensor architecture for additive manufacturing system 400, which irradiates and heats feedstock 411 and workpiece 406 and measures the temperature of feedstock 411 and workpiece 406.

FIG. 7 depicts a schematic diagram of the heating and sensor architecture for additive manufacturing system 400, which irradiates and heats feedstock 411 and workpiece 406 and measures the temperature of feedstock 411, workpiece 406, and tamping tool 408.

As shown in FIG. 7, feedstock laser 441 provides laser beam 471 to optical instrument 461 via optical cable 451 in well-known fashion, and workpiece laser 442 provides laser beam 472 to optical instrument 462 via optical cable 452.

Under the direction of controller 409, optical instrument 461 irradiates and heats the segment of feedstock that is within feedstock region 571-2, and optical instrument 462 irradiates and heats the portion of workpiece 406 that is within workpiece region 572-2.

Thermal sensor 771-1 periodically measures the temperature of the segment of feedstock that is within feedstock region 571-1 and reports those measurements back to controller 409. Thermal sensor 771-2 periodically measures the temperature of the segment of feedstock that is within feedstock region 571-2 and reports those measurements back to controller 409. Thermal sensor 771-3 periodically measures the temperature of the segment of feedstock that is within feedstock region 571-3 and reports those measurements back to controller 409.

Thermal sensor 772-1 periodically measures the temperature of that portion of workpiece 406 that is within workpiece region 572-1 and reports those measurements back to controller 409. Thermal sensor 772-2 periodically measures the temperature of that portion of workpiece 406 that is within workpiece region 572-2 and reports those measurements back to controller 409. Thermal sensor 772-3 periodically measures the temperature of that portion of workpiece 406 that is within workpiece region 572-3 and reports those measurements back to controller 409.

Thermal sensor 773 periodically measures the temperature of tamping tool 408 and reports those measurements back to controller 409.

Although the first illustrative embodiment measures the temperature of three segments of feedstock 411, it will be clear to those skilled in the art, after reading this disclosure, how to make and use alternative embodiments of the present invention that measure any number (e.g., four, five, six, eight, ten, twelve, etc.) of segments. Although the first illustrative embodiment measures the temperature of three portions of workpiece 406, it will be clear to those skilled in the art, after reading this disclosure, how to make and use alternative embodiments of the present invention that measure any number (e.g., four, five, six, eight, ten, twelve, etc.) of portions.

In accordance with the first illustrative embodiment, the temperature measurements are made periodically at sixty (60) times per second, but it will be clear to those skilled in the art, after reading this disclosure, how to make and use alternative embodiments of the present invention that make periodic measurements at a different rate or that make measurements aperiodically or sporadically.

Figure 8:
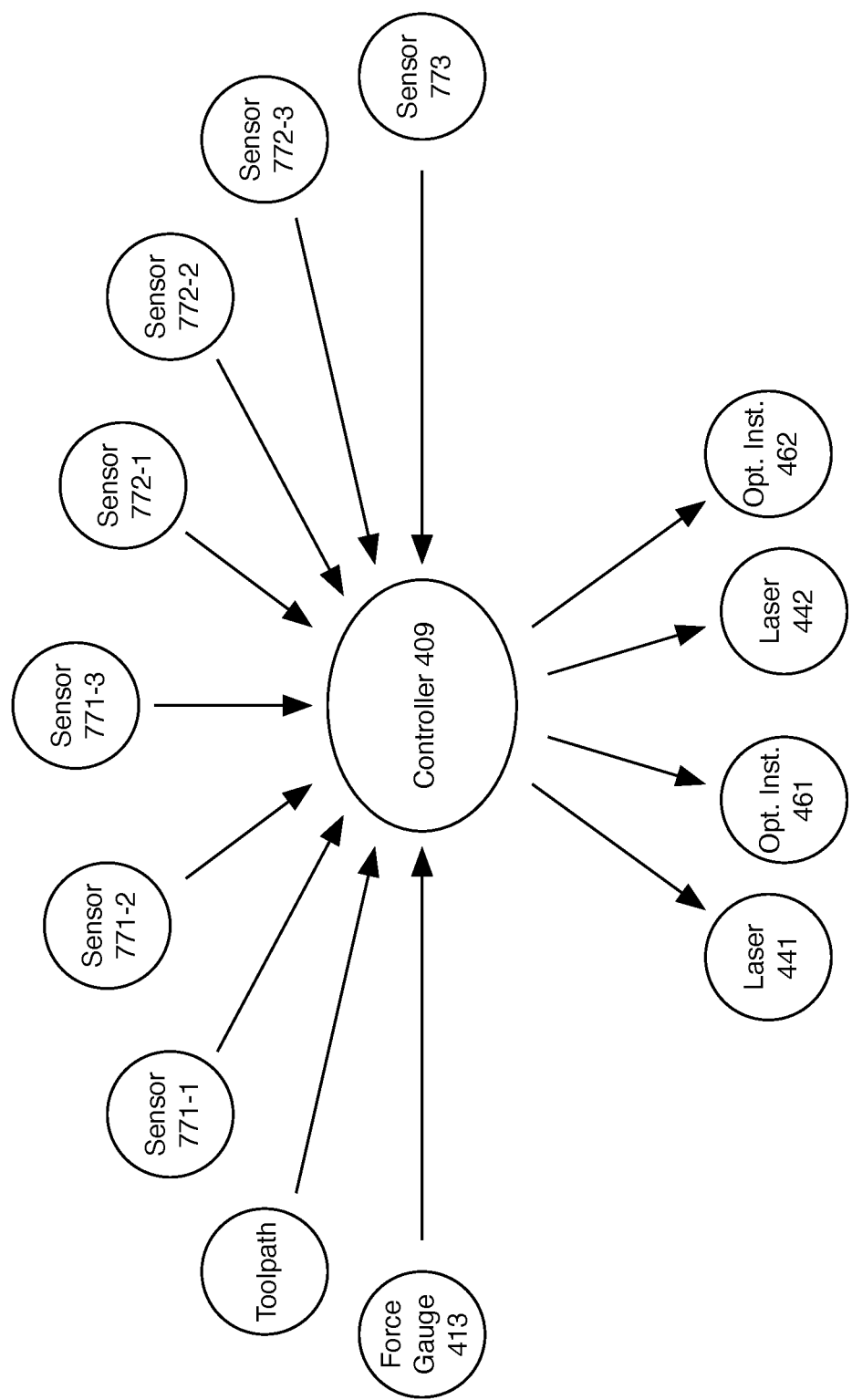
FIG. 8 depicts a schematic diagram of the sensor and control architecture for that portion of additive manufacturing system 400 that irradiates and heats feedstock 411 and workpiece 406.

FIG. 8 depicts a schematic diagram of the sensor and control architecture for that portion of additive manufacturing system 400 that irradiates and heats feedstock 411 and workpiece 406.

In accordance with the first illustrative embodiment, controller 409 uses a combination of feedforward and feedback to continually direct:
 (i) feedstock laser 441 to adjust the average power of laser beam 471 on the segment of feedstock that is within feedstock region 571-2, and
 (ii) optical instrument 461 to adjust the length of feedstock region 571-2, and
 (iii) optical instrument 461 to adjust the distance between pinch line segment 582 and feedstock region 571-2, and
 (iv) optical instrument 461 to adjust the irradiance of laser beam 471 on the segment of feedstock 411 within feedstock region 571-2, and
 (v) optical instrument 461 to adjust the angle of incidence of laser beam 471 on the segment of feedstock 411 within feedstock region 571-2, and
 (vi) workpiece laser 442 to adjust the average power of laser beam 472 on the portion of workpiece that is within workpiece region 572-2, and
 (vii) optical instrument 462 to adjust the length of workpiece region 572-2, and
 (viii) optical instrument 462 to adjust the distance between pinch line segment 582 and workpiece region 572-2, and
 (ix) optical instrument 462 to adjust the irradiance of laser beam 472 on the portion of workpiece 406 within workpiece region 572-2, and
 (x) optical instrument 462 to adjust the angle of incidence of laser beam 472 on the portion of workpiece 406 within workpiece region 572-2, and
 (xi) optical instrument 462 to steer laser beam 472 onto deposition path 591, and
 (xii) accumulator 412 to feed feedstock 411 to deposition head 407, and
 (xiii) robot 403 to advance tamping tool 408 to deposit and tamp feedstock 411 onto workpiece 406, and based on:
 (i) knowledge of the toolpath (e.g., G-code, etc.) for the article of manufacture to be printed (and the geometry of the workpiece at each time-interval, which can be derived from that toolpath), and
 (ii) a thermal model of the feedstock 411, and
 (iii) a location-specific thermal model of each portion on workpiece 406 onto which feedstock 411 will be deposited and tamped (which can be derived from the thermal model of the feedstock 411 and the geometry of the workpiece at each instant during fabrication), and
 (iv) periodic measurements of the temperature of the segment of feedstock 411 that is within feedstock region 571-1, and
 (v) periodic measurements of the temperature of the segment of feedstock 411 that is within feedstock region 571-2, and
 (vi) periodic measurements of the temperature of the segment of feedstock 411 that is within feedstock region 571-3, and
 (vii) periodic measurements of the temperature of that portion of workpiece that is within workpiece region 572-1, and
 (viii) periodic measurements of the temperature of that portion of workpiece that is within workpiece region 572-2, and
 (ix) periodic measurements of the temperature of that portion of workpiece that is within workpiece region 572-3, and
 (x) periodic measurements of the temperature of tamping tool 408, and
 (xi) periodic measurements of the force of tamping tool 408 on feedstock 411 at nip line segment 581.

It will be clear to those skilled in the art, after reading this disclosure, how to make and use embodiments of the present invention that accomplish this, whether with traditional imperative programming or with an artificial neural network.

With regard to feedforward, controller 409 takes as input:
 (i) the toolpath (e.g., G-code, etc.) for the article of manufacture to be printed, in well-known fashion, and
 (ii) a thermal model of the feedstock, which itself is based on, among other things, the thermal properties of the resin, the mass of resin per unit-length of feedstock, the profile of the feedstock (e.g., filament, tape, circular, rectangular, etc.), the thermal properties of the reinforcing fibers, the number of fibers per unit-length of feedstock, the mass of the fibers per unit-length of feedstock, and the length and orientation of the fibers in the feedstock (e.g., continuous, chopped, medium, ball milled, etc.), and generates therefrom:
 (i) a prediction of whether feedstock 411 will be deposited at a uniform or non-uniform rate at each instant during the printing of the article of manufacture (because, for example and without limitation, the deposition starts and stops, accelerates, decelerates and occurs uniformly because of turns, contours, cuts, etc.), and
 (ii) a prediction of the speed (e.g., in millimeters per second, etc.) at which feedstock 411 will be deposited at each instant during the printing of the article of manufacture, and
 (iii) a prediction of the interval of time between when each segment of feedstock 411 is irradiated and heated and when the segment is deposited and tamped, and
 (iv) a prediction of the interval of time between when each portion of workpiece 406 is irradiated and heated and when feedstock 411 is deposited and tamped onto that portion of workpiece 406, and (v) a location-specific thermal model of each portion on workpiece 406 onto which feedstock 411 will be deposited and tamped, which itself is based on, among other things, the thermal model of the feedstock and the shape and mass of the workpiece in the vicinity of each portion to be irradiated and heated, which is derived from a model of the nascent article of manufacture (i.e., workpiece) at each step of printing, which is derived from the toolpath.

With regard to feedback, controller 409 takes as input:
(i) the thermal model of the feedstock, and
(ii) the location-specific thermal model of each portion on workpiece 406 onto which feedstock 411 will be deposited and tamped, and
(iii) periodic measurements of the temperature of the segment of feedstock 411 that is within feedstock region 571-1, and
(iv) periodic measurements of the temperature of the segment of feedstock 411 that is within feedstock region 571-2, and
(v) periodic measurements of the temperature of the segment of feedstock 411 that is within feedstock region 571-3, and
(vi) periodic measurements of the temperature of that portion of workpiece that is within workpiece region 572-1, and
(vii) periodic measurements of the temperature of that portion of workpiece that is within workpiece region 572-2, and
(viii) periodic measurements of the temperature of that portion of workpiece that is within workpiece region 572-3, and
(ix) the periodic measurements of the temperature of tamping tool 408, and
(x) periodic measurements of the force of tamping tool 408 on feedstock 411 at nip line segment 581.

It will be clear to those skilled in the art, after reading this disclosure, how to make and use a thermal model of the feedstock, a location-specific thermal model of each portion on workpiece 406 onto which feedstock 411 will be deposited and tamped, a prediction of whether the feedstock will be deposited at a uniform or non-uniform rate, a prediction of the speed at which the feedstock is deposited, and a prediction of the interval between when each segment of feedstock and each portion of the workpiece is irradiated and heated and when the segment is deposited and tamped onto the portion of the workpiece.

Figure 9:
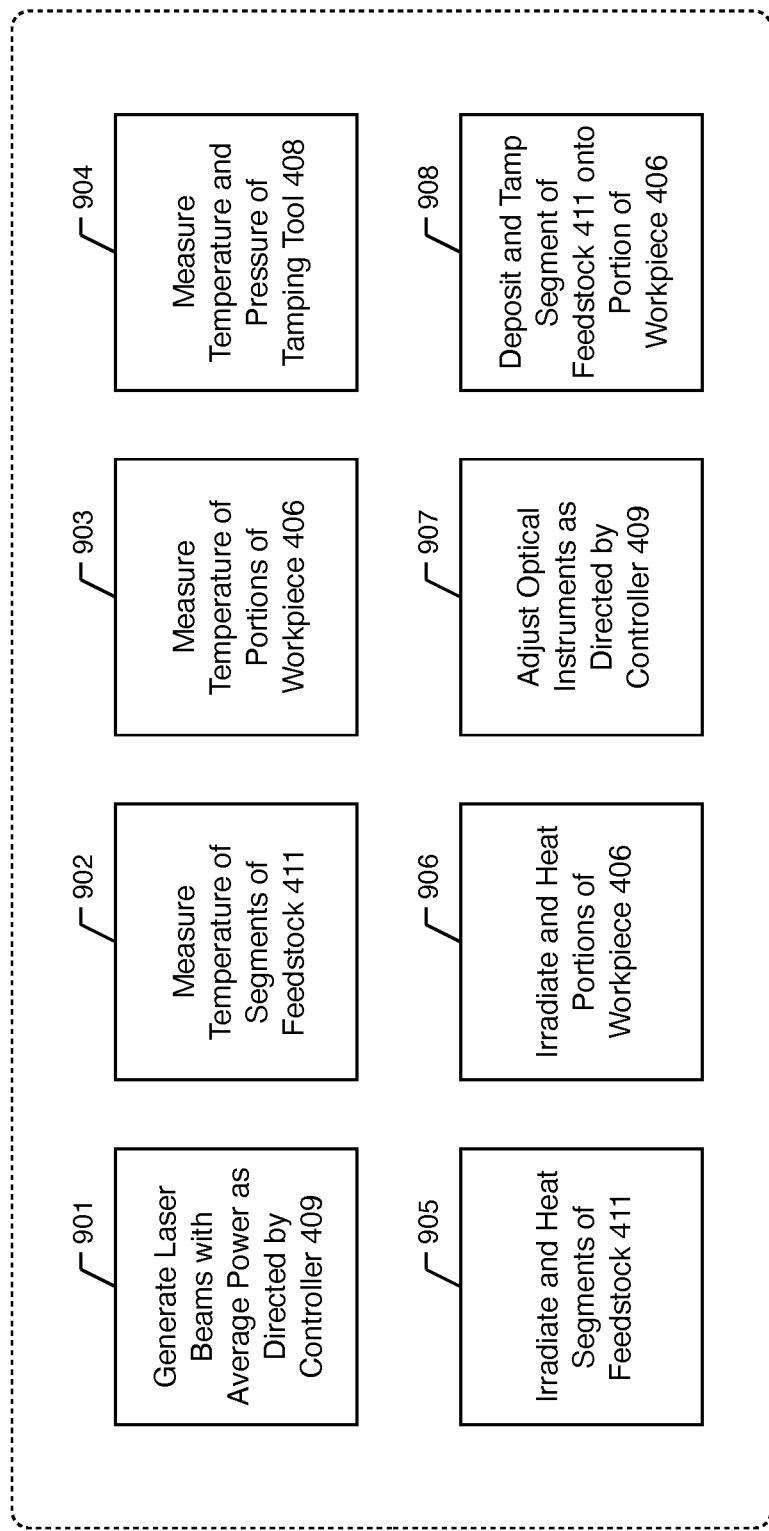
FIG. 9 depicts a flowchart of the tasks performed by additive manufacturing system 400. Because additive manufacturing system 400 concurrently performs tasks on different segments of feedstock 411 and different portions of workpiece 406, the tasks depicted in FIG. 9 are concurrent.

FIG. 9 depicts a flowchart of the tasks performed by additive manufacturing system 400. Because additive manufacturing system 400 concurrently performs tasks on different segments of feedstock 411 and different portions of workpiece 406, the tasks depicted in FIG. 9 are concurrent.

At task 901:
(i) feedstock laser 441 generates laser beam 471 with an average power during each time-interval, and
(ii) workpiece laser 442 generates laser beam 472 with an average power during each time-interval, and
both as directed by controller 409. It will be clear to those skilled in the art, after reading this disclosure, how to make and use embodiments of the present invention that perform task 901.

At task 902, thermal sensor 771-1 periodically measures the temperature of the segment of feedstock 411 that is within feedstock region 571-1 and reports those measurements to controller 409. Additionally, thermal sensor 771-2 periodically measures the temperature of the segment of feedstock 411 that is within feedstock region 571-2 and reports those measurements to controller 409. And furthermore, thermal sensor 771-3 periodically measures the temperature of the segment of feedstock 411 that is within feedstock region 571-3 and reports those measurements to controller 409. It will be clear to those skilled in the art, after reading this disclosure, how to make and use embodiments of the present invention that perform task 901.

At task 903, thermal sensor 772-1 periodically measures the temperature of that portion of workpiece 406 that is within workpiece region 572-1 and reports those measurements to controller 409. Additionally, thermal sensor 772-2 periodically measures the temperature of that portion of workpiece 406 that is within workpiece region 572-2 and reports those measurements to controller 409. And furthermore, thermal sensor 772-3 periodically measures the temperature of that portion of workpiece 406 that is within workpiece region 572-3 and reports those measurements to controller 409. It will be clear to those skilled in the art, after reading this disclosure, how to make and use embodiments of the present invention that perform task 901.

At task 904, thermal sensor 773 periodically measures the temperature of tamping tool 408 and reports those measurements back to controller 409. Additionally, force gauge 413 periodically measures the force of tamping tool 408 on feedstock 411 at nip line segment 581 and reports those measurements back to controller 409.

At task 905, optical instrument 461 irradiates and heats the segment of feedstock 411 that is within feedstock region 571-2 as directed by controller 409. It will be clear to those skilled in the art, after reading this disclosure, how to make and use embodiments of the present invention that perform task 905.

At task 906, optical instrument 462 irradiates and heats the portion of workpiece 406 that is within workpiece region 572-2 as directed by controller 409. It will be clear to those skilled in the art, after reading this disclosure, how to make and use embodiments of the present invention that perform task 906.

At task 907:
(i) optical instrument 461 adjusts a trait of laser beam 471 and/or the relationship of laser beam 471 to the segment of feedstock 411 within feedstock region 571-2, and
(ii) optical instrument 462 adjusts a trait of laser beam 472 and/or the relationship of laser beam 472 to the portion of workpiece 406 within workpiece region 572-2, and
both as directed by controller 409. Task 907 is described in detail in FIG. 10 and in the accompanying text.

At task 908, additive manufacturing system 400 deposits a segment of feedstock 411 onto a portion of workpiece 406 and tamps the segment onto the workpiece with tamping tool 408. It will be clear to those skilled in the art, after reading this disclosure, how to make and use embodiments of the present invention that perform task 908.

Figure 10:
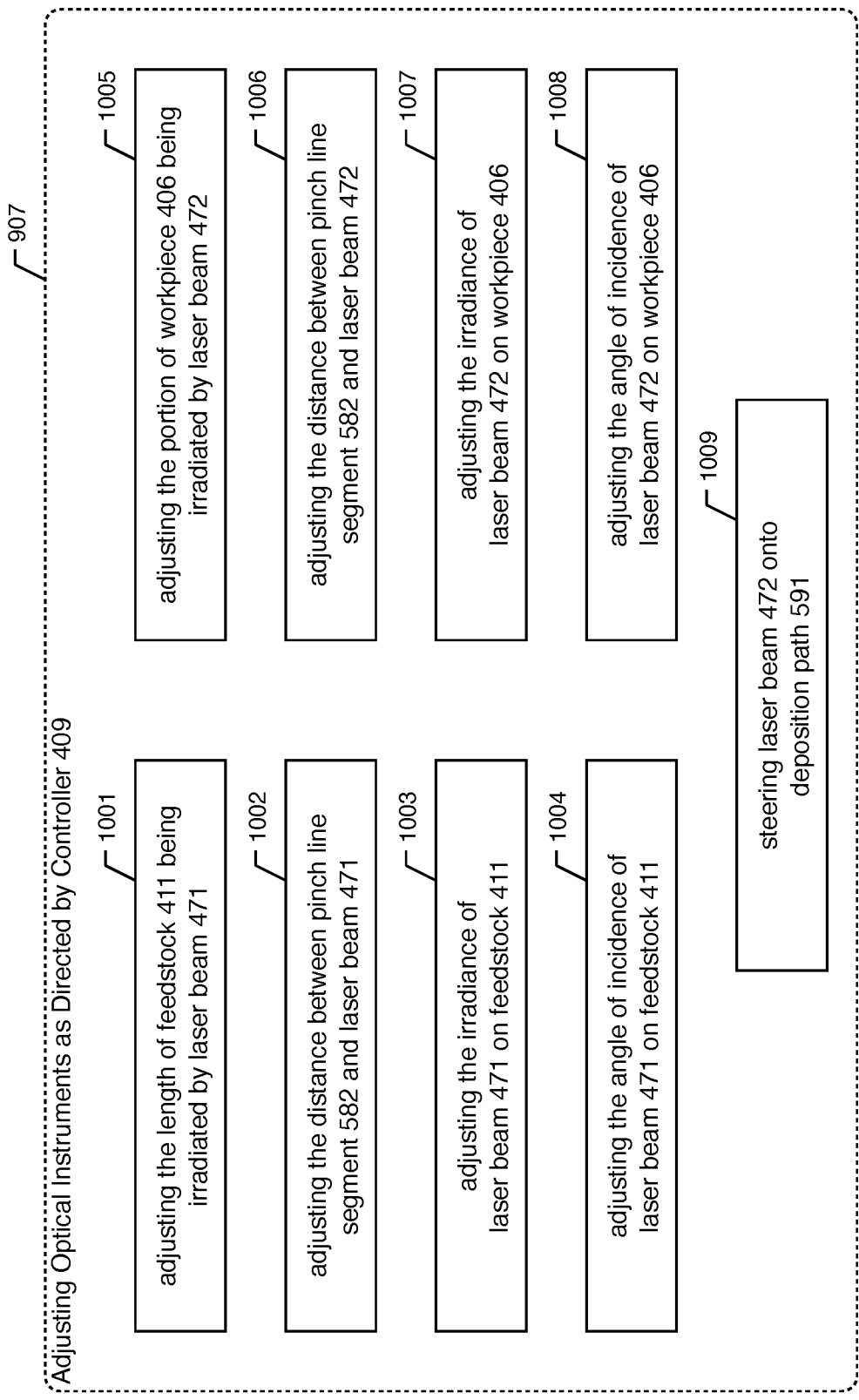
FIG. 10 depicts a flowchart of the details of task 907—adjusting optical instrument 461 and optical instrument 462, as directed by controller 409.

FIG. 10 depicts a flowchart of the details of task 907—adjusting optical instrument 461 and optical instrument 462, as directed by controller 409. Controller 409 continually directs optical instrument 461 and optical instrument 462 to make adjustments, and, therefore, the tasks depicted in FIG. 10 are concurrent.

At task 1001, controller 409 directs optical instrument 461 to adjust—lengthen or shorten—the length of feedstock region 571-2 (i.e., the length of feedstock 411 being irradiated by laser beam 471). This provides controller 409 with a mechanism for adjusting the temperature of each unit-length of feedstock 411 when it is deposited and tamped. For example—and assuming that everything else is constant—increasing the length of feedstock region 571-2 spreads the heat energy of laser beam 471 over a greater length of feedstock, which decreases the rate at which each unit-length of feedstock is heated. Conversely, decreasing the length of feedstock region 571-2 concentrates the heat energy, which increases the rate at which each unit-length of feedstock is heated. It will be clear to those skilled in the art, after reading this disclosure, that being able to adjust the length of feedstock region 571-2 is advantageous for, among other things, compensating for variations in the rate at which feedstock 411 is deposited and tamped.

At task 1002, controller 409 directs optical instrument 461 to adjust—increase or decrease—the distance between pinch line segment 582 and feedstock region 571-2. This provides controller 409 with a mechanism for adjusting the temperature of each unit-length of feedstock 411 when it is deposited and tamped. For example—and assuming everything else is constant—increasing the distance gives each unit-length of feedstock more time to cool before it is deposited and tamped. Conversely, decreasing the distance gives each unit segment of feedstock less time to cool before it is deposited and tamped. It will be clear to those skilled in the art, after reading this disclosure, that being able to adjust the distance between pinch line segment 582 and feedstock region 571-2 is advantageous for, among other things, fine tuning the temperature of each unit-length of feedstock 411 at the time that it is deposited and tamped.

At task 1003, controller 409 directs optical instrument 461 to adjust the irradiance of laser beam 471 on each unit-length of feedstock 411 within feedstock region 571-2. This provides controller 409 with a mechanism for adjusting the temperature of each unit-length of feedstock 411 when it is deposited and tamped. For example—and assuming everything else is constant—increasing the irradiance on a unit-length of feedstock 411 increases the rate at which it is heated. Conversely, decreasing the irradiance on a unit-length of feedstock 411 decreases the rate at which it is heated. It will be clear to those skilled in the art, after reading this disclosure, that being able to adjust the irradiance of laser beam 471 on feedstock 411 is advantageous for, among other things, compensating for variations in the angle of incidence of laser beam 471 on feedstock 411 caused by changes in the relative position of optical instrument 461 to feedstock 411. These changes are often caused by changes in the contour of workpiece 406.

At task 1004, controller 409 directs optical instrument 461 to adjust the angle of incidence of laser beam 471 on feedstock 411 within feedstock region 571-2. This provides controller 409 with another mechanism for adjusting the temperature of each unit-length of feedstock 411 when it is deposited and tamped. For example—and assuming everything else is constant—adjusting the angle of incidence of laser beam 471 on feedstock 411 changes the effective irradiance on each unit-length of feedstock 411. It will be clear to those skilled in the art, after reading this disclosure, that being able to adjust the angle of incidence of laser beam 471 on feedstock 411 is advantageous for, among other things, compensating for changes in the relative position of optical instrument 461 to feedstock 411. These changes are often caused by changes in the contour of workpiece 406.

At task 1005, controller 409 directs optical instrument 462 to adjust—lengthen or shorten—the length of workpiece region 572-2 (i.e., the portion of workpiece 406 being irradiated by laser beam 472). This provides controller 409 with a mechanism for adjusting the temperature of each unit portion of workpiece 406 when it is deposited and tamped. For example—and assuming that everything else is constant—increasing the length of workpiece region 572-2 spreads the heat energy of laser beam 472 over a greater portion of workpiece 406, which decreases the rate at which each unit portion of workpiece 406 is heated. Conversely, decreasing the length of workpiece region 572-2 concentrates the heat energy, which increases the rate at which each unit portion of workpiece 406 is heated. It will be clear to those skilled in the art, after reading this disclosure, that being able to adjust the length of workpiece region 572-2 is advantageous for, among other things, compensating for variations in the rate at which feedstock 411 is deposited and tamped.

At task 1006, controller 409 directs optical instrument 462 to adjust—increase or decrease—the distance between pinch line 582 and workpiece region 572-2. This provides controller 409 with a mechanism for adjusting the temperature of each unit portion of workpiece 406 when it is deposited and tamped. For example—and assuming everything else is constant—increasing the distance gives each unit portion of workpiece 406 more time to cool before it is deposited and tamped. Conversely, decreasing the distance gives each unit segment of feedstock less time to cool before it is deposited and tamped. It will be clear to those skilled in the art, after reading this disclosure, that being able to adjust the distance between pinch line segment 582 and workpiece region 572-2 is advantageous for, among other things, fine tuning the temperature of each unit portion of workpiece 406 at the time that the corresponding segment of feedstock 411 is deposited and tamped.

At task 1007, controller 409 directs optical instrument 462 to adjust the irradiance of laser beam 472 on each unit portion of workpiece 406 within workpiece region 572-2. This provides controller 409 with a mechanism for adjusting the temperature of each unit portion of workpiece 406 at the time that the corresponding segment of feedstock 411 is deposited and tamped. For example—and assuming everything else is constant—increasing the irradiance on a unit portion of workpiece 406 increases the rate at which it is heated. Conversely, decreasing the irradiance on a unit-area of workpiece 406 decreases the rate at which it is heated. It will be clear to those skilled in the art, after reading this disclosure, that being able to adjust the irradiance of laser beam 472 on is advantageous for, among other things, compensating for variations in the angle of incidence of laser beam 472 on caused by changes in the relative position of optical instrument 462 to. These changes are often caused by changes in the contour of workpiece 406.

At task 1008, controller 409 directs optical instrument 462 to adjust the angle of incidence of laser beam 472 on workpiece 406 within workpiece region 572-2. This provides controller 409 with another mechanism for adjusting the temperature of each unit portion of workpiece 406 when it is deposited and tamped. For example—and assuming everything else is constant—adjusting the angle of incidence of laser beam 472 on workpiece 406 changes the effective irradiance on each unit portion of workpiece 406. It will be clear to those skilled in the art, after reading this disclosure, that being able to adjust the angle of incidence of laser beam 472 on workpiece 406 is advantageous for, among other things, compensating for changes in the relative position of optical instrument 462 to workpiece 406. These changes are often caused by changes in the contour of workpiece 406.

At task 1009, controller 409 directs optical instrument 462 to steer workpiece laser beam 472 onto deposition path 591.

In accordance with the first illustrative embodiment, sensor array 415 is not mechanically steered onto workpiece region 572-1, workpiece region 572-2, or workpiece region 572-3. Instead, controller 409 picks the temperature measurements for workpiece region 572-1, workpiece region 572-2, or workpiece region 572-3 out of the thermal image from sensor array 415 based on the location of deposition path 591 in that image. It will be clear to those skilled in the art, after reading this disclosure, how to accomplish this.

Figure 11:
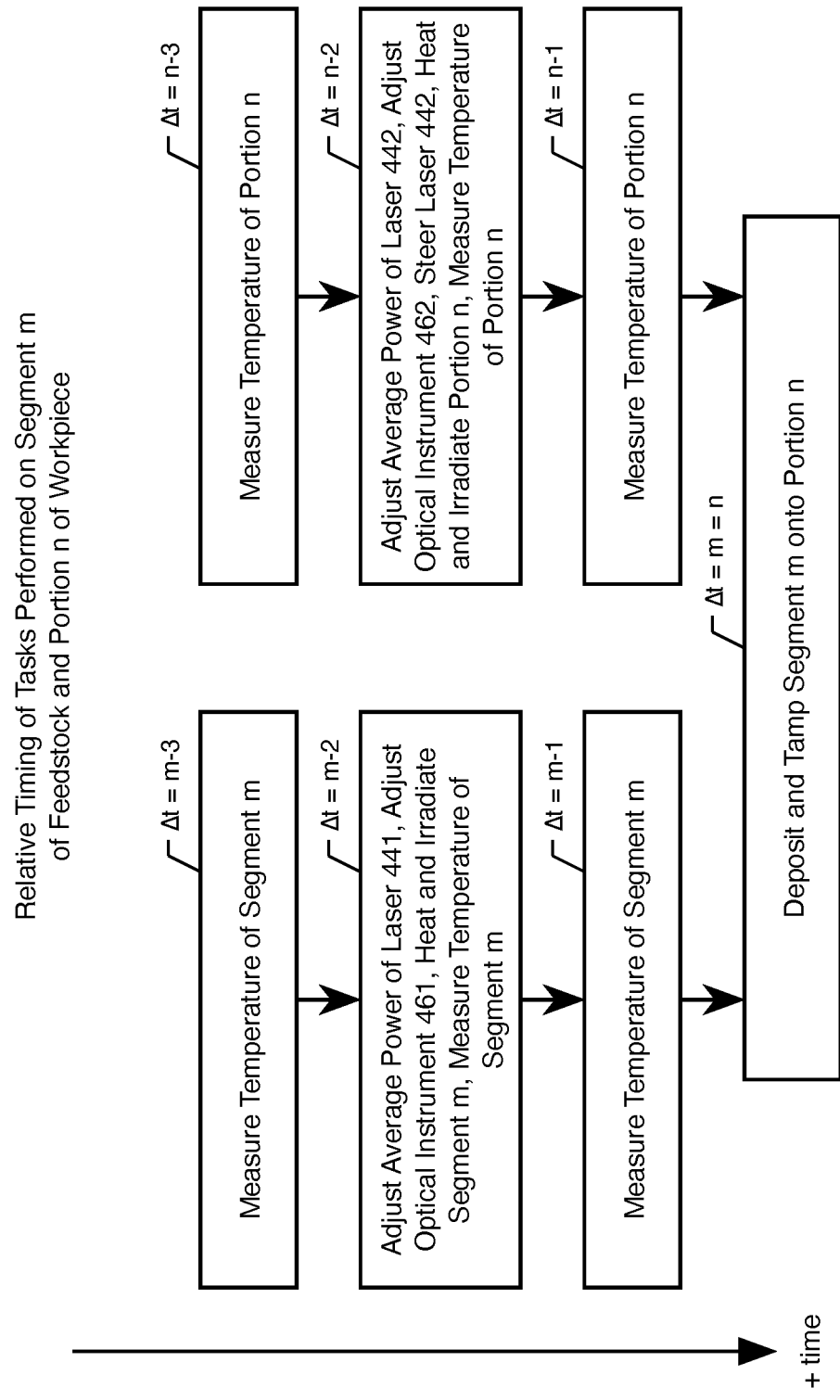
FIG. 11 depicts a flowchart of the relative timing of the tasks performed on segment m of feedstock 411 and on portion n of workpiece 406, wherein m and n are integers. In accordance with the first illustrative embodiment segment m of feedstock 411 is deposited and tamped onto portion n of workpiece 406.

FIG. 11 depicts a flowchart of the relative timing of the tasks performed on segment m of feedstock 411 and on portion n of workpiece 406, wherein m and n are integers. In accordance with the first illustrative embodiment segment m of feedstock 411 is deposited and tamped onto portion n of workpiece 406.

During time-interval $\Delta t=m-3$, the temperature of segment m of feedstock 411 is measured by thermal sensor 771-1 and reported to controller 409.

During time-interval $\Delta t=n-3$, the temperature of portion n of workpiece 406 is measured by thermal sensor 772-1 and reported to controller 409.

In accordance with the first illustrative embodiment, the duration of time-interval $\Delta t=m-3$ equals the duration of time-interval $\Delta t=n-3$, and time-interval $\Delta t=m-3$ is contemporaneous with time-interval $\Delta t=n-3$. It will be clear to those skilled in the art, however, after reading this disclosure, how to make and use alternative embodiments of the present invention in which the duration of time-interval $\Delta t=m-3$ does not equal the duration of time-interval $\Delta t=n-3$. Furthermore, it will be clear to those skilled in the art, after reading this disclosure, how to make and use alternative embodiments of the present invention in which time-interval $\Delta t=m-3$ is not contemporaneous with time-interval $\Delta t=n-3$. And still furthermore, it will be clear to those skilled in the art, after reading this disclosure, how to make and use alternative embodiments of the present invention in which time-interval $\Delta t=m-3$ overlaps, immediately precedes, immediately succeeds, precedes but not immediately, or succeeds but not immediately time-interval $\Delta t=n-3$.

During time-interval $\Delta t=m-2$:
 (i) controller 409 directs feedstock laser 441 to generate laser beam 471 with a given average power, and
 (ii) controller 409 directs optical instrument 461 to adjust a trait of laser beam 471 and/or the relationship of laser beam 471 to feedstock 411, and
 (iii) optical instrument 461 irradiates and heats segment m of feedstock 411, and
 (iv) the temperature of segment m of feedstock 411 is measured by thermal sensor 771-2 and reported to controller 409.

In accordance with the first illustrative embodiment, the duration of time-interval $\Delta t=m-2$ equals the duration of $\Delta t=m-3$. It will be clear to those skilled in the art, however, after reading this disclosure, how to make and use alternative embodiments of the present invention in which the duration of time-interval $\Delta t=m-2$ does not equal the duration of time interval $\Delta t=m-3$. Furthermore, in accordance with the first illustrative embodiment, time-interval $\Delta t=m-2$ is after, and is mutually-exclusive of, time-interval $\Delta t=m-3$. It will be clear to those skilled in the art, however, after reading this disclosure, how to make and use alternative embodiments of the present invention in which time-interval $\Delta t=m-2$ overlaps, immediately succeeds, or succeeds but not immediately, time-interval $\Delta t=m-3$.

During time-interval $\Delta t=n-2$:
 (i) controller 409 directs workpiece laser 442 to generate laser beam 472 with a given average power, and
 (ii) controller 409 directs optical instrument 462 to adjust a trait of laser beam 472 and/or the relationship of laser beam 472 to workpiece 406, and
 (iii) controller 409 directs optical instrument 462 to steer laser beam 472 onto deposition path 591, and
 (iv) optical instrument 462 irradiates and heats portion n of workpiece 406, and
 (v) the temperature of portion n of workpiece 406 is measured by thermal sensor 772-2 and reported to controller 409.

In accordance with the first illustrative embodiment, the duration of time-interval $\Delta t=n-2$ equals the duration of $\Delta t=n-3$. It will be clear to those skilled in the art, however, after reading this disclosure, how to make and use alternative embodiments of the present invention in which the duration of time-interval $\Delta t=n-2$ does not equal the duration of time interval $\Delta t=n-3$. Furthermore, in accordance with the first illustrative embodiment, time-interval $\Delta t=n-2$ is after, and is mutually-exclusive of, time-interval $\Delta t=n-3$. It will be clear to those skilled in the art, however, after reading this disclosure, how to make and use alternative embodiments of the present invention in which time-interval $\Delta t=n-2$ overlaps, immediately succeeds, or succeeds but not immediately, time-interval $\Delta t=n-3$.

In accordance with the first illustrative embodiment, the duration of time-interval $\Delta t=m-2$ equals the duration of time-interval $\Delta t=n-2$, and time-interval $\Delta t=m-2$ is contemporaneous with time-interval $\Delta t=n-2$. It will be clear to those skilled in the art, however, after reading this disclosure, how to make and use alternative embodiments of the present invention in which the duration of time-interval $\Delta t=m-2$ does not equal the duration of time-interval $\Delta t=n-2$. Furthermore, it will be clear to those skilled in the art, after reading this disclosure, how to make and use alternative embodiments of the present invention in which time-interval $\Delta t=m-2$ is not contemporaneous with time-interval $\Delta t=n-2$. And still furthermore, it will be clear to those skilled in the art, after reading this disclosure, how to make and use alternative embodiments of the present invention in which time-interval $\Delta t=m-2$ overlaps, immediately precedes, immediately succeeds, precedes but not immediately, or succeeds but not immediately time-interval $\Delta t=n-2$.

During time-interval $\Delta t=m-1$, the temperature of segment m of feedstock 411 is measured by thermal sensor 771-3 and reported to controller 409.

In accordance with the first illustrative embodiment, the duration of time-interval $\Delta t=m-1$ equals the duration of $\Delta t=m-2$. It will be clear to those skilled in the art, however, after reading this disclosure, how to make and use alternative embodiments of the present invention in which the duration of time-interval $\Delta t=m-1$ does not equal the duration of time interval $\Delta t=m-2$. Furthermore, in accordance with the first illustrative embodiment, time-interval $\Delta t=m-1$ is after, and is mutually-exclusive of, time-interval $\Delta t=m-2$. It will be clear to those skilled in the art, however, after reading this disclosure, how to make and use alternative embodiments of the present invention in which time-interval $\Delta t=m-1$ overlaps, immediately succeeds, or succeeds but not immediately, time-interval $\Delta t=m-2$.

During time-interval $\Delta t=n-1$, the temperature of portion n of workpiece 406 is measured by thermal sensor 772-3 and reported to controller 409.

In accordance with the first illustrative embodiment, the duration of time-interval $\Delta t=n-1$ equals the duration of $\Delta t=n-2$. It will be clear to those skilled in the art, however, after reading this disclosure, how to make and use alternative embodiments of the present invention in which the duration of time-interval Δt=n−1 does not equal the duration of time interval Δt=n−2. Furthermore, in accordance with the first illustrative embodiment, time-interval Δt=n−1 is after, and is mutually-exclusive of, time-interval Δt=n−2. It will be clear to those skilled in the art, however, after reading this disclosure, how to make and use alternative embodiments of the present invention in which time-interval Δt=n−1 overlaps, immediately succeeds, or succeeds but not immediately, time-interval Δt=n−2.

In accordance with the first illustrative embodiment, the duration of time-interval Δt=m−1 equals the duration of time-interval Δt=n−1, and time-interval Δt=m−1 is contemporaneous with time-interval Δt=n−1. It will be clear to those skilled in the art, however, after reading this disclosure, how to make and use alternative embodiments of the present invention in which the duration of time-interval Δt=m−1 does not equal the duration of time-interval Δt=n−1. Furthermore, it will be clear to those skilled in the art, after reading this disclosure, how to make and use alternative embodiments of the present invention in which time-interval Δt=m−1 is not contemporaneous with time-interval Δt=n−1. And still furthermore, it will be clear to those skilled in the art, after reading this disclosure, how to make and use alternative embodiments of the present invention in which time-interval Δt=m−1 overlaps, immediately precedes, immediately succeeds, precedes but not immediately, or succeeds but not immediately time-interval Δt=n−1.

During time-interval Δt=m=n, segment m of feedstock 411 is deposited and tamped onto portion n of workpiece 406.

In accordance with the first illustrative embodiment, the duration of time-interval Δt=m equals the duration of Δt=m−1. It will be clear to those skilled in the art, however, after reading this disclosure, how to make and use alternative embodiments of the present invention in which the duration of time-interval Δt=m does not equal the duration of time interval Δt=m−1. Furthermore, in accordance with the first illustrative embodiment, time-interval Δt=m is after, and is mutually-exclusive of, time-interval Δt=m−1. It will be clear to those skilled in the art, however, after reading this disclosure, how to make and use alternative embodiments of the present invention in which time-interval Δt=m overlaps, immediately succeeds, or succeeds but not immediately, time-interval Δt=m−1.

In accordance with the first illustrative embodiment, the duration of time-interval Δt=n equals the duration of Δt=n−1. It will be clear to those skilled in the art, however, after reading this disclosure, how to make and use alternative embodiments of the present invention in which the duration of time-interval Δt=n does not equal the duration of time interval Δt=n−1. Furthermore, in accordance with the first illustrative embodiment, time-interval Δt=n is after, and is mutually-exclusive of, time-interval Δt=n−1. It will be clear to those skilled in the art, however, after reading this disclosure, how to make and use alternative embodiments of the present invention in which time-interval Δt=n overlaps, immediately succeeds, or succeeds but not immediately, time-interval Δt=n−1.

In accordance with the first illustrative embodiment, feedstock laser 441 and workpiece laser 442 are not mounted on deposition head 107 because they are too heavy. It will be clear to those skilled in the art, after reading this disclosure, how to make and use alternative embodiments of the present invention that use a plurality—perhaps tens or hundreds—of relatively-low-power lightweight lasers that are mounted on the deposition head to provide the laser beams to heat the feedstock and/or the workpiece. Furthermore, it will be clear to those skilled in the art, after reading this disclosure, how to convey the laser beams from their lasers to the deposition head via free-space optics (i.e., without using an optical cable).

Figure 12:
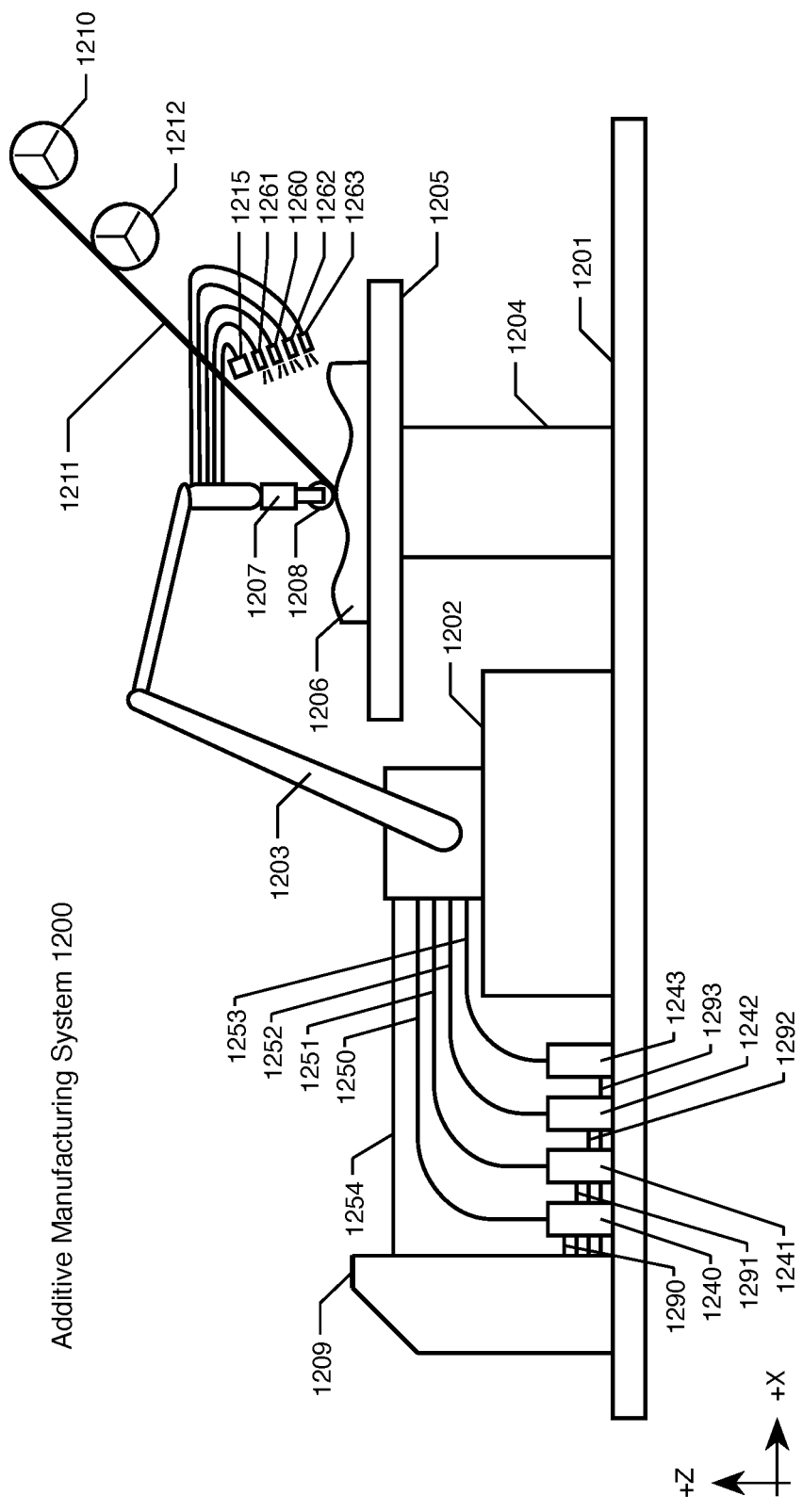
FIG. 12 depicts an illustration of additive manufacturing system 1200 in accordance with the second illustrative embodiment of the present invention.

FIG. 12 depicts an illustration of additive manufacturing system 1200 in accordance with the second illustrative embodiment of the present invention. Additive manufacturing system 1200 fabricates an article of manufacture by successively depositing segments of fiber-reinforced thermoplastic feedstock (e.g., filament, tape, etc.) onto a workpiece until the article of manufacture is complete.

Additive manufacturing system 1200 is similar to additive manufacturing system 400 fabricates in that they both fabricate an article of manufacture by successively depositing segments of fiber-reinforced thermoplastic feedstock (e.g., filament, tape, etc.) onto a workpiece until the article of manufacture is complete. In contrast, additive manufacturing system 1200 is unlike additive manufacturing system 400 in that system 1200 uses:
  (i) a two-stage heating system that comprises two laser beams and two optical instruments to irradiate and heat the feedstock, and
  (ii) a two-stage heating system that comprises two lasers beams and two optical instruments to irradiate and heat the workpiece.
A two-stage heating system is advantageous over a single-stage heating system in that it provides finer control of the temperature of the feedstock and the workpiece and does so with less-expensive lasers.

Additive manufacturing system 1200 comprises: platform 1201, robot mount 1202, robot 1203, build plate support 1204, build plate 1205, workpiece 1206, deposition head 1207, tamping tool 1208, controller 1209, feedstock reel 1210, feedstock 1211, accumulator 1212, sensor array 1215, feedstock laser 1240, feedstock laser 1241, workpiece laser 1242, workpiece laser 1243, optical cable 1250, optical cable 1251, optical cable 1252, optical cable 1253, sensor cable 1254, optical instrument 1260, optical instrument 1261, optical instrument 1262, optical instrument 1263, laser beam 1270, laser beam 1271, laser beam 1272, laser beam 1273, feedstock laser control cable 1291, and workpiece laser control cable 1292, interrelated as shown.

Figure 13A:
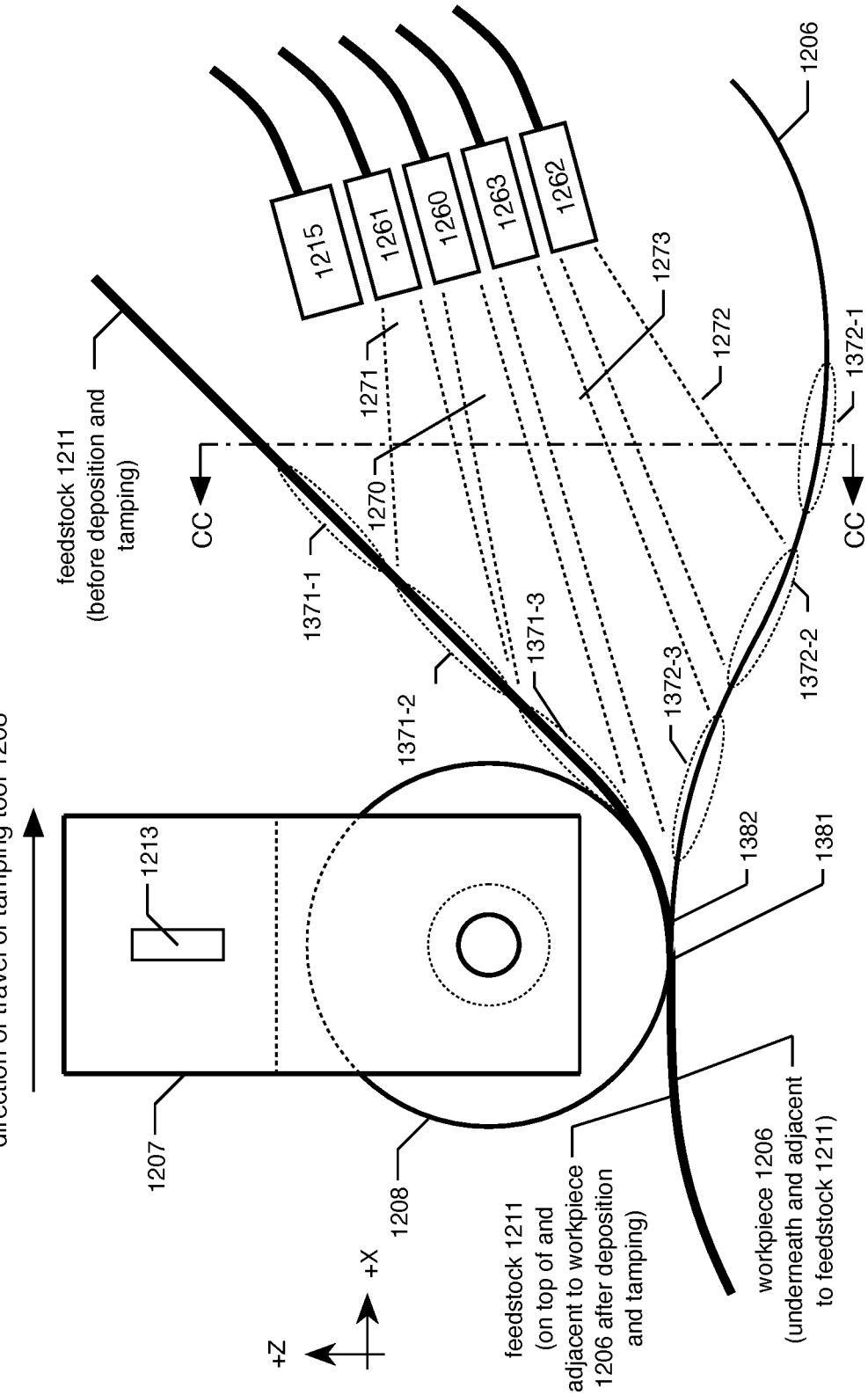
FIG. 13a depicts a close-up of workpiece 1206, deposition head 1207, tamping tool 1208, feedstock 1211, sensor array 1215, optical instrument 1260, optical instrument 1261, optical instrument 1262, optical instrument 1263, optical cable 1250, optical cable 1251, optical cable 1252, optical cable 1253, sensor cable 1254, laser beam 1270, laser beam 1271, laser beam 1272, laser beam 1273, feedstock region 1371-1, feedstock region 1371-2, feedstock region 1371-3, workpiece region 1372-1, workpiece region 1372-2, workpiece region 1372-3, nip line segment 1381, and pinch line segment 1382, interrelated as shown.

FIG. 13a depicts a close-up of workpiece 1206, deposition head 1207, tamping tool 1208, feedstock 1211, sensor array 1215, optical instrument 1260, optical instrument 1261, optical instrument 1262, optical instrument 1263, optical cable 1250, optical cable 1251, optical cable 1252, optical cable 1253, sensor cable 1254, laser beam 1270, laser beam 1271, laser beam 1272, laser beam 1273, feedstock region 1371-1, feedstock region 1371-2, feedstock region 1371-3, workpiece region 1372-1, workpiece region 1372-2, workpiece region 1372-3, nip line segment 1381, and pinch line segment 1382, interrelated as shown.

Figure 13B:
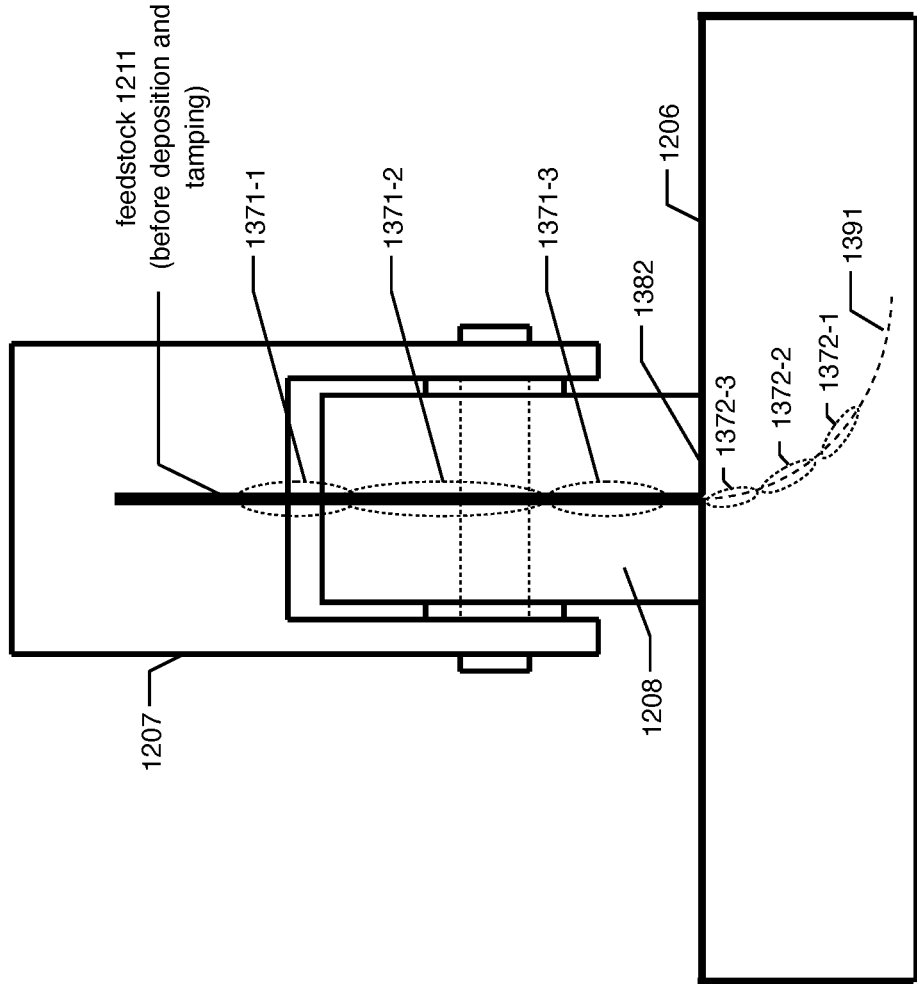
FIG. 13b depicts a close-up of workpiece 1206 in which deposition path 1391 curves to the right (from the perspective of deposition head 1207).

FIG. 13b depicts a close-up of workpiece 1206, deposition head 1207, tamping tool 1208, feedstock 1211, feedstock region 1371-1, feedstock region 1371-2, feedstock region 1371-3, workpiece region 1372-1, workpiece region 1372-2, workpiece region 1372-3, pinch line segment 1382, and deposition path 1391 all as seen along cross-section CC-CC as depicted in FIG. 13a.

Figure 14:
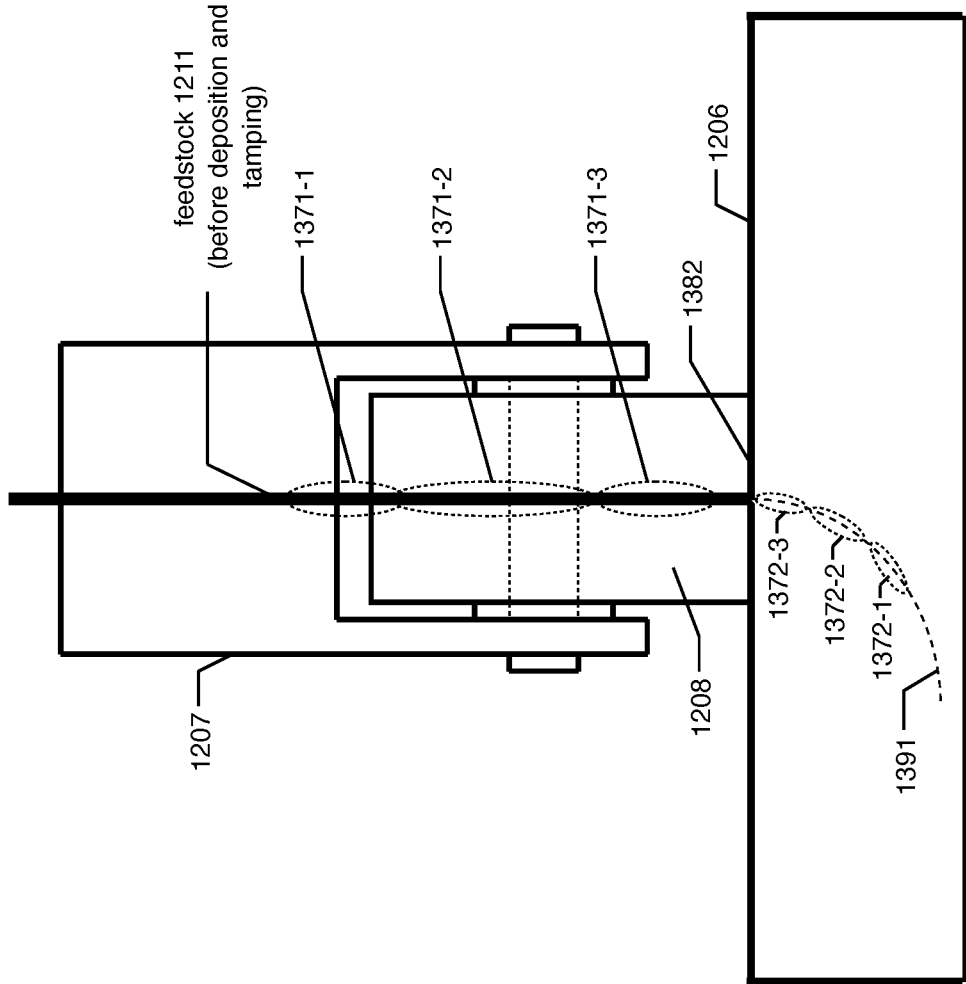
FIG. 14 depicts a close-up of workpiece 1206 in which deposition path 1391 curves to the left (from the perspective of deposition head 1207).

FIG. 14 depicts a close-up of workpiece 1206, deposition head 1207, tamping tool 1208, feedstock 1211, feedstock region 1371-1, feedstock region 1371-2, feedstock region 1371-3, workpiece region 1372-1, workpiece region 1372-2, workpiece region 1372-3, pinch line segment 1382, and deposition path 1391, all as seen along cross-section CC-CC as depicted in FIG. 13a.

FIG. 14 differs from FIG. 13a in that the curvature of deposition path 1391 in FIG. 13a curves to the right (from the perspective of deposition head 1207) whereas deposition path 1391 in FIG. 14 curves to the left. This is because additive manufacturing system 1200 steers laser beam 1272, workpiece region 1372-1, workpiece region 1372-2, and workpiece region 1372-3 onto deposition path 1391 as deposition path 1391 meanders on workpiece 1206.

Although the second illustrative embodiment comprises a total of four lasers, it will be clear to those skilled in the art, after reading this disclosure, how to make and use embodiments of the present invention that use any number of lasers (e.g., three lasers, five lasers, six lasers, seven lasers, eight lasers, ten lasers, twenty lasers, one-hundred lasers, etc.).

Although the second illustrative embodiment apportions its four lasers evenly between the feedstock and the workpiece, it will be clear to those skilled in the art, after reading this disclosure, how to make and use alternative embodiments of the present invention that apportion its lasers to the feedstock and workpiece in any combination (e.g., one laser dedicated to the feedstock and three lasers dedicated to the workpiece, three lasers dedicated to the feedstock and one laser dedicated to the workpiece, etc.).

Although the second illustrative embodiment dedicates two lasers to heating the feedstock and two lasers to heating the workpiece, it will be clear to those skilled in the art, after reading this disclosure, how to make and use alternative embodiments of the present invention that do not dedicate each laser to either the feedstock of the workpiece. As a consequence, it will be clear to those skilled in the art, after reading this disclosure, how to make and use alternative embodiments of the present invention in which one or more lasers switch, as needed, between heating the feedstock and heating the laser. For example, one laser is dedicated to heating the feedstock, a second laser is dedicated to heating the workpiece, and a third laser heats whichever—the feedstock or the workpiece—needs heating at any given moment.

Platform 1201 is identical to platform 401 in the first illustrative embodiment and performs the same function in exactly the same way. It will be clear to those skilled in the art how to make and use platform 1201.

Robot mount 1202 is identical to robot mount 402 in the first illustrative embodiment and performs exactly the same function in exactly the same way. It will be clear to those skilled in the art how to make and use robot mount 1202.

Robot 1203 is identical to robot 103 in the first illustrative embodiment and performs exactly the same function in exactly the same way. It will be clear to those skilled in the art how to make and use robot 1203.

Build plate support 1204 is identical to build plate support 404 in the first illustrative embodiment and performs exactly the same function in exactly the same way. It will be clear to those skilled in the art how to make and use build plate support 1204.

Build plate 1205 is identical to build plate 405 in the first illustrative embodiment and performs exactly the same function in exactly the same way. It will be clear to those skilled in the art how to make and use build plate 1205.

Workpiece 1206 is identical to workpiece 406 in the first illustrative embodiment and performs exactly the same function in exactly the same way.

Deposition head 1207 is the end effector of robot 1203 and comprises:
  (i) a feedstock guide that is identical to the feedstock guide in the first illustrative embodiment and performs exactly the same function in exactly the same way. It will be clear to those skilled in the art how to make and use the feedstock guide.
  (ii) tamping tool 1208, which first pinches and then tamps each segment of feedstock 1211 onto the corresponding portion of workpiece 1206.
  (iii) a feedstock cutter—under the direction of controller 1209—is identical to feedstock cutter in the first illustrative embodiment and performs exactly the same function in exactly the same way. It will be clear to those skilled in the art how to make and use the feedstock cutter.
  (iv) optical instrument 1260, which takes laser beam 1270 from optical cable 1250, and—under the direction of controller 1209—conditions laser beam 1270 and directs it onto feedstock region 1371-2.
  (v) optical instrument 1261, which takes laser beam 1271 from optical cable 1251, and—under the direction of controller 1209—conditions laser beam 1271 and directs it onto feedstock region 1371-1.
  (vi) optical instrument 1262, which takes laser beam 1272 from optical cable 1252, and—under the direction of controller 1209—conditions laser beam 1272 and directs it onto workpiece region 1372-2.
  (vii) optical instrument 1263, which takes laser beam 1273 from optical cable 1253, and—under the direction of controller 1209—conditions laser beam 1273 and directs it onto workpiece region 1372-3.
  (viii) sensor array 1215, which measures the temperature of feedstock region 1371-2, workpiece region 1372-2, and tamping tool 1208 and reports those measurements to controller 1209 via sensor cable 1254
  (ix) force gauge 1213 that continually measures the force of tamping tool 1208 on feedstock 1211 at nip line segment 1381 and reports those measurements back to controller 1209 via sensor cable 1254.
  (x) structural support, which is similar to the structural support in the first illustrative embodiment except that is also supports optical instrument 1260 and optical instrument 1263 in addition to optical instrument 1261, optical instrument 1262, and sensor array 1215. Otherwise, the structural support performs exactly the same function in exactly the same way. It will be clear to those skilled in the art, after reading this disclosure, how to make and use the structural support.

It will be clear to those skilled in the art, after reading this disclosure, how to make and use deposition head 1207.

Tamping tool 1208 is identical to tamping tool 1208 in the first illustrative embodiment and performs exactly the same function in exactly the same way. It will be clear to those skilled in the art how to make and use tamping tool 1208.

Controller 1209 comprises the hardware and software necessary to control all aspects of fabricating the article of manufacture, including, but not limited to:
  (i) robot 1203 (which includes the location and motion of deposition head 1207 and tamping tool 1208), and
  (ii) build plate support 1204, and
  (iii) the feedstock cutter, and
  (iv) feedstock laser 1240, and
  (v) feedstock laser 1241, and
  (vi) workpiece laser 1242, and
  (vii) workpiece laser 1243, and
  (viii) optical instrument 1260, and
  (ix) optical instrument 1261, and
  (x) optical instrument 1262, and
  (xi) optical instrument 1263, and
  (xii) accumulator 1212.

To accomplish this controller 1209 relies on a combination of feedforward and feedback, as described in detail below and in the accompanying drawings. It will be clear to those skilled in the art, after reading this disclosure, how to make and use controller 1209.

Feedstock reel 1210 is identical to feedstock reel 410 in the first illustrative embodiment and performs exactly the same function in exactly the same way. It will be clear to those skilled in the art how to make and use feedstock reel 1210.

Feedstock 1211 is identical to feedstock 411 in the first illustrative embodiment and performs exactly same function in exactly the same way. It will be clear to those skilled in the art how to make and use feedstock 1211.

Accumulator 1212 is identical to accumulator 412 in the first illustrative embodiment and performs exactly the same function in exactly the same way. It will be clear to those skilled in the art how to make and use accumulator 1212.

Force Gauge 1213—is a mechanical strain gauge that continually measures the force of tamping tool 1208 on feedstock 1211 at nip line segment 1381 and reports those measurements back to controller 1209 via sensor cable 1254. It will be clear to those skilled in the art how to make and use force gauge 1213.

Sensor array 1215 is identical to sensor array 415 in the first illustrative embodiment and performs exactly the same function in exactly the same way. It will be clear to those skilled in the art how to make and use sensor array 1215.

Feedstock laser 1240 is a variable-power laser that generates laser beam 1270 and conveys it to optical instrument 1260 via optical cable 1250. In accordance with the second illustrative embodiment, feedstock laser 1240 is directed by controller 1209 to generate laser beam 1270 with a specific average power over a given time-interval. In accordance with the second illustrative embodiment, laser beam 1270 is characterized by a wavelength $\lambda=980$ nm and has a maximum power output of 200 Watts.

In accordance with the illustrative embodiment, feedstock laser 1240 is a continuous-wave laser. It will be clear to those skilled in the art, after reading this disclosure, how to make and use alternative embodiments of the present invention that use a pulsed laser. In any case, it will be clear to those skilled in the art how to make and use feedstock laser 1240.

Feedstock laser 1241 is a variable-power laser that generates laser beam 1271 and conveys it to optical instrument 1261 via optical cable 1251. In accordance with the second illustrative embodiment, feedstock laser 1241 is directed by controller 1209 to generate laser beam 1271 with a specific average power over a given time-interval. In accordance with the second illustrative embodiment, laser beam 1271 is characterized by a wavelength $\lambda=980$ nm and has a maximum power output of 200 Watts.

In accordance with the illustrative embodiment, feedstock laser 1241 is a continuous-wave laser. It will be clear to those skilled in the art, after reading this disclosure, how to make and use alternative embodiments of the present invention that use a pulsed laser. In any case, it will be clear to those skilled in the art how to make and use feedstock laser 1241.

Workpiece laser 1242 is a variable-power laser that generates laser beam 1272 and conveys it to optical instrument 1262 via optical cable 1252. In accordance with the second illustrative embodiment, workpiece laser 1242 is directed by controller 1209 to generate laser beam 1272 with a specific average power over a given time-interval. In accordance with the second illustrative embodiment, laser beam 1272 is characterized by a wavelength $\lambda=980$ nm and has a maximum power output of 200 Watts.

In accordance with the illustrative embodiment, workpiece laser 1242 is a continuous-wave laser. It will be clear to those skilled in the art, after reading this disclosure, how to make and use alternative embodiments of the present invention that use a pulsed laser. In any case, it will be clear to those skilled in the art how to make and use workpiece laser 1242.

Workpiece laser 1243 is a variable-power laser that generates laser beam 1273 and conveys it to optical instrument 1263 via optical cable 1253. In accordance with the second illustrative embodiment, workpiece laser 1243 is directed by controller 1209 to generate laser beam 1273 with a specific average power over a given time-interval. In accordance with the second illustrative embodiment, laser beam 1273 is characterized by a wavelength $\lambda=980$ nm and has a maximum power output of 200 Watts.

In accordance with the illustrative embodiment, workpiece laser 1243 is a continuous-wave laser. It will be clear to those skilled in the art, after reading this disclosure, how to make and use alternative embodiments of the present invention that use a pulsed laser. In any case, it will be clear to those skilled in the art how to make and use workpiece laser 1243.

In accordance with the second illustrative embodiment, feedstock laser 1240, feedstock laser 1241, workpiece laser 1242, and workpiece laser 1243 are identical and generate laser beams characterized by the same wavelength. It will be clear to those skilled in the art, however, after reading this disclosure, how to make and use alternative embodiments of the present invention in which one or more of the lasers:

(i) are not identical, or (i) generate laser beams characterized by different wavelengths, or (iii) have different maximum power output, or (iv) any combination of i, ii, and iii.

Optical cable 1250 is identical to optical cable 451 in the first illustrative embodiment. It will be clear to those skilled in the art how to make and use optical cable 1250.

Optical cable 1251 is identical to optical cable 451 in the first illustrative embodiment. It will be clear to those skilled in the art how to make and use optical cable 1251.

Optical cable 1252 is identical to optical cable 451 in the first illustrative embodiment. It will be clear to those skilled in the art how to make and use optical cable 1252.

Optical cable 1253 is identical to optical cable 451 in the first illustrative embodiment. It will be clear to those skilled in the art how to make and use optical cable 1253.

Sensor cable 1254 is identical to sensor cable 454 in the first illustrative embodiment. It will be clear to those skilled in the art how to make and use sensor cable 1254.

Optical instrument 1260 is identical to optical instrument 461 in the first illustrative embodiment and performs a similar function on the segment of feedstock 1211 in feedstock region 1371-3. In particular, optical instrument 1260 is an optomechanical machine that comprises optics and actuators that receive laser beam 1270 from feedstock laser 1240, via optical cable 1250, conditions it under the direction of controller 1209, and directs it onto the segment of feedstock 1211 that is within feedstock region 1371-3. In accordance with the second illustrative embodiment, optical instrument 1261 comprises:

(i) an actuator and an optic that, under the direction of controller 1209, adjusts the length of the segment of feedstock 1211 that is irradiated and heated by laser beam 1270 (i.e., adjusts the length of feedstock region 1371-3), and (ii) an actuator and an optic that, under the direction of controller 1209, adjusts the distance between pinch line segment 1382 and laser beam 1270 (i.e., adjusts the distance between pinch line segment 1382 and feedstock region 1371-3), and (iii) an actuator and an optic that, under the direction of controller 1209, adjusts the irradiance within each unit-area of laser beam 1270 on feedstock 1211, and (iv) an actuator and an optic that, under the direction of controller 1209, adjusts the angle of incidence of laser beam 1270 on feedstock 1211.

It will be clear to those skilled in the art, after reading this disclosure, how to make and use optical instrument 1260.

Optical instrument 1261 is identical to optical instrument 461 in the first illustrative embodiment and performs exactly the same function in exactly the same way. In particular, optical instrument 1261 is an optomechanical machine that comprises optics and actuators that receive laser beam 1271 from feedstock laser 1241, via optical cable 1251, conditions it under the direction of controller 1209, and directs it onto the segment of feedstock 1211 that is within feedstock region 1371-2. In accordance with the second illustrative embodiment, optical instrument 1261 comprises:

(i) an actuator and an optic that, under the direction of controller 1209, adjusts the length of the segment of feedstock 1211 that is irradiated and heated by laser beam 1271 (i.e., adjusts the length of feedstock region 1371-2), and (ii) an actuator and an optic that, under the direction of controller 1209, adjusts the distance between pinch line segment 1382 and laser beam 1271 (i.e., adjusts the distance between pinch line segment 1382 and feedstock region 1371-2), and (iii) an actuator and an optic that, under the direction of controller 1209, adjusts the irradiance within each unit-area of laser beam 1271 on feedstock 1211, and (iv) an actuator and an optic that, under the direction of controller 1209, adjusts the angle of incidence of laser beam 1271 on feedstock 1211.

It will be clear to those skilled in the art, after reading this disclosure, how to make and use optical instrument 1261.

Optical instrument 1262 is identical to optical instrument 462 in the first illustrative embodiment and performs exactly the same function in exactly the same way. In particular, optical instrument 1262 is an optomechanical machine that comprises optics and actuators that receive laser beam 1272 from workpiece laser 1242, via optical cable 1252, conditions it, and directs it onto the portion of workpiece 1206 that is within workpiece region 1372-2 under the direction of controller 1209. In accordance with the second illustrative embodiment, optical instrument 1261 comprises:

(i) an actuator and an optic that, under the direction of controller 1209, adjusts the length of the portion of workpiece 1206 that is irradiated and heated by laser beam 1272 (i.e., adjusts the length of workpiece region 1372-2), and (ii) an actuator and an optic that, under the direction of controller 1209, adjusts the distance between pinch line segment 1382 and laser beam 1272 (i.e., adjusts the distance between pinch line segment 1382 and workpiece region 1372-2), and (iii) an actuator and an optic that, under the direction of controller 1209, adjusts the irradiance within each unit-area of laser beam 1272 on workpiece 1206, and (iv) an actuator and an optic that, under the direction of controller 1209, adjusts the angle of incidence of laser beam 1272 on workpiece 1206, and (v) an actuator that steers laser beam 1272 onto deposition path 1391.

It will be clear to those skilled in the art, after reading this disclosure, how to make and use optical instrument 1262.

Optical instrument 1263 is identical to optical instrument 462 in the first illustrative embodiment and performs a similar function on the portion of workpiece 1206 in workpiece region 1372-3. In particular, optical instrument 1263 is an optomechanical machine that comprises optics and actuators that receive laser beam 1273 from workpiece laser 1243, via optical cable 1253, conditions it, and directs it onto the portion of workpiece 1206 that is within workpiece region 1372-3 under the direction of controller 1209. In accordance with the second illustrative embodiment, optical instrument 1263 comprises:

(i) an actuator and an optic that, under the direction of controller 1209, adjusts the length of the portion of workpiece 1206 that is irradiated and heated by laser beam 1273 (i.e., adjusts the length of workpiece region 1372-3), and (ii) an actuator and an optic that, under the direction of controller 1209, adjusts the distance between pinch line segment 1382 and laser beam 1273 (i.e., adjusts the distance between pinch line segment 1382 and workpiece region 1372-3), and (iii) an actuator and an optic that, under the direction of controller 1209, adjusts the irradiance within each unit-area of laser beam 1273 on workpiece 1206, and (iv) an actuator and an optic that, under the direction of controller 1209, adjusts the angle of incidence of laser beam 1273 on workpiece 1206, and (v) an actuator that steers laser beam 1273 onto deposition path 1391.

It will be clear to those skilled in the art, after reading this disclosure, how to make and use optical instrument 1263.

Feedstock laser control cable 1290 is an electrical cable, in well-known fashion, that carries instructions from controller 1209 to feedstock laser 1240, which instructions control all aspects (e.g., power, etc.) of feedstock laser 1240. It will be clear to those skilled in the art how to make and use feedstock laser control cable 1290.

Feedstock laser control cable 1291 is an electrical cable, in well-known fashion, that carries instructions from controller 1209 to feedstock laser 1241, which instructions control all aspects (e.g., power, etc.) of feedstock laser 1241. It will be clear to those skilled in the art how to make and use feedstock laser control cable 1291.

Workpiece laser control cable 1292 is an electrical cable, in well-known fashion, that carries instructions from controller 1209 to workpiece laser 1242, which instructions control all aspects (e.g., power, etc.) of workpiece laser 1242. It will be clear to those skilled in the art how to make and use feedstock laser control cable 1292.

Workpiece laser control cable 1293 is an electrical cable, in well-known fashion, that carries instructions from controller 1209 to workpiece laser 1243, which instructions control all aspects (e.g., power, etc.) of workpiece laser 1243. It will be clear to those skilled in the art how to make and use feedstock laser control cable 1293.

Feedstock region 1371-1, feedstock region 1371-2, and feedstock region 1371-3 are three volumes in space through which feedstock 1211 passes.

The length of feedstock region 1371-1 is defined as the length of feedstock 1211 within feedstock region 1371-1. In accordance with the second illustrative embodiment, the length of feedstock region 1371-1 is 15 mm, but it will be clear to those skilled in the art, after reading this disclosure, how to make and use alternative embodiments in which the length of feedstock region 1371-1 is different.

The length of feedstock region 1371-2 is defined as the length of feedstock 1211 being irradiated by laser beam 1271. In accordance with the second illustrative embodiment, the length of feedstock region 1371-2 is continually adjusted by optical instrument 1261 under the direction of controller 1209. In accordance with the second illustrative embodiment, the minimum length of feedstock region 1371-2 is 5 mm and the maximum length is 15 mm, but it will be clear to those skilled in the art, after reading this disclosure, how to make and use alternative embodiments of the present invention in which the minimum and maximum lengths are different.

The length of feedstock region 1371-3 is defined as the length of feedstock 1211 within feedstock region 1371-3. In accordance with the second illustrative embodiment, the length of feedstock region 1371-3 is 10 mm, but it will be clear to those skilled in the art, after reading this disclosure, how to make and use alternative embodiments in which the length of the feedstock region 1373-3 is different.

In accordance with the second illustrative embodiment, the distance of feedstock region 1371-1 from pinch line segment 1382 (as measured along the length of feedstock 1211) is 55 mm, but it will be clear to those skilled in the art, after reading this disclosure, how to make and use alternative embodiments in which the distance is different.

In accordance with the second illustrative embodiment, the distance of feedstock region 1371-2 from pinch line segment 1382 (as measured along the length of feedstock 1211) is continually adjusted by optical instrument 1261 under the direction of controller 1209. In accordance with the second illustrative embodiment, the minimum distance of feedstock region 1371-2 from pinch line segment 1382 is 25 mm and the maximum distance is 35 mm, but it will be clear to those skilled in the art, after reading this disclosure, how to make and use alternative embodiments of the present invention in which the minimum and maximum lengths are different.

In accordance with the second illustrative embodiment, the distance of feedstock region 1371-3 from pinch line segment 1382 (as measured along the length of feedstock 1211) is 5 mm but it will be clear to those skilled in the art, after reading this disclosure, how to make and use alternative embodiments in which the distance is different.

Workpiece region 1372-1, workpiece region 1372-2, and workpiece region 1372-3 are three volumes in space through which deposition path 1391 passes.

The length of workpiece region 1372-1 is defined as the length of deposition path 1391 within workpiece region 1372-1. In accordance with the second illustrative embodiment, the length of workpiece region 1372-1 is 15 mm, but it will be clear to those skilled in the art, after reading this disclosure, how to make and use alternative embodiments in which the length of workpiece region 1372-1 is different.

The length of workpiece region 1372-2 is defined as the length of deposition path 1391 being irradiated by laser beam 1271. In accordance with the second illustrative embodiment, the length of feedstock region 1372-2 is continually adjusted by optical instrument 1262 under the direction of controller 1209. In accordance with the second illustrative embodiment, the minimum length of workpiece region 1372-2 is 5 mm and the maximum length is 15 mm, but it will be clear to those skilled in the art, after reading this disclosure, how to make and use alternative embodiments of the present invention in which the minimum and maximum lengths are different.

The length of workpiece region 1372-3 is defined as the length of deposition path 1391 within workpiece region 1372-3. In accordance with the second illustrative embodiment, the length of workpiece region 1372-3 is 10 mm, but it will be clear to those skilled in the art, after reading this disclosure, how to make and use alternative embodiments in which the length of the workpiece region 1373-3 is different.

In accordance with the second illustrative embodiment, the distance of workpiece region 1372-1 from pinch line segment 1382 (as measured along the length of deposition path 1391) is 55 mm, but it will be clear to those skilled in the art, after reading this disclosure, how to make and use alternative embodiments in which the distance is different.

In accordance with the second illustrative embodiment, the distance of workpiece region 1372-2 from pinch line segment 1382 (as measured along the length of deposition path 1391) is continually adjusted by optical instrument 1262 under the direction of controller 1209. In accordance with the second illustrative embodiment, the minimum distance of workpiece region 1372-2 from pinch line segment 1382 is 25 mm and the maximum distance is 35 mm, but it will be clear to those skilled in the art, after reading this disclosure, how to make and use alternative embodiments of the present invention in which the minimum and maximum lengths are different.

Nip line segment 1381 is the line segment on the circumferential surface of tamping tool 1208 where tamping tool 1208 exerts the maximum radial force on feedstock 1211.

Pinch line segment 1382 is the line segment on the circumferential surface of tamping tool 1208 where tamping tool 1208 first pinches a unit-length of feedstock 1211 between tamping tool 1208 and workpiece 1206 so that any movement of feedstock 1211 parallel to the rotational axis of tamping tool 1208 is substantially constrained.

Deposition path 1391 is a line on the surface of workpiece 1206 where feedstock 1211 is to be deposited and tamped. In FIG. 13b, deposition path 1391 curves to the left. In contrast, in FIG. 14, deposition path 1391 curves to the right.

Figure 15:
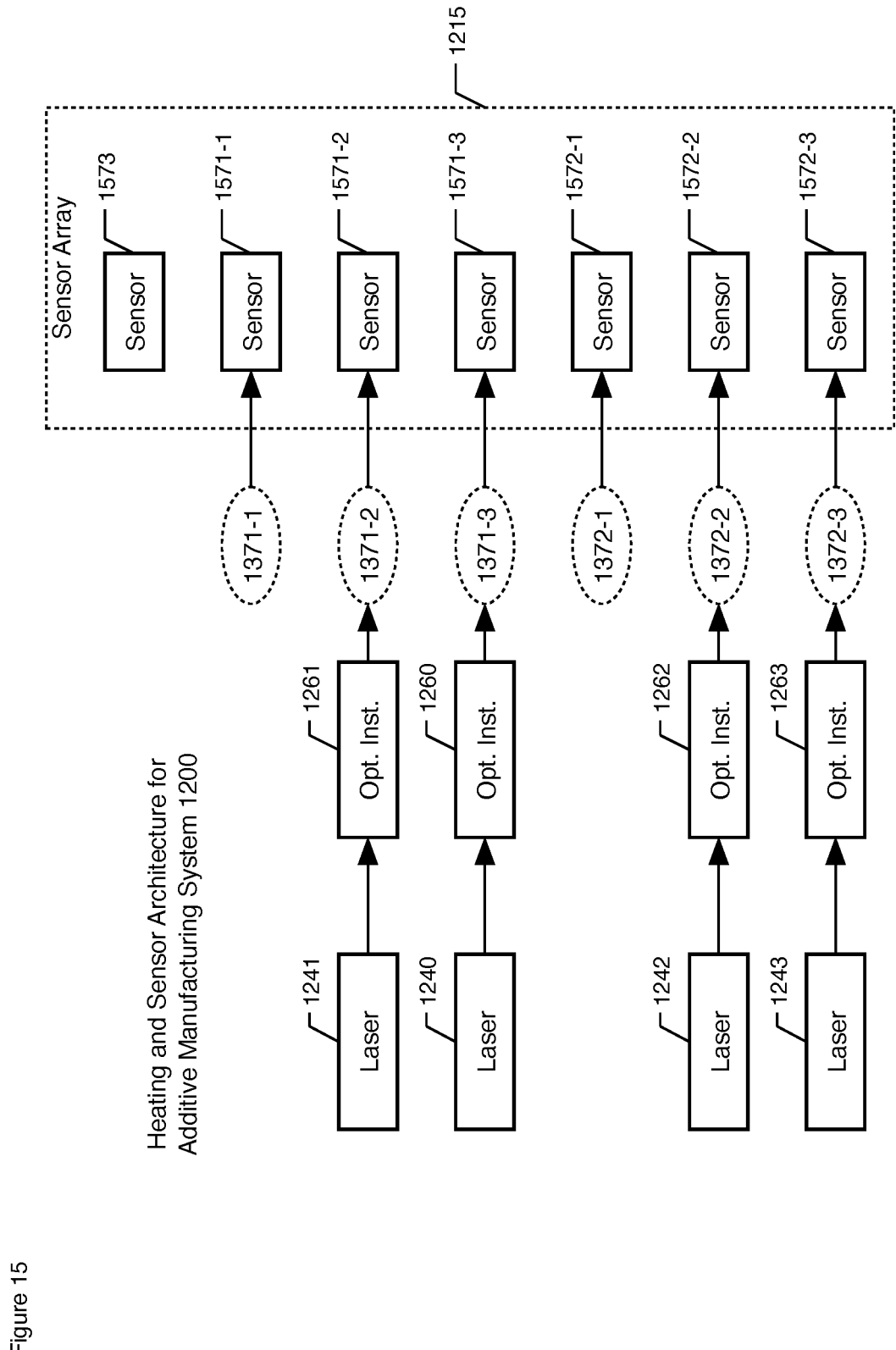
FIG. 15 depicts a schematic diagram of the heating and sensor architecture for additive manufacturing system 1200, which irradiates and heats feedstock 1211 and workpiece 1206 and measures the temperature of feedstock 1211, workpiece 1206, and tamping tool 1208.

FIG. 15 depicts a schematic diagram of the heating and sensor architecture for additive manufacturing system 1200, which irradiates and heats feedstock 1211 and workpiece 1206 and measures the temperature of feedstock 1211, workpiece 1206, and tamping tool 1208.

As shown in FIG. 15:
(i) feedstock laser 1240 provides laser beam 1270 to optical instrument 1260 via optical cable 1250, and
(ii) feedstock laser 1241 provides laser beam 1271 to optical instrument 1261 via optical cable 1251, and
(iii) workpiece laser 1242 provides laser beam 1272 to optical instrument 1262 via optical cable 1252, and
(iii) workpiece laser 1243 provides laser beam 1273 to optical instrument 1263 via optical cable 1253.

Under the direction of controller 1209:
(i) optical instrument 1260 irradiates and heats the segment of feedstock that is within feedstock region 1371-3, and
(ii) optical instrument 1261 irradiates and heats the segment of feedstock that is within feedstock region 1371-2, and
(iii) optical instrument 1262 irradiates and heats the portion of workpiece 1206 that is within workpiece region 1372-2, and (iv) optical instrument 1263 irradiates and heats the portion of workpiece 1206 that is within workpiece region 1372-3.

Thermal sensor 1571-1 periodically measures the temperature of the segment of feedstock that is within feedstock region 1371-1 and reports those measurements back to controller 1209. Thermal sensor 1571-2 periodically measures the temperature of the segment of feedstock that is within feedstock region 1371-2 and reports those measurements back to controller 1209. Thermal sensor 1571-3 periodically measures the temperature of the segment of feedstock that is within feedstock region 1371-3 and reports those measurements back to controller 1209.

Thermal sensor 1572-1 periodically measures the temperature of that portion of workpiece 1206 that is within workpiece region 1372-1 and reports those measurements back to controller 1209. Thermal sensor 1572-2 periodically measures the temperature of that portion of workpiece 1206 that is within workpiece region 1372-2 and reports those measurements back to controller 1209. Thermal sensor 1572-3 periodically measures the temperature of that portion of workpiece 1206 that is within workpiece region 1372-3 and reports those measurements back to controller 1209.

Thermal sensor 773 periodically measures the temperature of tamping tool 1208 and reports those measurements back to controller 1209.

In accordance with the second illustrative embodiment, the temperature measurements are made periodically at sixty (60) times per second, but it will be clear to those skilled in the art, after reading this disclosure, how to make and use alternative embodiments of the present invention that make periodic measurements at a different rate or that make measurements aperiodically or sporadically.

Figure 16:
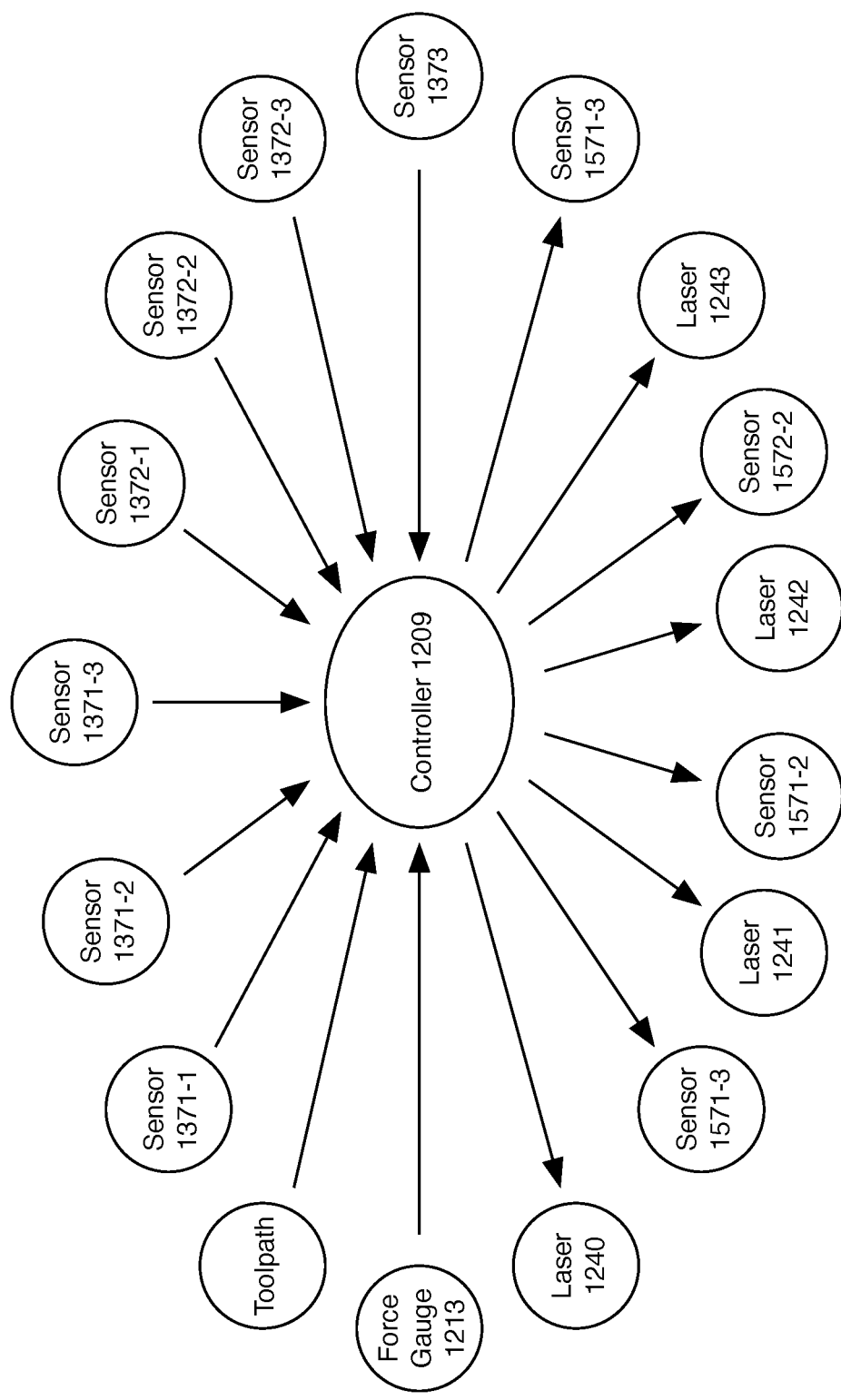
FIG. 16 depicts a schematic diagram of the sensor and control architecture for that portion of additive manufacturing system 1200 that irradiates and heats feedstock 1211 and workpiece 1206.

FIG. 16 depicts a schematic diagram of the sensor and control architecture for that portion of additive manufacturing system 1200 that irradiates and heats feedstock 1211 and workpiece 1206.

In accordance with the second illustrative embodiment, controller 1209 uses a combination of feedforward and feedback to continually direct:
- (i) feedstock laser 1240 to adjust the average power of laser beam 1270 on the segment of feedstock that is within feedstock region 1371-3, and
- (ii) optical instrument 1260 to adjust the length of feedstock region 1371-3, and
- (iii) optical instrument 1260 to adjust the distance between pinch line segment 1382 and feedstock region 1371-3, and
- (iv) optical instrument 1260 to adjust the irradiance of laser beam 1270 on the segment of feedstock 1211 within feedstock region 1371-3, and
- (v) optical instrument 1260 to adjust the angle of incidence of laser beam 1270 on the segment of feedstock 1211 within feedstock region 1371-3, and
- (vi) feedstock laser 1241 to adjust the average power of laser beam 1271 on the segment of feedstock that is within feedstock region 1371-2, and
- (vii) optical instrument 1261 to adjust the length of feedstock region 1371-2, and (viii) optical instrument 1261 to adjust the distance between pinch line segment 1382 and feedstock region 1371-2, and
- (ix) optical instrument 1261 to adjust the irradiance of laser beam 1271 on the segment of feedstock 1211 within feedstock region 1371-2, and
- (x) optical instrument 1261 to adjust the angle of incidence of laser beam 1271 on the segment of feedstock 1211 within feedstock region 1371-2, and
- (xi) workpiece laser 1242 to adjust the average power of laser beam 1272 on the portion of workpiece that is within workpiece region 1372-2, and
- (xii) optical instrument 1262 to adjust the length of workpiece region 1372-2, and (xiii) optical instrument 1262 to adjust the distance between pinch line segment 1382 and workpiece region 1372-2, and
- (xiv) optical instrument 1262 to adjust the irradiance of laser beam 1272 on the portion of workpiece 1206 within workpiece region 1372-2, and
- (xv) optical instrument 1262 to adjust the angle of incidence of laser beam 1272 on the portion of workpiece 1206 within workpiece region 1372-2, and
- (xvi) optical instrument 1262 to steer laser beam 1272 onto deposition path, and (xvii) workpiece laser 1243 to adjust the average power of laser beam 1273 on the portion of workpiece that is within workpiece region 1372-3, and
- (xviii) optical instrument 1263 to adjust the length of workpiece region 1372-3, and
- (xix) optical instrument 1263 to adjust the distance between pinch line segment 1383 and workpiece region 1372-3, and
- (xx) optical instrument 1263 to adjust the irradiance of laser beam 1273 on the portion of workpiece 1206 within workpiece region 1372-3, and
- (xxi) optical instrument 1263 to adjust the angle of incidence of laser beam 1273 on the portion of workpiece 1206 within workpiece region 1372-3, and
- (xxii) optical instrument 1263 to steer laser beam 1273 onto deposition path 1391, and
- (xxiii) accumulator 1212 to feed feedstock 1211 to deposition head 1207, and
- (xxiv) robot 1203 to advance tamping tool 1208 to deposit and tamp feedstock 1211 onto workpiece 1206, and based on:
- (i) knowledge of the toolpath (e.g., G-code, etc.) for the article of manufacture to be printed (and the geometry of the workpiece at each time-interval, which can be derived from that toolpath), and
- (ii) a thermal model of the feedstock 1211, and
- (iii) a location-specific thermal model of each portion on workpiece 1206 onto which feedstock 1211 will be deposited and tamped (which can be derived from the thermal model of the feedstock 1211 and the geometry of the workpiece at each instant during fabrication), and
- (iv) periodic measurements of the temperature of the segment of feedstock 1211 that is within feedstock region 1371-1, and
- (v) periodic measurements of the temperature of the segment of feedstock 1211 that is within feedstock region 1371-2, and
- (vi) periodic measurements of the temperature of the segment of feedstock 1211 that is within feedstock region 1371-3, and
- (vii) periodic measurements of the temperature of that portion of workpiece that is within workpiece region 1372-1, and
- (viii) periodic measurements of the temperature of that portion of workpiece that is within workpiece region 1372-2, and
- (ix) periodic measurements of the temperature of that portion of workpiece that is within workpiece region 1372-3, and
- (x) periodic measurements of the temperature of tamping tool 1208, and (xi) periodic measurements of the force of tamping tool 1208 on feedstock 1211 at nip line segment 1381.

It will be clear to those skilled in the art, after reading this disclosure, how to make and use embodiments of the present invention that accomplish this, whether with traditional imperative programming or with an artificial neural network.

With regard to feedforward, controller 1209 takes as input:
(i) the toolpath (e.g., G-code, etc.) for the article of manufacture to be printed, in well-known fashion, and
(ii) a thermal model of the feedstock, which itself is based on, among other things, the thermal properties of the resin, the mass of resin per unit-length of feedstock, the profile of the feedstock (e.g., filament, tape, circular, rectangular, etc.), the thermal properties of the reinforcing fibers, the number of fibers per unit-length of feedstock, the mass of the fibers per unit-length of feedstock, and the length and orientation of the fibers in the feedstock (e.g., continuous, chopped, medium, ball milled, etc.), and generates therefrom:
(i) a prediction of whether feedstock 1211 will be deposited at a uniform or non-uniform rate at each instant during the printing of the article of manufacture (because, for example and without limitation, the deposition starts and stops, accelerates, decelerates and occurs uniformly because of turns, contours, cuts, etc.), and
(ii) a prediction of the speed (e.g., in millimeters per second, etc.) at which feedstock 1211 will be deposited at each instant during the printing of the article of manufacture, and
(iii) a prediction of the interval of time between when each segment of feedstock 1211 is irradiated and heated and when the segment is deposited and tamped, and
(iv) a prediction of the interval of time between when each portion of workpiece 1206 is irradiated and heated and when feedstock 1211 is deposited and tamped onto that portion of workpiece 1206, and
(v) a location-specific thermal model of each portion on workpiece 1206 onto which feedstock 1211 will be deposited and tamped, which itself is based on, among other things, the thermal model of the feedstock and the shape and mass of the workpiece in the vicinity of each portion to be irradiated and heated, which is derived from a model of the nascent article of manufacture (i.e., workpiece) at each step of printing, which is derived from the toolpath.

With regard to feedback, controller 1209 takes as input:
(i) the thermal model of the feedstock, and
(ii) the location-specific thermal model of each portion on workpiece 1206 onto which feedstock 1211 will be deposited and tamped, and
(iii) periodic measurements of the temperature of the segment of feedstock 1211 that is within feedstock region 1371-1, and
(iv) periodic measurements of the temperature of the segment of feedstock 1211 that is within feedstock region 1371-2, and
(v) periodic measurements of the temperature of the segment of feedstock 1211 that is within feedstock region 1371-3, and
(vi) periodic measurements of the temperature of that portion of workpiece that is within workpiece region 1372-1, and
(vii) periodic measurements of the temperature of that portion of workpiece that is within workpiece region 1372-2, and
(viii) periodic measurements of the temperature of that portion of workpiece that is within workpiece region 1372-3, and
(ix) periodic measurements of the temperature of tamping tool 1208, and
(x) periodic measurements of the force of tamping tool 1208 on feedstock 1211 at nip line segment 1381.

It will be clear to those skilled in the art, after reading this disclosure, how to make and use a thermal model of the feedstock, a location-specific thermal model of each portion on workpiece 1206 onto which feedstock 1211 will be deposited and tamped, a prediction of whether the feedstock will be deposited at a uniform or non-uniform rate, a prediction of the speed at which the feedstock is deposited, and a prediction of the interval between when each segment of feedstock and each portion of workpiece is irradiated and heated and when the segment of feedstock is deposited and tamped onto the portion of the workpiece.

Figure 17:
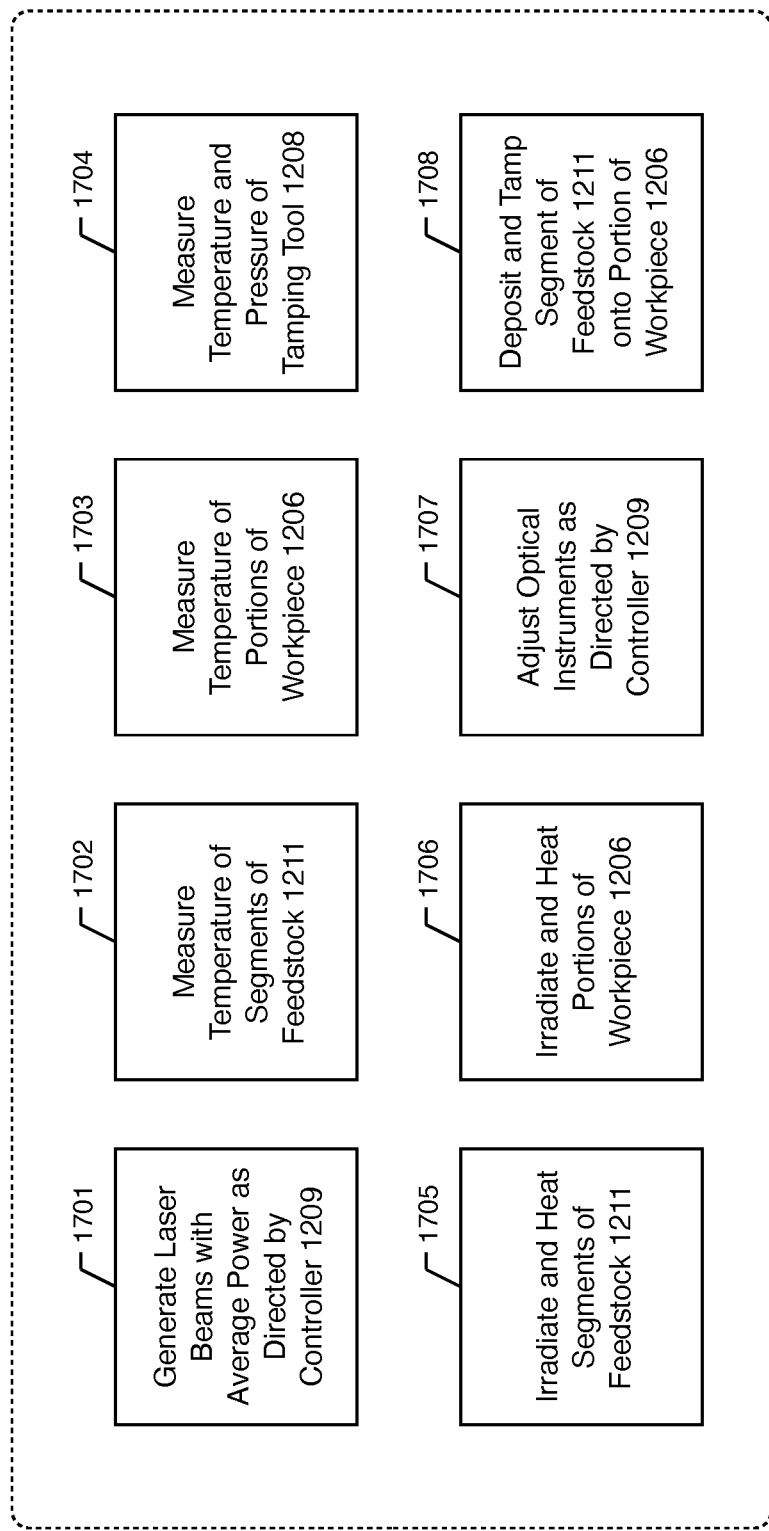
FIG. 17 depicts a flowchart of the tasks performed by additive manufacturing system 1200. Because additive manufacturing system 1200 concurrently performs tasks on different segments of feedstock 1211 and different portions of workpiece 1206, the tasks depicted in FIG. 17 are concurrent.

FIG. 17 depicts a flowchart of the tasks performed by additive manufacturing system 1200. Because additive manufacturing system 1200 concurrently performs tasks on different segments of feedstock 1211 and different portions of workpiece 1206, the tasks depicted in FIG. 17 are concurrent.

At task 1701:
(i) feedstock laser 1240 generates laser beam 1270 with an average power during each time-interval, and
(ii) feedstock laser 1241 generates laser beam 1271 with an average power during each time-interval, and
(iii) workpiece laser 1242 generates laser beam 1272 with an average power during each time-interval, and
(iv) workpiece laser 1243 generates laser beam 1273 with an average power during each time-interval, all as directed by controller 1209. It will be clear to those skilled in the art, after reading this disclosure, how to make and use embodiments of the present invention that perform task 1701.

At task 1702, thermal sensor 1571-1 periodically measures the temperature of the segment of feedstock 1211 that is within feedstock region 1371-1 and reports those measurements to controller 1209. Additionally, thermal sensor 1571-2 periodically measures the temperature of the segment of feedstock 1211 that is within feedstock region 1371-2 and reports those measurements to controller 1209. And furthermore, thermal sensor 1571-3 periodically measures the temperature of the segment of feedstock 1211 that is within feedstock region 1371-3 and reports those measurements to controller 1209. Task 1702 is identical to task 902 in the first illustrative embodiment, and it will be clear to those skilled in the art, after reading this disclosure, how to make and use embodiments of the present invention that perform task 1701.

At task 1703, thermal sensor 1572-1 periodically measures the temperature of that portion of workpiece 1206 that is within workpiece region 1372-1 and reports those measurements to controller 1209. Additionally, thermal sensor 1572-2 periodically measures the temperature of that portion of workpiece 1206 that is within workpiece region 1372-2 and reports those measurements to controller 1209. And furthermore, thermal sensor 1572-3 periodically measures the temperature of that portion of workpiece 1206 that is within workpiece region 1372-3 and reports those measurements to controller 1209. Task 1703 is identical to task 903 in the first illustrative embodiment, and it will be clear to those skilled in the art, after reading this disclosure, how to make and use embodiments of the present invention that perform task 1701.

At task 1704, thermal sensor 1373 periodically measures the temperature of tamping tool 1208 and reports those measurements back to controller 1209. Additionally, force gauge 1213 periodically measures the force of tamping tool 1208 on feedstock 1211 at nip line segment 1381 and reports those measurements back to controller 1209.

At task 1705:
(i) optical instrument 1260 irradiates and heats the segment of feedstock 1211 that is within feedstock region 1371-3, and
(ii) optical instrument 1261 irradiates and heats the segment of feedstock 1211 that is within feedstock region 1371-2, all as directed by controller 1209. It will be clear to those skilled in the art, after reading this disclosure, how to make and use embodiments of the present invention that perform task 1705.

At task 1706:
(i) optical instrument 1262 irradiates and heats the portion of workpiece 1206 that is within workpiece region 1372-2, and
(ii) optical instrument 1263 irradiates and heats the portion of workpiece 1206 that is within workpiece region 1372-3, all as directed by controller 1209. It will be clear to those skilled in the art, after reading this disclosure, how to make and use embodiments of the present invention that perform task 1706.

At task 1707:
(i) optical instrument 1260 adjusts a trait of laser beam 1270 and/or the relationship of laser beam 1270 to the segment of feedstock 1211 within feedstock region 1371-3, and
(ii) optical instrument 1261 adjusts a trait of laser beam 1271 and/or the relationship of laser beam 1271 to the segment of feedstock 1211 within feedstock region 1371-2, and
(iii) optical instrument 1262 adjusts a trait of laser beam 1272 and/or the relationship of laser beam 1272 to the portion of workpiece 1206 within workpiece region 1372-2, and
(iv) optical instrument 1263 adjusts a trait of laser beam 1273 and/or the relationship of laser beam 1273 to the portion of workpiece 1206 within workpiece region 1372-3, all as directed by controller 1209. Task 1707 is described in detail in FIGS. 18, 19, 20, 21, 22, and in the accompanying text.

At task 1708, additive manufacturing system 1200 deposits a segment of feedstock 1211 onto a portion of workpiece 1206 and tamps the segment onto the workpiece with tamping tool 1208. It will be clear to those skilled in the art, after reading this disclosure, how to make and use embodiments of the present invention that perform task 1708.

Figure 18:
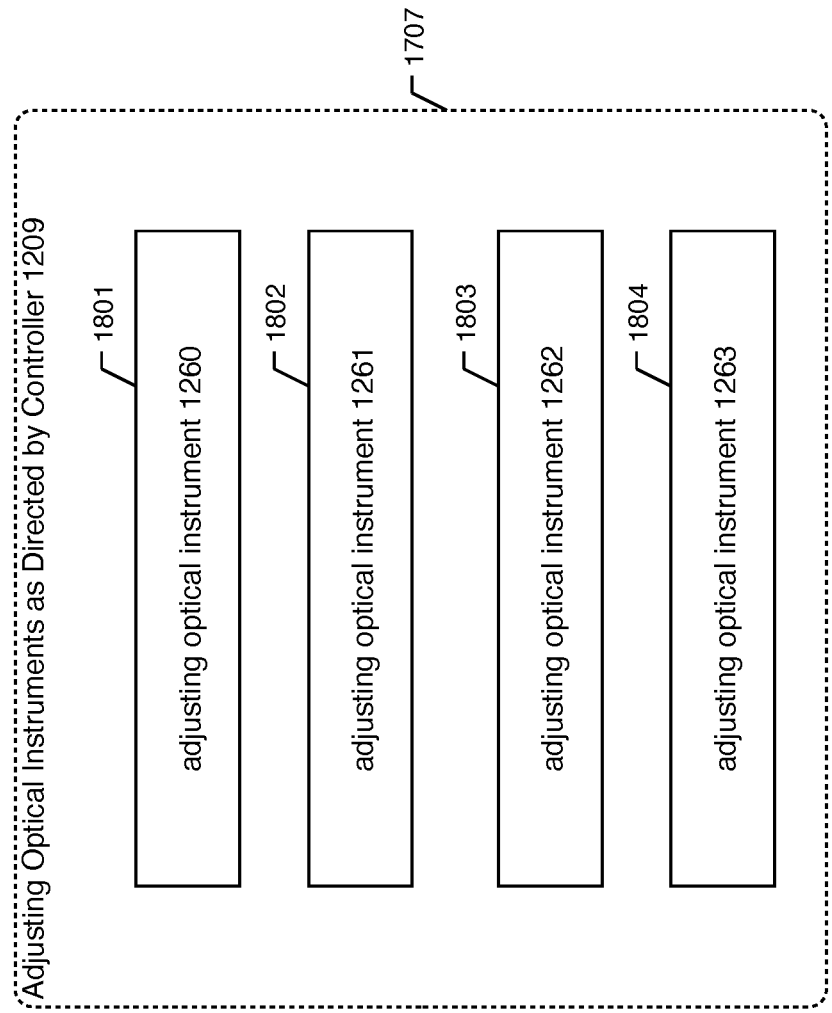
FIG. 18 depicts a flowchart of the details of task 1707—adjusting optical instruments as directed by controller 1209.

FIG. 18 depicts a flowchart of the details of task 1707—adjusting optical instruments as directed by controller 1209. Optical instrument 1260, optical instrument 1261, optical instrument 1262, and optical instrument 1263 continually make adjustments, as directed by controller 1209, and, therefore, the tasks depicted in FIG. 18 are concurrent.

At task 1801, optical instrument 1260 continually adjusts a trait of laser beam 1270 and/or the relationship of laser beam 1270 to the segment of feedstock 1211 within feedstock region 1371-3. Task 1801 is described in detail in FIG. 19 and in the accompanying text.

At task 1802, optical instrument 1261 continually adjusts a trait of laser beam 1271 and/or the relationship of laser beam 1271 to the segment of feedstock 1211 within feedstock region 1371-2. Task 1802 is described in detail in FIG. 20 and in the accompanying text.

At task 1803, optical instrument 1262 continually adjusts a trait of laser beam 1272 and/or the relationship of laser beam 1272 to the portion of workpiece 1206 within workpiece region 1372-2. Task 1803 is described in detail in FIG. 21 and in the accompanying text.

At task 1804, optical instrument 1263 continually adjusts a trait of laser beam 1273 and/or the relationship of laser beam 1273 to the portion of workpiece 1206 within workpiece region 1372-3. Task 1804 is described in detail in FIG. 22 and in the accompanying text.

Figure 19:
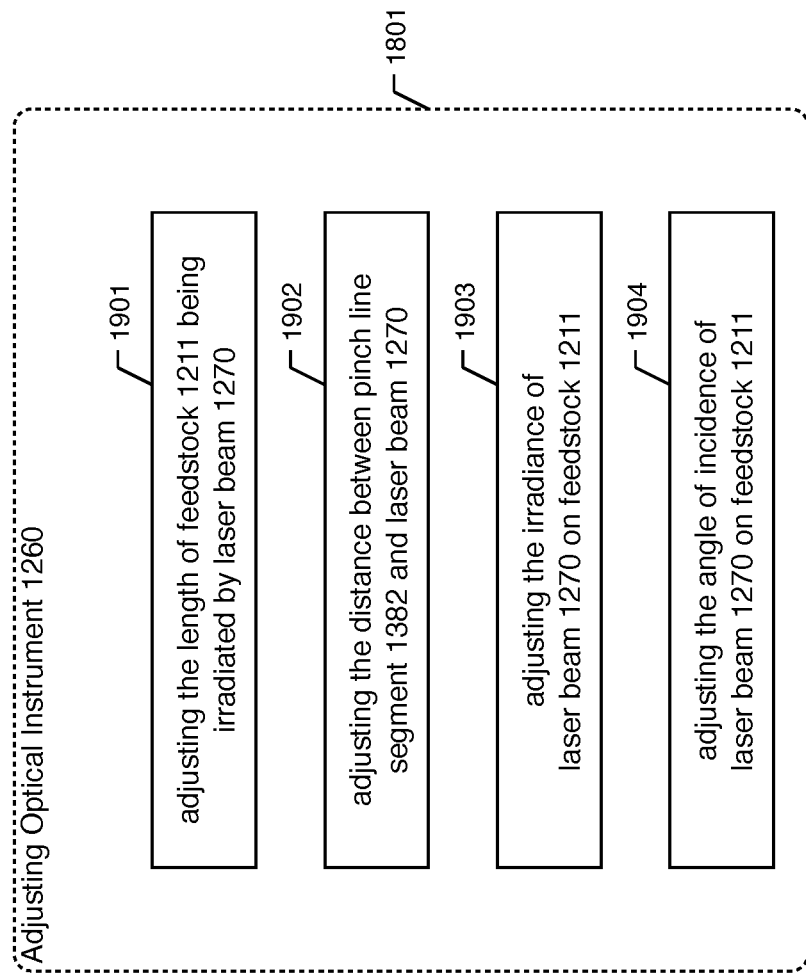
FIG. 19 depicts a flowchart of the details of task 1801—adjusting optical instrument 1260.

FIG. 19 depicts a flowchart of the details of task 1801—adjusting optical instrument 1260. Controller 1209 continually directs optical instrument 1260 to make adjustments, and, therefore, the tasks depicted in FIG. 19 are concurrent.

At task 1901, controller 1209 directs optical instrument 1260 to adjust—lengthen or shorten—the length of feedstock region 1371-3 (i.e., the length of feedstock 1211 being irradiated by laser beam 1270). This provides controller 1209 with a mechanism for adjusting the temperature of each unit-length of feedstock 1211 when it is deposited and tamped. For example—and assuming that everything else is constant—increasing the length of feedstock region 1371-3 spreads the heat energy of laser beam 1270 over a greater length of feedstock, which decreases the rate at which each unit-length of feedstock is heated. Conversely, decreasing the length of feedstock region 1371-3 concentrates the heat energy, which increases the rate at which each unit-length of feedstock is heated. It will be clear to those skilled in the art, after reading this disclosure, that being able to adjust the length of feedstock region 1371-3 is advantageous for, among other things, compensating for variations in the rate at which feedstock 1211 is deposited and tamped.

At task 1902, controller 1209 directs optical instrument 1260 to adjust—increase or decrease—the distance between pinch line segment 1382 and feedstock region 1371-3. This provides controller 1209 with a mechanism for adjusting the temperature of each unit-length of feedstock 1211 when it is deposited and tamped. For example—and assuming everything else is constant—increasing the distance gives each unit-length of feedstock more time to cool before it is deposited and tamped. Conversely, decreasing the distance gives each unit segment of feedstock less time to cool before it is deposited and tamped. It will be clear to those skilled in the art, after reading this disclosure, that being able to adjust the distance between pinch line segment 1382 and feedstock region 1371-3 is advantageous for, among other things, fine tuning the temperature of each unit-length of feedstock 1211 at the time that it is deposited and tamped.

At task 1903, controller 1209 directs optical instrument 1260 to adjust the irradiance of laser beam 1270 on each unit-length of feedstock 1211 within feedstock region 1371-3. This provides controller 1209 with a mechanism for adjusting the temperature of each unit-length of feedstock 1211 when it is deposited and tamped. For example—and assuming everything else is constant—increasing the irradiance on a unit-length of feedstock 1211 increases the rate at which it is heated. Conversely, decreasing the irradiance on a unit-length of feedstock 1211 decreases the rate at which it is heated. It will be clear to those skilled in the art, after reading this disclosure, that being able to adjust the irradiance of laser beam 1270 on feedstock 1211 is advantageous for, among other things, compensating for variations in the angle of incidence of laser beam 1270 on feedstock 1211 caused by changes in the relative position of optical instrument 1260 to feedstock 1211. These changes are often caused by changes in the contour of workpiece 1206.

At task 1904, controller 1209 directs optical instrument 1260 to adjust the angle of incidence of laser beam 1270 on feedstock 1211 within feedstock region 1371-3. This provides controller 1209 with another mechanism for adjusting the temperature of each unit-length of feedstock 1211 when it is deposited and tamped. For example—and assuming everything else is constant—adjusting the angle of incidence of laser beam 1270 on feedstock 1211 changes the effective irradiance on each unit-length of feedstock 1211. It will be clear to those skilled in the art, after reading this disclosure, that being able to adjust the angle of incidence of laser beam 1270 on feedstock 1211 is advantageous for, among other things, compensating for changes in the relative position of optical instrument 1260 to feedstock 1211. These changes are often caused by changes in the contour of workpiece 1206.

Figure 20:
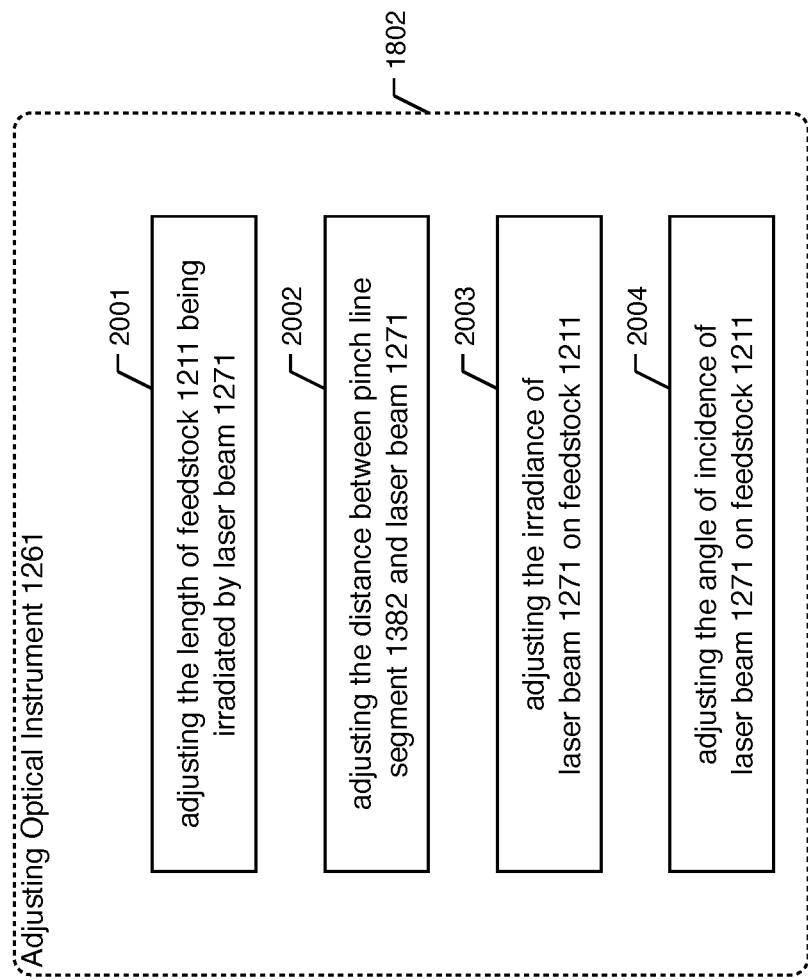
FIG. 20 depicts a flowchart of the details of task 1802—adjusting optical instrument 1261.

FIG. 20 depicts a flowchart of the details of task 1802—adjusting optical instrument 1261. Controller 1209 continually directs optical instrument 1261 to make adjustments, and, therefore, the tasks depicted in FIG. 20 are concurrent.

At task 2001, controller 1209 directs optical instrument 1261 to adjust—lengthen or shorten—the length of feedstock region 1371-2 (i.e., the length of feedstock 1211 being irradiated by laser beam 1271). This provides controller 1209 with a mechanism for adjusting the temperature of each unit-length of feedstock 1211 when it is deposited and tamped. For example—and assuming that everything else is constant—increasing the length of feedstock region 1371-2 spreads the heat energy of laser beam 1271 over a greater length of feedstock, which decreases the rate at which each unit-length of feedstock is heated. Conversely, decreasing the length of feedstock region 1371-2 concentrates the heat energy, which increases the rate at which each unit-length of feedstock is heated. It will be clear to those skilled in the art, after reading this disclosure, that being able to adjust the length of feedstock region 1371-2 is advantageous for, among other things, compensating for variations in the rate at which feedstock 1211 is deposited and tamped.

At task 2002, controller 1209 directs optical instrument 1261 to adjust—increase or decrease—the distance between pinch line segment 1382 and feedstock region 1371-2. This provides controller 1209 with a mechanism for adjusting the temperature of each unit-length of feedstock 1211 when it is deposited and tamped. For example—and assuming everything else is constant—increasing the distance gives each unit-length of feedstock more time to cool before it is deposited and tamped. Conversely, decreasing the distance gives each unit segment of feedstock less time to cool before it is deposited and tamped. It will be clear to those skilled in the art, after reading this disclosure, that being able to adjust the distance between pinch line segment 1382 and feedstock region 1371-2 is advantageous for, among other things, fine tuning the temperature of each unit-length of feedstock 1211 at the time that it is deposited and tamped.

At task 2003, controller 1209 directs optical instrument 1261 to adjust the irradiance of laser beam 1271 on each unit-length of feedstock 1211 within feedstock region 1371-2. This provides controller 1209 with a mechanism for adjusting the temperature of each unit-length of feedstock 1211 when it is deposited and tamped. For example—and assuming everything else is constant—increasing the irradiance on a unit-length of feedstock 1211 increases the rate at which it is heated. Conversely, decreasing the irradiance on a unit-length of feedstock 1211 decreases the rate at which it is heated. It will be clear to those skilled in the art, after reading this disclosure, that being able to adjust the irradiance of laser beam 1271 on feedstock 1211 is advantageous for, among other things, compensating for variations in the angle of incidence of laser beam 1271 on feedstock 1211 caused by changes in the relative position of optical instrument 1261 to feedstock 1211. These changes are often caused by changes in the contour of workpiece 1206.

At task 2004, controller 1209 directs optical instrument 1261 to adjust the angle of incidence of laser beam 1271 on feedstock 1211 within feedstock region 1371-2. This provides controller 1209 with another mechanism for adjusting the temperature of each unit-length of feedstock 1211 when it is deposited and tamped. For example—and assuming everything else is constant—adjusting the angle of incidence of laser beam 1271 on feedstock 1211 changes the effective irradiance on each unit-length of feedstock 1211. It will be clear to those skilled in the art, after reading this disclosure, that being able to adjust the angle of incidence of laser beam 1271 on feedstock 1211 is advantageous for, among other things, compensating for changes in the relative position of optical instrument 1261 to feedstock 1211. These changes are often caused by changes in the contour of workpiece 1206.

Figure 21:
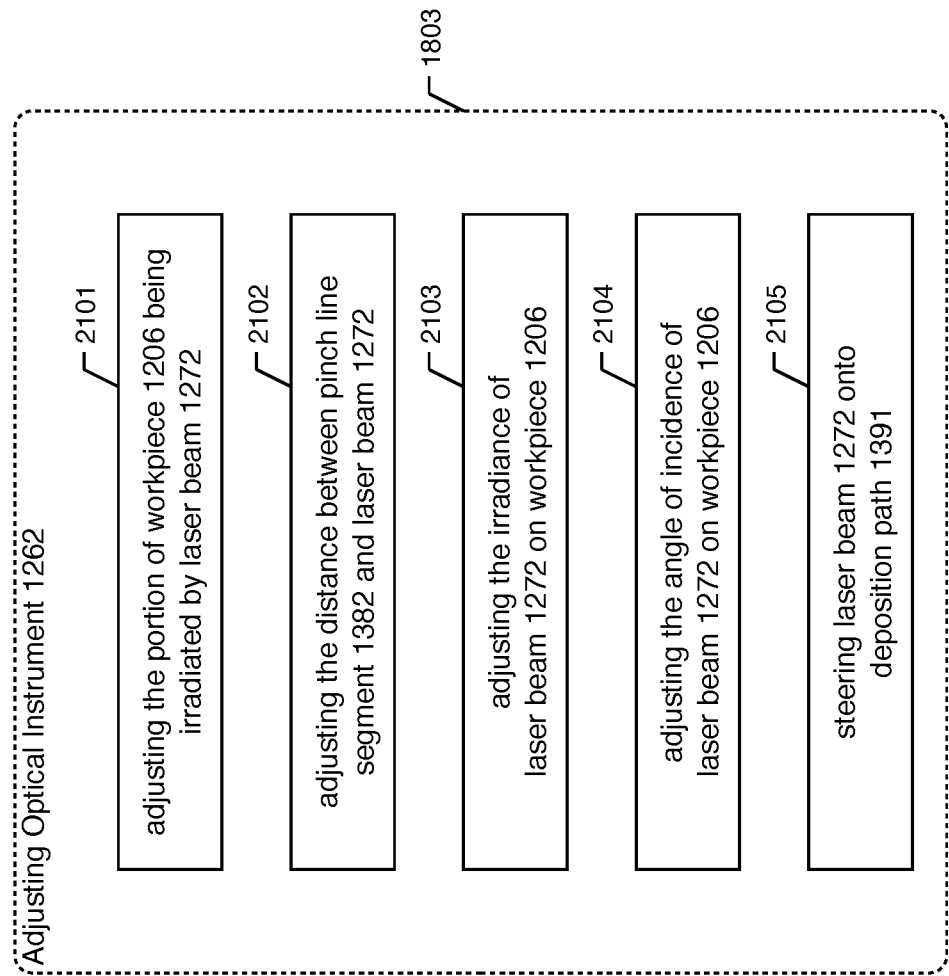
FIG. 21 depicts a flowchart of the details of task 1803—adjusting optical instrument 1262.

FIG. 21 depicts a flowchart of the details of task 1803—adjusting optical instrument 1262. Controller 1209 continually directs optical instrument 1262 to make adjustments, and, therefore, the tasks depicted in FIG. 21 are concurrent.

At task 2101, controller 1209 directs optical instrument 1262 to adjust—lengthen or shorten—the length of workpiece region 1372-2 (i.e., the portion of workpiece 1206 being irradiated by laser beam 1272). This provides controller 1209 with a mechanism for adjusting the temperature of each unit portion of workpiece 1206 when it is deposited and tamped. For example—and assuming that everything else is constant—increasing the length of workpiece region 1372-2 spreads the heat energy of laser beam 1272 over a greater portion of workpiece 1206, which decreases the rate at which each unit portion of workpiece 1206 is heated. Conversely, decreasing the length of workpiece region 1372-2 concentrates the heat energy, which increases the rate at which each unit portion of workpiece 1206 is heated. It will be clear to those skilled in the art, after reading this disclosure, that being able to adjust the length of workpiece region 1372-2 is advantageous for, among other things, compensating for variations in the rate at which feedstock 1211 is deposited and tamped.

At task 2102, controller 1209 directs optical instrument 1262 to adjust—increase or decrease—the distance between pinch line 1382 and workpiece region 1372-2. This provides controller 1209 with a mechanism for adjusting the temperature of each unit portion of workpiece 1206 when it is deposited and tamped. For example—and assuming everything else is constant—increasing the distance gives each unit portion of workpiece 1206 more time to cool before it is deposited and tamped. Conversely, decreasing the distance gives each unit segment of feedstock less time to cool before it is deposited and tamped. It will be clear to those skilled in the art, after reading this disclosure, that being able to adjust the distance between pinch line segment 1382 and workpiece region 1372-2 is advantageous for, among other things, fine tuning the temperature of each unit portion of workpiece 1206 at the time that the corresponding segment of feedstock 1211 is deposited and tamped.

At task 2103, controller 1209 directs optical instrument 1262 to adjust the irradiance of laser beam 1272 on each unit portion of workpiece 1206 within workpiece region 1372-2. This provides controller 1209 with a mechanism for adjusting the temperature of each unit portion of workpiece 1206 at the time that the corresponding segment of feedstock 1211 is deposited and tamped. For example—and assuming everything else is constant—increasing the irradiance on a unit portion of workpiece 1206 increases the rate at which it is heated. Conversely, decreasing the irradiance on a unit-area of workpiece 1206 decreases the rate at which it is heated. It will be clear to those skilled in the art, after reading this disclosure, that being able to adjust the irradiance of laser beam 1272 on workpiece 1206 is advantageous for, among other things, compensating for variations in the angle of incidence of laser beam 1272 on workpiece 1206 caused by changes in the relative position of optical instrument 1262 to workpiece 1206. These changes are often caused by changes in the contour of workpiece 1206.

At task 2104, controller 1209 directs optical instrument 1262 to adjust the angle of incidence of laser beam 1272 on workpiece 1206 within workpiece region 1372-2. This provides controller 1209 with another mechanism for adjusting the temperature of each unit portion of workpiece 1206 when it is deposited and tamped. For example—and assuming everything else is constant—adjusting the angle of incidence of laser beam 1272 on workpiece 1206 changes the effective irradiance on each unit portion of workpiece 1206. It will be clear to those skilled in the art, after reading this disclosure, that being able to adjust the angle of incidence of laser beam 1272 on workpiece 1206 is advantageous for, among other things, compensating for changes in the relative position of optical instrument 1262 to workpiece 1206. These changes are often caused by changes in the contour of workpiece 1206.

At task 2105, controller 1209 directs optical instrument 1262 to steer laser beam 1272 onto deposition path 1391.

In accordance with the second illustrative, sensor array 1215 is not mechanically steered onto workpiece region 1372-1, workpiece region 1372-2, or workpiece region 1372-3. Instead, controller 1209 picks the temperature measurements for workpiece region 1372-1, workpiece region 1372-2, or workpiece region 1372-3 out of the thermal image from sensor array 1215 based on the location of deposition path 1391 in that image. It will be clear to those skilled in the art, after reading this disclosure, how to accomplish this.

Figure 22:
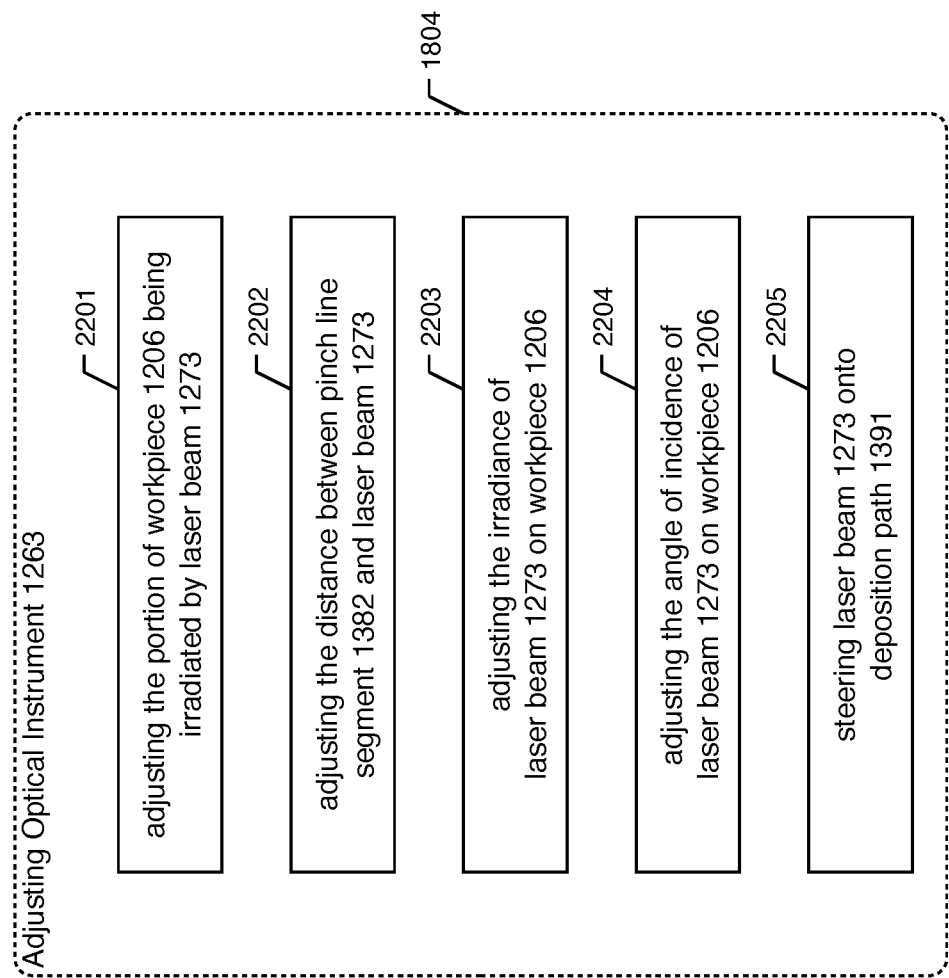
FIG. 22 depicts a flowchart of the details of task 1804—adjusting optical instrument 1263.

FIG. 22 depicts a flowchart of the details of task 1804—adjusting optical instrument 1263. Controller 1209 continually directs optical instrument 1263 to make adjustments, and, therefore, the tasks depicted in FIG. 22 are concurrent.

At task 2201, controller 1209 directs optical instrument 1263 to adjust—lengthen or shorten—the length of workpiece region 1372-3 (i.e., the portion of workpiece 1206 being irradiated by laser beam 1273). This provides controller 1209 with a mechanism for adjusting the temperature of each unit portion of workpiece 1206 when it is deposited and tamped. For example—and assuming that everything else is constant—increasing the length of workpiece region 1372-3 spreads the heat energy of laser beam 1273 over a greater portion of workpiece 1206, which decreases the rate at which each unit portion of workpiece 1206 is heated. Conversely, decreasing the length of workpiece region 1372-3 concentrates the heat energy, which increases the rate at which each unit portion of workpiece 1206 is heated. It will be clear to those skilled in the art, after reading this disclosure, that being able to adjust the length of workpiece region 1372-3 is advantageous for, among other things, compensating for variations in the rate at which feedstock 1211 is deposited and tamped.

At task 2202, controller 1209 directs optical instrument 1263 to adjust—increase or decrease—the distance between pinch line 1382 and workpiece region 1372-3. This provides controller 1209 with a mechanism for adjusting the temperature of each unit portion of workpiece 1206 when it is deposited and tamped. For example—and assuming everything else is constant—increasing the distance gives each unit portion of workpiece 1206 more time to cool before it is deposited and tamped. Conversely, decreasing the distance gives each unit segment of feedstock less time to cool before it is deposited and tamped. It will be clear to those skilled in the art, after reading this disclosure, that being able to adjust the distance between pinch line segment 1382 and workpiece region 1372-3 is advantageous for, among other things, fine tuning the temperature of each unit portion of workpiece 1206 at the time that the corresponding segment of feedstock 1211 is deposited and tamped.

At task 2203, controller 1209 directs optical instrument 1263 to adjust the irradiance of laser beam 1273 on each unit portion of workpiece 1206 within workpiece region 1372-3. This provides controller 1209 with a mechanism for adjusting the temperature of each unit portion of workpiece 1206 at the time that the corresponding segment of feedstock 1211 is deposited and tamped. For example—and assuming everything else is constant—increasing the irradiance on a unit portion of workpiece 1206 increases the rate at which it is heated. Conversely, decreasing the irradiance on a unit-area of workpiece 1206 decreases the rate at which it is heated. It will be clear to those skilled in the art, after reading this disclosure, that being able to adjust the irradiance of laser beam 1273 on workpiece 1206 is advantageous for, among other things, compensating for variations in the angle of incidence of laser beam 1273 on workpiece 1206 caused by changes in the relative position of optical instrument 1263 to workpiece 1206. These changes are often caused by changes in the contour of workpiece 1206.

At task 2204, controller 1209 directs optical instrument 1263 to adjust the angle of incidence of laser beam 1273 on workpiece 1206 within workpiece region 1372-3. This provides controller 1209 with another mechanism for adjusting the temperature of each unit portion of workpiece 1206 when it is deposited and tamped. For example—and assuming everything else is constant—adjusting the angle of incidence of laser beam 1273 on workpiece 1206 changes the effective irradiance on each unit portion of workpiece 1206. It will be clear to those skilled in the art, after reading this disclosure, that being able to adjust the angle of incidence of laser beam 1273 on workpiece 1206 is advantageous for, among other things, compensating for changes in the relative position of optical instrument 1263 to workpiece 1206. These changes are often caused by changes in the contour of workpiece 1206.

At task 2205, controller 1209 directs optical instrument 1263 to steer laser beam 1273 onto deposition path 1391.

Figure 23:
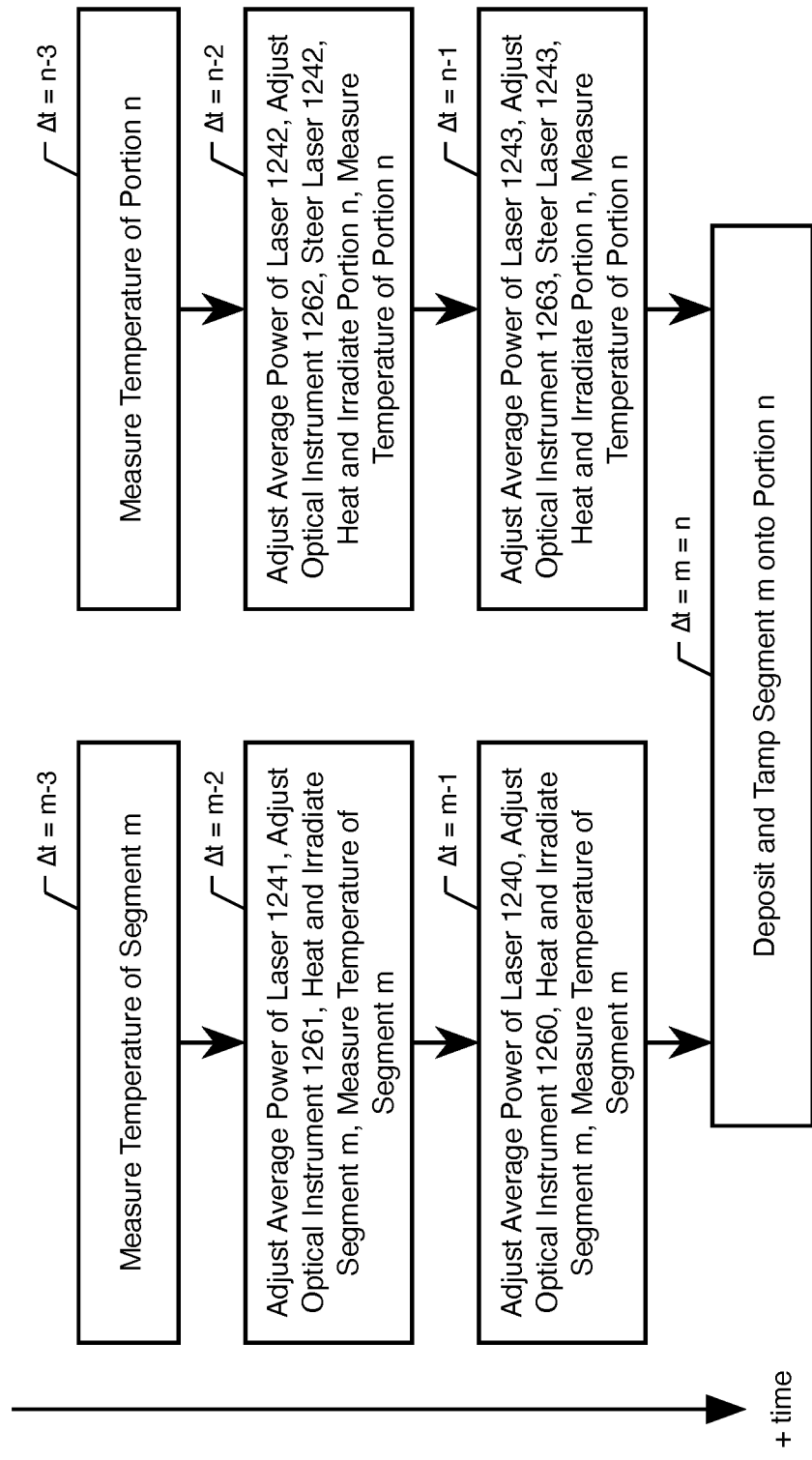
FIG. 23 depicts a flowchart of the relative timing of the tasks performed on segment m of feedstock 1211 and on portion n of workpiece 1206, wherein m and n are integers. In accordance with the second illustrative embodiment segment m of feedstock 1211 is deposited and tamped onto portion n of workpiece 1206.

FIG. 23 depicts a flowchart of the relative timing of the tasks performed on segment m of feedstock 1211 and on portion n of workpiece 1206, wherein m and n are integers. In accordance with the second illustrative embodiment segment m of feedstock 1211 is deposited and tamped onto portion n of workpiece 1206.

During time-interval $\Delta t=m-3$, the temperature of segment m of feedstock 1211 is measured by thermal sensor 1571-1 and reported to controller 1209.

During time-interval Δt=n−3, the temperature of portion n of workpiece 1206 is measured by thermal sensor 1572-1 and reported to controller 1209.

In accordance with the second illustrative embodiment, the duration of time-interval Δt=m−3 equals the duration of time-interval Δt=n−3, and time-interval Δt=m−3 is contemporaneous with time-interval Δt=n−3. It will be clear to those skilled in the art, however, after reading this disclosure, how to make and use alternative embodiments of the present invention in which the duration of time-interval Δt=m−3 does not equal the duration of time-interval Δt=n−3. Furthermore, it will be clear to those skilled in the art, after reading this disclosure, how to make and use alternative embodiments of the present invention in which time-interval Δt=m−3 is not contemporaneous with time-interval Δt=n−3. And still furthermore, it will be clear to those skilled in the art, after reading this disclosure, how to make and use alternative embodiments of the present invention in which time-interval Δt=m−3 overlaps, immediately precedes, immediately succeeds, precedes but not immediately, or succeeds but not immediately time-interval Δt=n−3.

During time-interval Δt=m−2:
  (i) controller 1209 directs feedstock laser 1241 to generate laser beam 1271 with a given average power, and
  (ii) controller 1209 directs optical instrument 1261 to adjust a trait of laser beam 1271 and/or the relationship of laser beam 1271 to feedstock 1211, and
  (iii) optical instrument 1261 irradiates and heats segment m of feedstock 1211, and
  (iv) the temperature of segment m of feedstock 1211 is measured by thermal sensor 1571-2 and reported to controller 1209.

In accordance with the second illustrative embodiment, the duration of time-interval Δt=m−2 equals the duration of Δt=m−3. It will be clear to those skilled in the art, however, after reading this disclosure, how to make and use alternative embodiments of the present invention in which the duration of time-interval Δt=m−2 does not equal the duration of time interval Δt=m−3. Furthermore, in accordance with the second illustrative embodiment, time-interval Δt=m−2 is after, and is mutually-exclusive of, time-interval Δt=m−3. It will be clear to those skilled in the art, however, after reading this disclosure, how to make and use alternative embodiments of the present invention in which time-interval Δt=m−2 overlaps, immediately succeeds, or succeeds but not immediately, time-interval Δt=m−3.

During time-interval Δt=n−2:
  (i) controller 1209 directs workpiece laser 1242 to generate laser beam 1272 with a given average power, and
  (ii) controller 1209 directs optical instrument 1262 to adjust a trait of laser beam 1272 and/or the relationship of laser beam 1272 to workpiece 1206, and
  (iii) controller 1209 directs optical instrument 1262 to steer laser beam 1272 onto deposition path 1391, and
  (iv) optical instrument 1262 irradiates and heats portion n of workpiece 1206, and
  (v) the temperature of portion n of workpiece 1206 is measured by thermal sensor 1572-2 and reported to controller 1209.

In accordance with the second illustrative embodiment, the duration of time-interval Δt=n−2 equals the duration of Δt=n−3. It will be clear to those skilled in the art, however, after reading this disclosure, how to make and use alternative embodiments of the present invention in which the duration of time-interval Δt=n−2 does not equal the duration of time interval Δt=n−3. Furthermore, in accordance with the second illustrative embodiment, time-interval Δt=n−2 is after, and is mutually-exclusive of, time-interval Δt=n−3. It will be clear to those skilled in the art, however, after reading this disclosure, how to make and use alternative embodiments of the present invention in which time-interval Δt=n−2 overlaps, immediately succeeds, or succeeds but not immediately, time-interval Δt=n−3.

In accordance with the second illustrative embodiment, the duration of time-interval Δt=m−2 equals the duration of time-interval Δt=n−2, and time-interval Δt=m−2 is contemporaneous with time-interval Δt=n−2. It will be clear to those skilled in the art, however, after reading this disclosure, how to make and use alternative embodiments of the present invention in which the duration of time-interval Δt=m−2 does not equal the duration of time-interval Δt=n−2. Furthermore, it will be clear to those skilled in the art, after reading this disclosure, how to make and use alternative embodiments of the present invention in which time-interval Δt=m−2 is not contemporaneous with time-interval Δt=n−2. And still furthermore, it will be clear to those skilled in the art, after reading this disclosure, how to make and use alternative embodiments of the present invention in which time-interval Δt=m−2 overlaps, immediately precedes, immediately succeeds, precedes but not immediately, or succeeds but not immediately time-interval Δt=n−2.

During time-interval Δt=m−1:
  (i) controller 1209 directs feedstock laser 1240 to generate laser beam 1270 with a given average power, and
  (ii) controller 1209 directs optical instrument 1260 to adjust a trait of laser beam 1270 and/or the relationship of laser beam 1270 to feedstock 1211, and
  (iii) optical instrument 1260 irradiates and heats segment m of feedstock 1211, and
  (iv) the temperature of segment m of feedstock 1211 is measured by thermal sensor 1571-3 and reported to controller 1209.

In accordance with the second illustrative embodiment, the duration of time-interval Δt=m−1 equals the duration of Δt=m−2. It will be clear to those skilled in the art, however, after reading this disclosure, how to make and use alternative embodiments of the present invention in which the duration of time-interval Δt=m−1 does not equal the duration of time interval Δt=m−2. Furthermore, in accordance with the second illustrative embodiment, time-interval Δt=m−1 is after, and is mutually-exclusive of, time-interval Δt=m−2. It will be clear to those skilled in the art, however, after reading this disclosure, how to make and use alternative embodiments of the present invention in which time-interval Δt=m−1 overlaps, immediately succeeds, or succeeds but not immediately, time-interval Δt=m−2.

During time-interval Δt=n−1:
  (i) controller 1209 directs workpiece laser 1243 to generate laser beam 1273 with a given average power, and
  (ii) controller 1209 directs optical instrument 1263 to adjust a trait of laser beam 1273 and/or the relationship of laser beam 1273 to workpiece 1206, and
  (iii) controller 1209 directs optical instrument 1263 to steer laser beam 1273 onto deposition path 1391, and
  (iv) optical instrument 1263 irradiates and heats portion n of workpiece 1206, and
  (v) the temperature of portion n of workpiece 1206 is measured by thermal sensor 1572-3 and reported to controller 1209.

In accordance with the second illustrative embodiment, the duration of time-interval Δt=n−1 equals the duration of Δt=n−2. It will be clear to those skilled in the art, however, after reading this disclosure, how to make and use alternative embodiments of the present invention in which the duration of time-interval $\Delta t=n-1$ does not equal the duration of time interval $\Delta t=n-2$. Furthermore, in accordance with the second illustrative embodiment, time-interval $\Delta t=n-1$ is after, and is mutually-exclusive of, time-interval $\Delta t=n-2$. It will be clear to those skilled in the art, however, after reading this disclosure, how to make and use alternative embodiments of the present invention in which time-interval $\Delta t=n-1$ overlaps, immediately succeeds, or succeeds but not immediately, time-interval $\Delta t=n-2$.

In accordance with the second illustrative embodiment, the duration of time-interval $\Delta t=m-1$ equals the duration of time-interval $\Delta t=n-1$, and time-interval $\Delta t=m-1$ is contemporaneous with time-interval $\Delta t=n-1$. It will be clear to those skilled in the art, however, after reading this disclosure, how to make and use alternative embodiments of the present invention in which the duration of time-interval $\Delta t=m-1$ does not equal the duration of time-interval $\Delta t=n-1$. Furthermore, it will be clear to those skilled in the art, after reading this disclosure, how to make and use alternative embodiments of the present invention in which time-interval $\Delta t=m-1$ is not contemporaneous with time-interval $\Delta t=n-1$. And still furthermore, it will be clear to those skilled in the art, after reading this disclosure, how to make and use alternative embodiments of the present invention in which time-interval $\Delta t=m-1$ overlaps, immediately precedes, immediately succeeds, precedes but not immediately, or succeeds but not immediately time-interval $\Delta t=n-1$.

During time-interval $\Delta t=m=n$, segment m of feedstock 1211 is deposited and tamped onto portion n of workpiece 1206.

In accordance with the second illustrative embodiment, the duration of time-interval $\Delta t=m$ equals the duration of $\Delta t=m-1$. It will be clear to those skilled in the art, however, after reading this disclosure, how to make and use alternative embodiments of the present invention in which the duration of time-interval $\Delta t=m$ does not equal the duration of time interval $\Delta t=m-1$. Furthermore, in accordance with the second illustrative embodiment, time-interval $\Delta t=m$ is after, and is mutually-exclusive of, time-interval $\Delta t=m-1$. It will be clear to those skilled in the art, however, after reading this disclosure, how to make and use alternative embodiments of the present invention in which time-interval $\Delta t=m$ overlaps, immediately succeeds, or succeeds but not immediately, time-interval $\Delta t=m-1$.

In accordance with the second illustrative embodiment, the duration of time-interval $\Delta t=n$ equals the duration of $\Delta t=n-1$. It will be clear to those skilled in the art, however, after reading this disclosure, how to make and use alternative embodiments of the present invention in which the duration of time-interval $\Delta t=n$ does not equal the duration of time interval $\Delta t=n-1$. Furthermore, in accordance with the second illustrative embodiment, time-interval $\Delta t=n$ is after, and is mutually-exclusive of, time-interval $\Delta t=n-1$. It will be clear to those skilled in the art, however, after reading this disclosure, how to make and use alternative embodiments of the present invention in which time-interval $\Delta t=n$ overlaps, immediately succeeds, or succeeds but not immediately, time-interval $\Delta t=n-1$.

Figure 24:
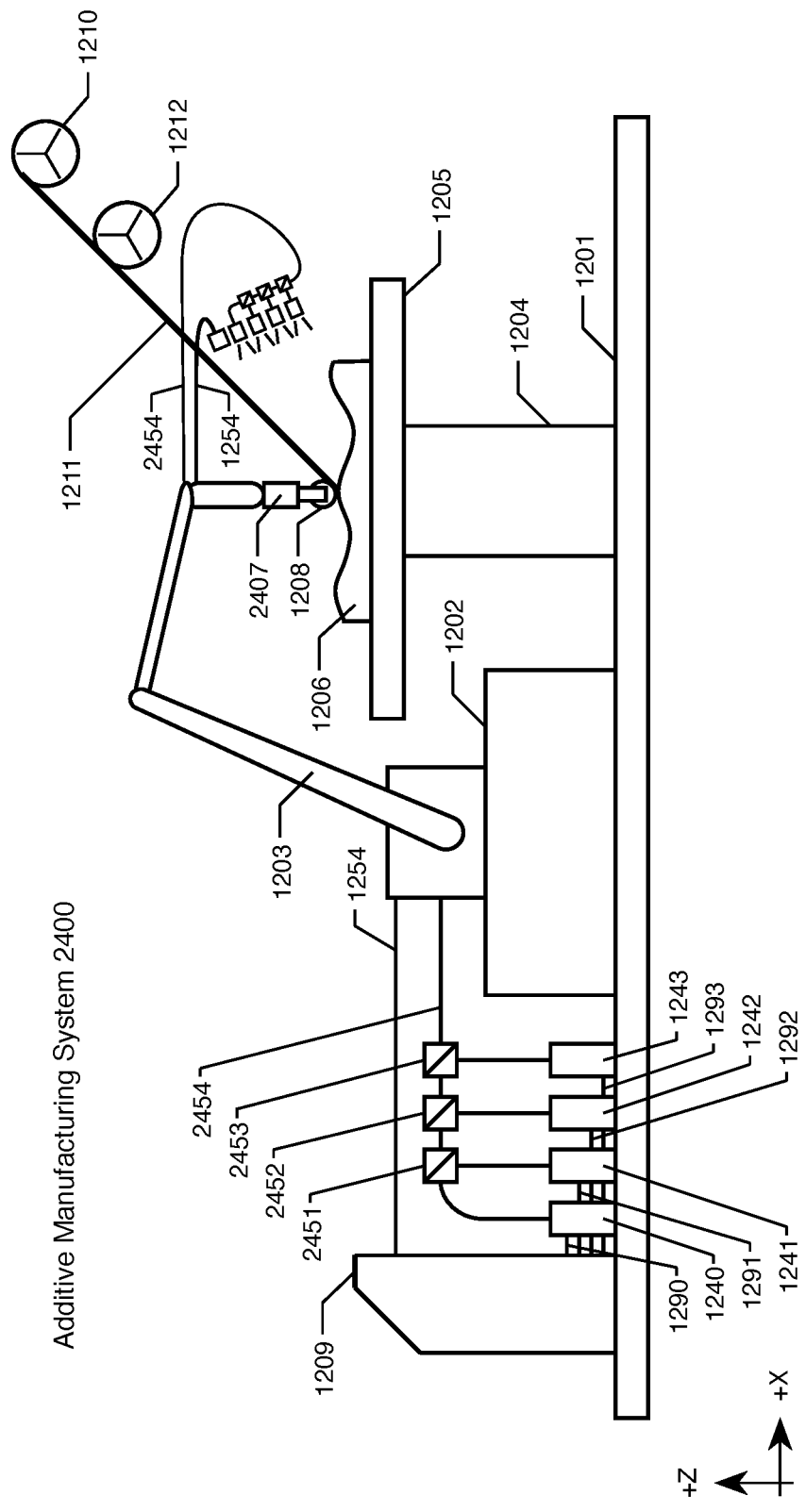
FIG. 24 depicts an illustration of additive manufacturing system 2400 in accordance with the third illustrative embodiment of the present invention.

FIG. 24 depicts an illustration of additive manufacturing system 2400 in accordance with the third illustrative embodiment of the present invention. Additive manufacturing system 2400 fabricates an article of manufacture by successively depositing segments of fiber-reinforced thermoplastic feedstock (e.g., filament, tape, etc.) onto a workpiece until the article of manufacture is complete.

Additive manufacturing system 2400 is identical to additive manufacturing system 1200 fabricates in that they both fabricate an article of manufacture by successively depositing segments of fiber-reinforced thermoplastic feedstock (e.g., filament, tape, etc.) onto a workpiece until the article of manufacture is complete. Furthermore, most of the components of system 2400 are identical to their counterparts in system 1200 and perform exactly the same function in exactly the same way.

For example, the heating and sensor architecture for additive manufacturing system 2400 is identical to that for additive manufacturing system 1200 as described in FIG. 15 and the accompanying text. The sensor and control architecture for that portion of additive manufacturing system 2400 is identical to that for additive manufacturing system 1200 as described in FIG. 16 and the accompanying text. A flowchart of the tasks performed by additive manufacturing system 2400 is identical to that for additive manufacturing system 1200 as described in FIGS. 17, 18, 19, 20, and 21. And a flowchart of the relative timing of the tasks performed by additive manufacturing system 2400 is identical to that for additive manufacturing system 1200 as described in FIG. 22.

In contrast, additive manufacturing system 2400 is unlike additive manufacturing system 1200 in that system 2400:
  (i) multiplexes the laser beams onto a single optical cable for transport between the lasers and deposition head 1207, and
  (ii) employs lasers whose laser beams are characterized by different wavelengths to facilitate the multiplexing and demultiplexing of the laser beams.

U.S. patent application Ser. No. 16/690,765, entitled "Heater for Thermoplastic Filament and Workpiece," filed Nov. 21, 2019 is incorporated by reference for the purpose of disclosing:
  (i) multi-beam heating systems for additive manufacturing of fiber-reinforced thermoplastics, and
  (ii) one- and two-stage laser heating systems for fiber-reinforced thermoplastic feedstock (e.g., filament, tape, etc), and
  (iii) one- and two-stage laser heating system for fiber-reinforced thermoplastic workpieces, and
  (iv) multiplexing laser beams for use in the heating of fiber-reinforced feedstock and workpieces.

Additive manufacturing system 2400 comprises: platform 1201, robot mount 1202, robot 1203, build plate support 1204, build plate 1205, workpiece 1206, deposition head 2407, tamping tool 1208, controller 1209, feedstock reel 1210, feedstock 1211, accumulator 1212, force gauge 1213, sensor array 1215, feedstock laser 2440, feedstock laser 2441, workpiece laser 2442, feedstock laser 2443, optical cable 2454, sensor cable 1254, optical instrument 1260, optical instrument 1261, optical instrument 1262, optical instrument 1263, laser beam 1270, laser beam 1271, laser beam 1272, laser beam 1273, feedstock laser control cable 1291, workpiece laser control cable 1292, beam combiner 2451, beam combiner 2452, beam combiner 2453, beam splitter 2461, beam splitter 2462, and beam splitter 2463, interrelated as shown.

Figure 25:
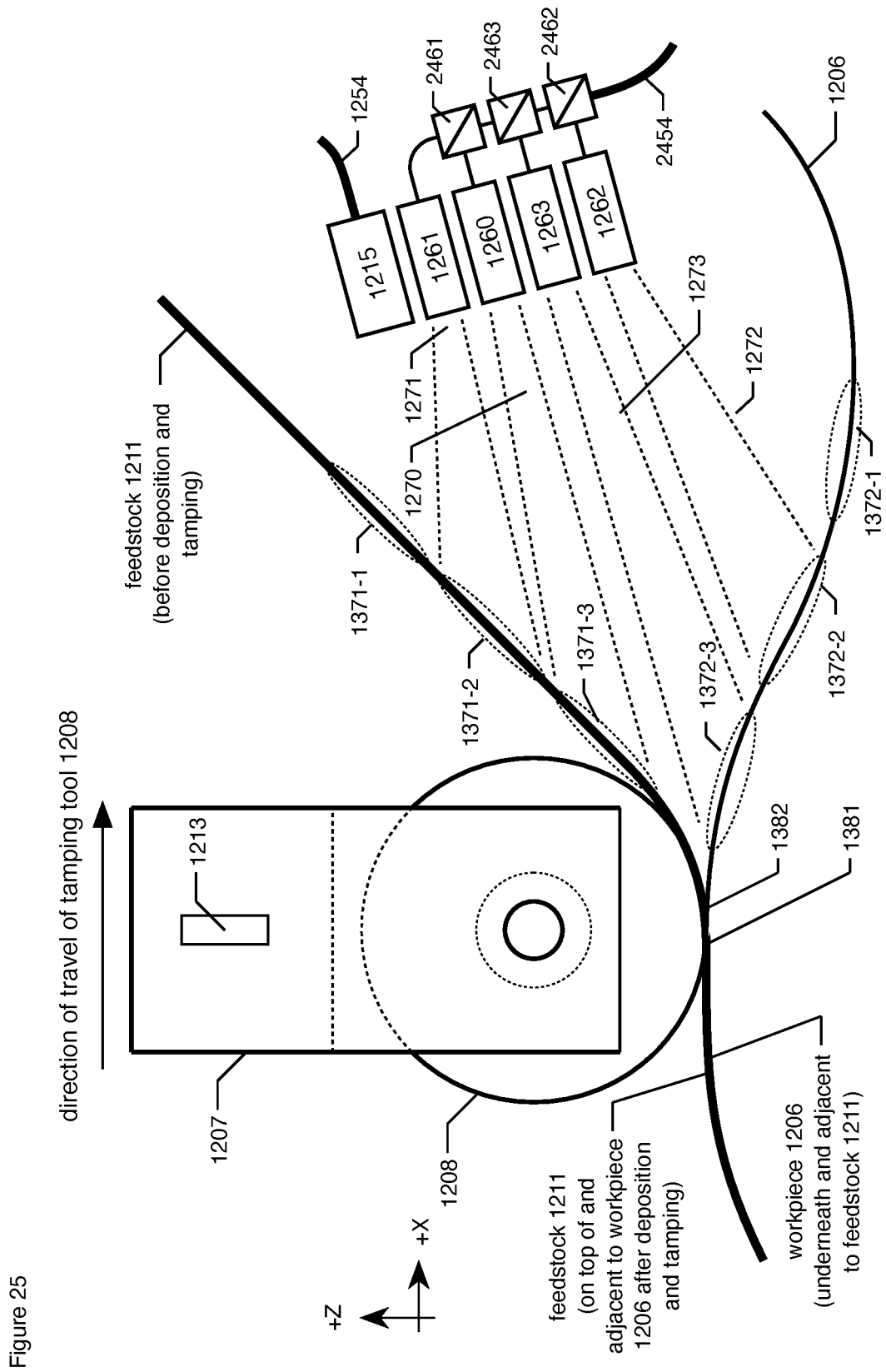
FIG. 25 depicts a close-up of workpiece 1206, deposition head 1207, tamping tool 1208, feedstock 1211, sensor array 1215, optical instrument 1260, optical instrument 1261, optical instrument 1262, optical instrument 1263, optical cable 2454, sensor cable 1254, laser beam 1270, laser beam 1271, laser beam 1272, laser beam 1273, feedstock region 1371-1, feedstock region 1371-2, feedstock region 1371-3, workpiece region 1372-1, workpiece region 1372-2, workpiece region 1372-3, nip line segment 1381, and pinch line segment 1382, beam splitter 2461, beam splitter 2462, and beam splitter 2463, interrelated as shown.

FIG. 25 depicts a close-up of workpiece 1206, deposition head 2407, tamping tool 1208, feedstock 1211, sensor array 1215, optical instrument 1260, optical instrument 1261, optical instrument, 1262, optical instrument 1263, optical cable 2454, sensor cable 1254, laser beam 1270, laser beam 1271, laser beam 1272, laser beam 1273, feedstock region 1371-1, feedstock region 1371-2, feedstock region 1371-3, workpiece region 1372-1, workpiece region 1372-2, workpiece region 1372-3, nip line segment 1381, and pinch line segment 1382, beam splitter 2461, beam splitter 2462, and beam splitter 2463, interrelated as shown.

Deposition head 2407 is identical to deposition head 1207 except that is also comprises beam splitter 2461, beam splitter 2462, and beam splitter 2463, and structural support for beam splitter 2461, beam splitter 2462, and beam splitter 2463.

Feedstock laser 2440 is identical to feedstock laser 1240 in that it generates laser beam 1270 for optical instrument 1260. It will be clear to those skilled in the art how to make and use feedstock laser 2440.

Feedstock laser 2441 is identical to feedstock laser 1241 in that it generates laser beam 1271 for optical instrument 1261 except that it is characterized by a wavelength λ=905 nm. It will be clear to those skilled in the art how to make and use feedstock laser 2441.

Workpiece laser 2442 is identical to workpiece laser 1242 in that it generates laser beam 1272 for optical instrument 1262 except that it is characterized by a wavelength λ=955 nm. It will be clear to those skilled in the art how to make and use workpiece laser 2441.

Workpiece laser 2443 is identical to workpiece laser 1243 in that it generates laser beam 1273 for optical instrument 1263 except that it is characterized by a wavelength λ=930 nm. It will be clear to those skilled in the art how to make and use workpiece laser 2442.

Optical cable 2454 is a glass fiber, in well-known fashion, that carries laser beam 1270, laser beam 1271, laser beam 1272, and laser beam 1273 from feedstock laser 2441 from beam combiner 2453 to beam splitter 2462 with substantially no loss. It will be clear to those skilled in the art how to make and use optical cable 2454.

Beam combiner 2451 is a dichroic beam combiner, in well-known fashion, that combines laser beam 1270 and laser beam 1271. It will be clear to those skilled in the art how to make and use beam combiner 2451.

Beam combiner 2452 is a dichroic beam combiner, in well-known fashion, that combines laser beam 1272 to the combination of laser beam 1270 and laser beam 1271. It will be clear to those skilled in the art how to make and use beam combiner 2452.

Beam combiner 2453 is a dichroic beam combiner, in well-known fashion, that combines laser beam 1273 to the combination of laser beam 1270, laser beam 1271, and laser beam 1272. It will be clear to those skilled in the art how to make and use beam combiner 2453.

Beam splitter 2462 is a dichroic beam splitter, in well-known fashion, that splits laser beam 1272 from the combination of laser beam 1270, laser beam 1271, laser beam 1272, and laser beam 1273. It will be clear to those skilled in the art how to make and use beam splitter 2462.

Beam splitter 2463 is a dichroic beam splitter, in well-known fashion, that splits laser beam 1273 from the combination of laser beam 1270, laser beam 1271, and laser beam 1273. It will be clear to those skilled in the art how to make and use beam splitter 2463.

Beam splitter 2461 is a dichroic beam splitter, in well-known fashion, that splits laser beam 1270 and laser beam 1271 from the combination of laser beam 1270 and laser beam 1271. It will be clear to those skilled in the art how to make and use beam splitter 2461.

The sensor and control architecture for that portion of additive manufacturing system 2400 is identical to that for additive manufacturing system 1200 as described in FIG. 16 and the accompanying text.

A flowchart of the tasks performed by additive manufacturing system 2400 is identical to that for additive manufacturing system 1200 as described in FIGS. 17, 18, 19, 20, and A flowchart of the relative timing of the tasks performed by additive manufacturing system 2400 is identical to that for additive manufacturing system 1200 as described in FIG. 22.

Figure 26:
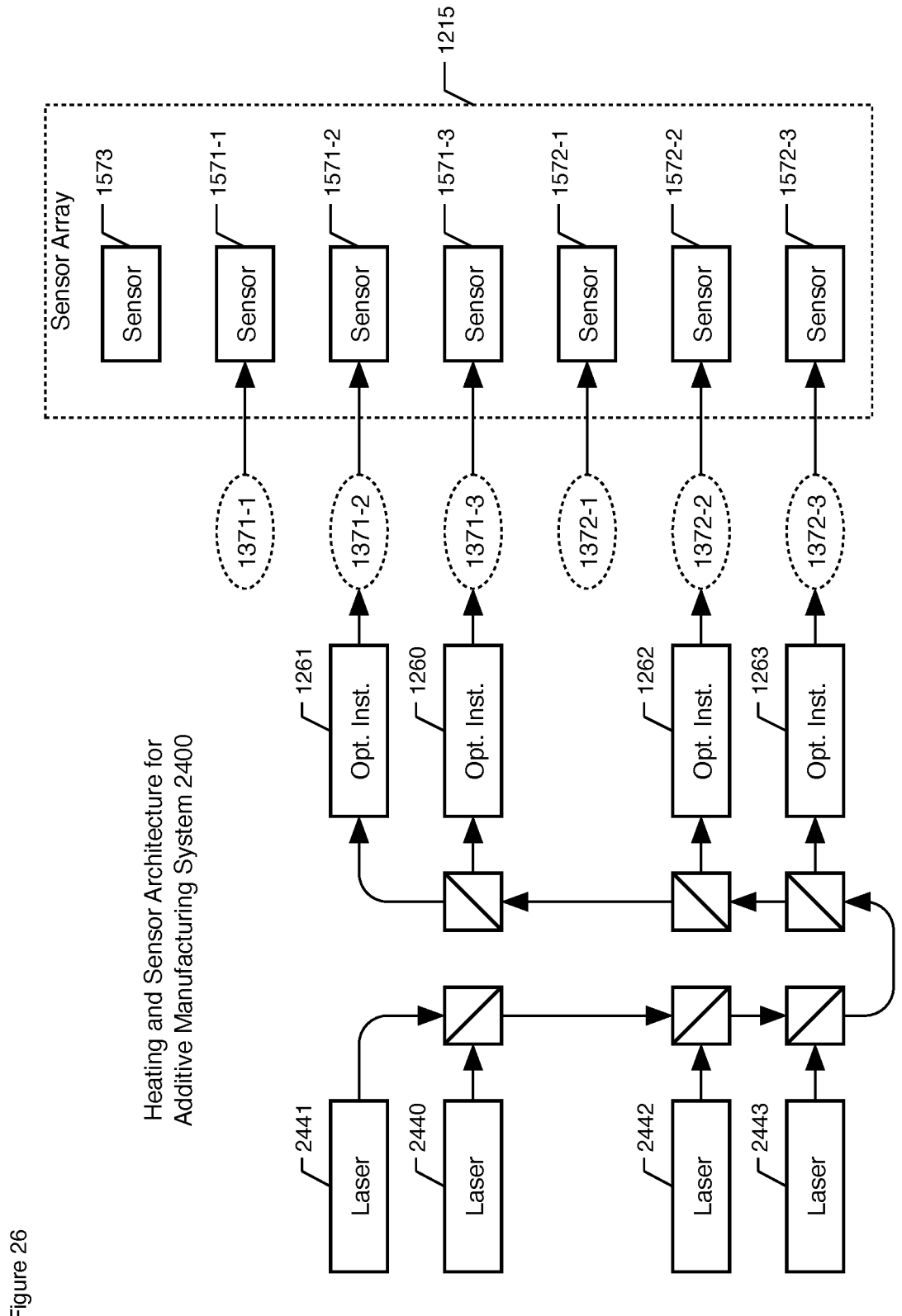
FIG. 26 depicts a schematic diagram of the heating and sensor architecture for additive manufacturing system 2400, which irradiates and heats feedstock 1211 and workpiece 1206 and measures the temperature of feedstock 1211, workpiece 1206, and tamping tool 1208.

FIG. 26 depicts a schematic diagram of the heating and sensor architecture for additive manufacturing system 2400, which irradiates and heats feedstock 1211 and workpiece 1206 and measures the temperature of feedstock 1211, workpiece 1206, and tamping tool 1208. In most respects, the heating and sensor architecture for additive manufacturing system 2400 is identical to that for system 1200, except for the addition of the multiplexing of laser beams. To wit, and as shown in FIG. 26:

(i) feedstock laser 1240 provides laser beam 1270 to optical instrument 1260 via beam combiner 2451, optical cable 2454, and beam splitter 2461, and (ii) feedstock laser 1241 provides laser beam 1271 to optical instrument 1261 via beam combiner 2451, optical cable 2454, and beam splitter 2461, and (iii) workpiece laser 1242 provides laser beam 1272 to optical instrument 1262 via beam combiner 2452, optical cable 2454, and beam splitter 2462, and (iv) workpiece laser 1243 provides laser beam 1273 to optical instrument 1263 via beam combiner 2452, optical cable 2454, and beam splitter 2463.

In all other respects, the heating and sensor system 2400 is identical to that for system 1200.

Although the third illustrative embodiment employs 4:1 multiplexing, it will be clear to those skilled in the art, after reading this disclosure, how to make and use alternative embodiments of the present invention that employ N:1 multiplexing, where N is a positive integer greater than 1 (e.g., 2, 3, 5, 6, 7, 8, 10, 20, 500, 100, 500, etc.).

What is claimed is:

1. A method for additive manufacturing, the method comprising:

generating, with a first laser, a first laser beam, wherein the first laser beam is characterized by a first wavelength;

generating, with a second laser, a second laser beam, wherein the second laser beam is characterized by a second wavelength;

receiving, with an optical combiner, the first laser beam from the first laser and the second laser beam from the second laser and for combining the first laser beam and the second laser beam into a spatially-combined laser beam;

spatially extracting, with an optical splitter, the first laser beam and the second laser beam from the spatially-combined laser beam;

receiving, with a first optical instrument, the first laser beam from the optical splitter and irradiating and heating a segment of a feedstock with the first laser beam during a first time-interval, wherein the first laser beam has a first average power during the first time-interval;

receiving, with a second optical instrument, the second laser beam from the optical splitter and for irradiating and heating a portion of a workpiece with the second laser beam during a second time-interval, wherein the second laser beam has a second average power during the second time-interval; and tamping, with a tamping tool, the segment of the feedstock onto the portion of the workpiece during a third time-interval, wherein the third time-interval is after, and is mutually exclusive of, the first time-interval, and wherein the third time-interval is after, and mutually exclusive of, the second time-interval.

2. The method of claim 1 wherein the first wavelength does not equal the second wavelength.

3. The method of claim 1 wherein the first average power during the first time-interval does not equal the second average power during the second time-interval.

4. The method of claim 1 wherein the feedstock is a fiber-reinforced thermoplastic filament.

5. The method of claim 1 wherein the feedstock is a fiber-reinforced thermoplastic tape.

6. The method of claim 1 wherein the tamping tool is a roller.

7. The method of claim 1 wherein the tamping tool is a roller whose tangential speed equals a linear speed of the feedstock adjacent to the roller.

8. The method of claim 1 further comprising an optical cable for conveying the spatially-combined laser beam from the optical combiner to the optical splitter.

9. The method of claim 1 further comprising:
generating, with a third laser, a third laser beam, wherein the third laser beam is characterized by a third wavelength;
receiving, with the optical combiner, the third laser beam from the third laser and combining the third laser beam into the spatially-combined laser beam;
spatially extracting, with the optical splitter, the third laser beam from the spatially-combined laser beam; and
receiving, with a third optical instrument, the third laser beam from the optical splitter and irradiating and heating the segment of the feedstock with the third laser beam during a fourth time-interval, wherein the third laser beam has a third average power during the fourth time-interval, wherein the fourth time-interval is after, and is mutually exclusive of, the first time-interval.

10. The method of claim 9:
wherein the first wavelength does not equal the second wavelength;
wherein the first wavelength does not equal the third wavelength; and
wherein the second wavelength does not equal the third wavelength.

11. The method of claim 9:
wherein the first average power during the first time-interval does not equal the second average power during the second time-interval; and
wherein the first average power during the first time-interval does not equal the third average power during the third time-interval.

12. The method of claim 1 further comprising:
generating, with a third laser, a third laser beam, wherein the third laser beam is characterized by a third wavelength;
receiving, with the optical combiner, the third laser beam from the third laser and combining the third laser beam into the spatially-combined laser beam;
spatially extracting, with the optical splitter, the third laser beam from the spatially-combined laser beam; and
receiving, with a third optical instrument, the third laser beam from the optical splitter and irradiating and heating the portion of the workpiece with the third laser beam during a fourth time-interval, wherein the third laser beam has a third average power during the fourth time-interval, wherein the fourth time-interval is after, and is mutually exclusive of, the first time-interval.

13. The method of claim 12:
wherein the first wavelength does not equal the second wavelength;
wherein the first wavelength does not equal the third wavelength; and
wherein the second wavelength does not equal the third wavelength.

14. The method of claim 12:
wherein the first average power during the first time-interval does not equal the second average power during the second time-interval; and
wherein the first average power during the first time-interval does not equal the third average power during the third time-interval.

15. A method comprising:
generating, with a first laser, a first laser beam, wherein the first laser beam is characterized by a first wavelength;
generating, with a second laser, a second laser beam, wherein the second laser beam is characterized by a second wavelength;
receiving, with an optical combiner, the first laser beam from the first laser and the second laser beam from the second laser and combining the first laser beam and the second laser beam into a spatially-combined laser beam;
spatially extracting, with an optical splitter, the first laser beam and the second laser beam from the spatially-combined laser beam;
receiving, with a first optical instrument, the first laser beam from the optical splitter and irradiating and heating a segment of a feedstock with the first laser beam during a first time-interval, wherein the first laser beam has a first average power during the first time-interval;
receiving, with a second optical instrument, the second laser beam from the optical splitter and irradiating and heating the segment of the feedstock with the second laser beam during a second time-interval, wherein the second laser beam has a second average power during the second time-interval, and wherein the second time-interval is after, and mutually exclusive of, the first time-interval; and
tamping, with a tamping tool, the segment of the feedstock onto a portion of a workpiece during a third time-interval, wherein the third time-interval is after, and is mutually exclusive of, the first time-interval, and wherein the third time-interval is after, and mutually exclusive of, the second time-interval.

16. The method of claim 15 wherein the first wavelength does not equal the second wavelength.

17. The method of claim 15 wherein the first average power during the first time-interval does not equal the second average power during the second time-interval.

18. The method of claim 15 wherein the feedstock is a fiber-reinforced thermoplastic filament.

19. The method of claim 15 wherein the feedstock is a fiber-reinforced thermoplastic tape.

20. The method of claim 15 wherein the tamping tool is a roller.

* * * * *